US012522631B2

(12) United States Patent
Gilmer et al.

(10) Patent No.: US 12,522,631 B2
(45) Date of Patent: Jan. 13, 2026

(54) COMPOUNDS FOR USE IN THE TREATMENT OF LIVER DISEASE

(71) Applicant: The Provost, Fellows, Foundation Scholars, And The Other Members of Board, of the College of the Holy And Undivided Trinity of Queen Elizabeth Near Dublin, Dublin (IE)

(72) Inventors: John Gilmer, Dublin (IE); Jason Gavin, Kildare (IE)

(73) Assignee: The Provost, Fellows, Foundation Scholars, And The Other Members of Board, of the College of the Holy and Undivided Trinity of Queen Elizabeth near Dublin, Dublin (IE)

( * ) Notice: Subject to any disclaimer, the term of this patent is extended or adjusted under 35 U.S.C. 154(b) by 831 days.

(21) Appl. No.: 17/630,291

(22) PCT Filed: Aug. 14, 2020

(86) PCT No.: PCT/EP2020/072930
§ 371 (c)(1),
(2) Date: Jan. 26, 2022

(87) PCT Pub. No.: WO2021/032648
PCT Pub. Date: Feb. 25, 2021

(65) Prior Publication Data
US 2022/0281912 A1    Sep. 8, 2022

(30) Foreign Application Priority Data

Aug. 16, 2019 (GB) ..................................... 1911821

(51) Int. Cl.
*C07D 253/04* (2006.01)
*A61K 31/575* (2006.01)
*A61K 31/58* (2006.01)
*A61P 1/16* (2006.01)
*C07J 41/00* (2006.01)
*C07J 43/00* (2006.01)

(52) U.S. Cl.
CPC ............ *C07J 43/003* (2013.01); *A61K 31/575* (2013.01); *A61K 31/58* (2013.01); *A61P 1/16* (2018.01); *C07J 41/0005* (2013.01)

(58) Field of Classification Search
CPC .... C07J 43/003; C07J 41/0005; C07D 253/04
See application file for complete search history.

(56) References Cited

U.S. PATENT DOCUMENTS

2017/0266206 A1* 9/2017 Li ........................ C07J 41/0055

FOREIGN PATENT DOCUMENTS

| EP | 0 513 887 A1 | 11/1992 |
| WO | WO-2016/045642 A1 | 3/2016 |
| WO | WO-2020/117945 A1 | 6/2020 |

OTHER PUBLICATIONS

Rohacova et al. Org. Biomol. Chem., 2009, 7, 4973-4980 (Year: 2009).*
Merriam-Webster, entry for "sulfonate", obtained from https://www.merriam-webster.com/dictionary/sulfonate on Feb. 10, 2025 (Year: 2025).*
International Search Report and Written Opinion dated Feb. 15, 2021, from application No. PCT/EP2020/072930.

* cited by examiner

*Primary Examiner* — Matthew P Coughlin
(74) *Attorney, Agent, or Firm* — Foley & Lardner LLP

(57) ABSTRACT

Bile acid derivatives, methods of manufacture thereof, and uses thereof are disclosed herein. The bile acid derivatives have demonstrated potential as therapeutics for treating liver disease.

21 Claims, 17 Drawing Sheets

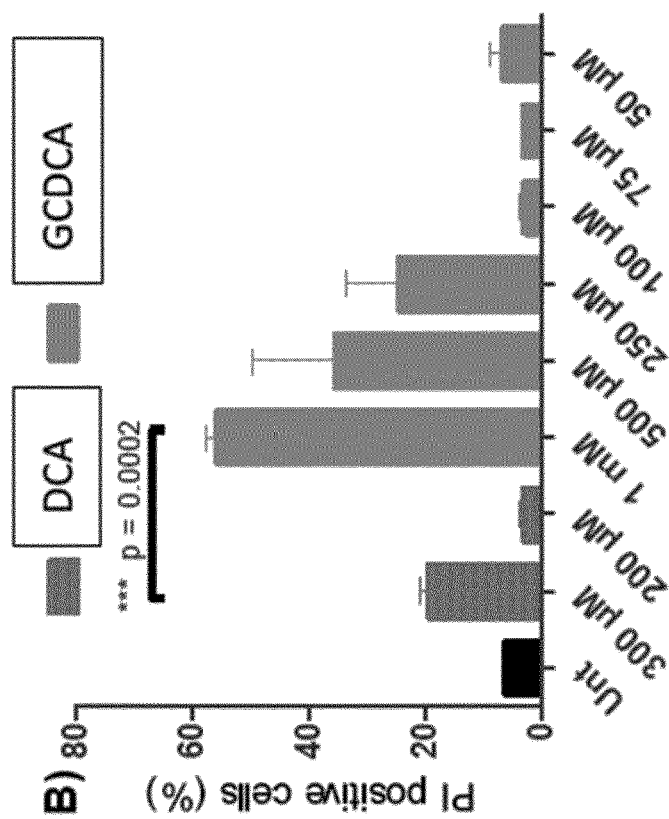
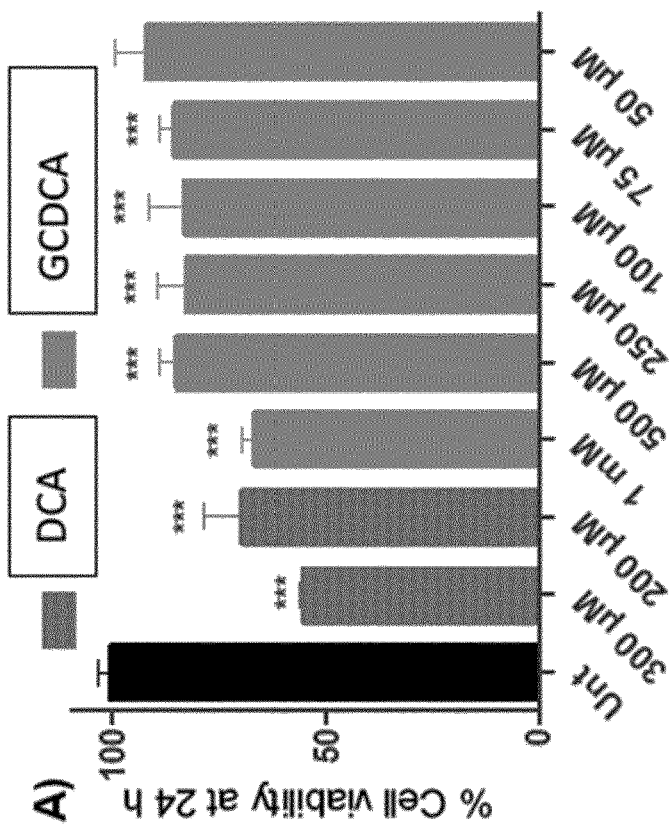
Figure 3(b)
Figure 3(a)

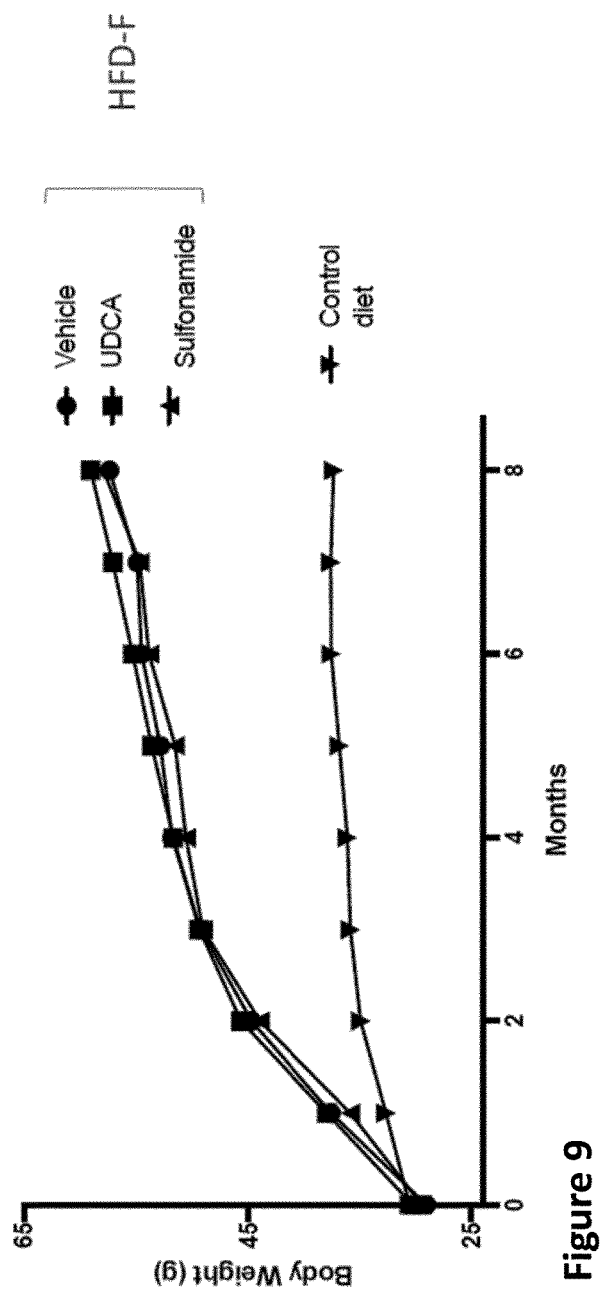
Figure 9
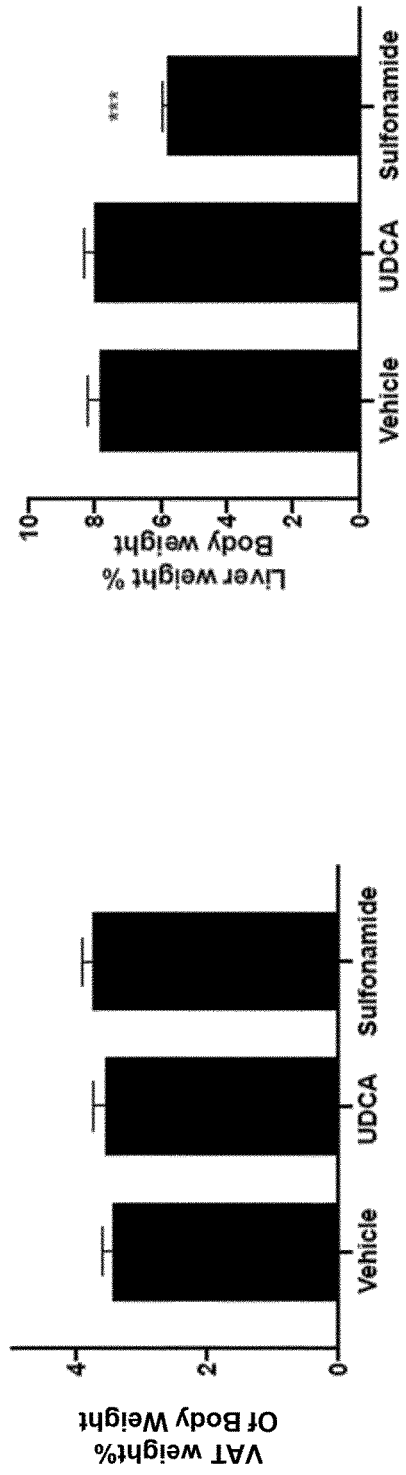
Figure 10a
Figure 10b

COMPOUNDS FOR USE IN THE TREATMENT OF LIVER DISEASE

CROSS-REFERENCE TO RELATED APPLICATIONS

This application is a U.S. National Stage Application under 35 U.S.C. § 371 of International Patent Application No. PCT/EP2020/072930, filed on Aug. 14, 2020, which claims the benefit of GB patent application no. 1911821.5, filed on Aug. 16, 2019, the contents of each of which are incorporated herein by reference in their entireties.

FIELD

The present invention relates to the treatment of liver disease. More specifically, the present invention is concerned with compounds and the use of such compounds in the treatment of liver disease, particularly primary biliary cholangitis/cirrhosis (PBC) and primary sclerosing cholangitis (PSC), NASH and its associated complications.

BACKGROUND TO THE INVENTION

Inflammation of the bile duct system is referred to as cholangitis. Cholangitis is caused by a blockage occurring in the bile duct system. The blockage may result from inter alia gallstones, infection or inflammatory conditions of the liver and bile ducts. Cholestasis is the reduction or stoppage of bile flow to the gut. Cholestasis is caused by disorders of the liver, bile ducts or pancreas. Primary biliary cholangitis, also called primary biliary cirrhosis, (PBC) is a chronic disease in which the bile ducts of the liver are destroyed slowly. PBC is a disease mainly affecting women caused by the destruction of the small bile ducts resulting in reduced bile flow, liver toxicity, fibrosis (scaring) and cirrhosis.

Primary sclerosing cholangitis (PSC) is a cholestatic disease characterized by the presence of intrahepatic and/or extrahepatic biliary duct concentric, obliterative fibrosis. In contrast to PBC, PSC mainly affects males. Approximately 75% of patients with PSC have ulcerative colitis and an associated 10-fold risk of colorectal cancer and a 160 fold risk of cholangiocarcinoma (biliary carcinoma). Liver transplantation remains the only effective treatment for PSC; there are no effective medical therapies. On the other hand PBC has been treated for several decades with ursodeoxycholic acid (UDCA), a bile acid present in human bile (3%).

In April 2016 obeticholic acid (OCA) a bile acid analogue of chenodeoxycholic acid (CDCA) and FXR agonist was approved by the FDA for addition to UDCA in treatment of UDCA non-responders in PBC. However there remains significant unmet need in this patient population because of non-response and side effects associated with the add-on therapy. UDCA is also used to treat cholestasis of pregnancy, cystic fibrosis-associated-liver-disease and in gallstone dissolution. UDCA improves liver scores in PSC but has modest effect on clinical outcomes, however, it is widely used because there are no other options. The efficacy of UDCA and OCA to treat non-alcoholic fatty liver disease (NAFLD) and the more serious development of this called NASH (non-alcoholic steatohepatitis) is also under consideration. These diseases are becoming a huge burden because of their prevalence (25-30% of Western adults may have NAFLD, and of these about 25% progress to NASH) and serious risk of liver failure and cancer.

Bile acids are steroidal compounds that are synthesised in the liver, stored in the gallbladder, and released in response to feeding in order to facilitate digestion of dietary fats. Bile acids are facially amphiphatic with a hydrophobic (β) face and a hydrophilic (α) face bearing polar hydroxyl functions. The steroid nucleus of the human BA consists of three six-member rings (A, B and C) and a five-member ring (D). Bile acids of higher vertebrates possess a 5β(cis)-configuration at the A/B junction (FIG. 1). As shown in FIG. 2, bile acids that are biosynthesised from cholesterol (1) in the hepatocyte are referred to as primary bile acids, predominantly cholic acid (CA, 2) and CDCA, 3. The primary bile acids are conjugated to glycine and taurine in a ratio of around 3:1 in humans. Interestingly, taurine conjugation in mice is predominant and the murine pool is overall more polar. The ionised salts are actively exported into the bile ducts by the bile salt export pump (BSEP) and enter the enterohepatic circulation alongside primary bile acids. The size and ionisation state of bile salts (conjugates) renders them impermeable to cell membranes so they are retained in the gastrointestinal lumen until they reach the terminal ileum. There, conjugated bile acids are actively absorbed by the apical bile salt transporter (ASBT) where they are transported back to the liver via the organic solute transporter (OST) α/β to the portal circulation. The complete pathway of hepatic secretion, intestinal reuptake, return to the liver and re-secretion takes place up to several times per meal and between 4 and 12 times a day. This is termed the enterohepatic circulation.

The enterohepatic circulation is >95% efficient. About 5% of circulating bile salts enter into the colon. Here they encounter anaerobic bacteria where they are deconjugated by bile salt hydrolases to regenerate the free BA. Bile salts are actively imported into competent bacteria and bile salt hydrolase is ubiquitously found. A sub-population of the human colonic microflora can further metabolise free bile acids through 7-dehydroxylation. In the case of cholic acid (CA, 2), reduction of the 7-hydroxy substituent produces deoxycholic acid (DCA, 4), whereas reduction of the 7-hydroxy substituent of chenodeoxycholic acid (3) produces lithocholic acid (LCA, 5). Both deoxycholic acid and lithocholic acid are classified as secondary bile acids. Both deoxycholic acid and lithocholic are toxic and build-up of either acid can cause liver damage. These relatively hydrophobic bile acids are passively absorbed and re-enter the enterohepatic circulation for recycling. Ursodeoxycholic acid (UDCA, 7) may be a secondary or tertiary BA depending on where it is produced. Small amounts of UDCA are produced in humans in the liver through oxidation of chenodeoxycholic acid to 7-oxo lithocholic acid followed by reduction of the 7-oxo group to produce the 7-β hydroxyl derivative i.e. ursodeoxycholic acid. Sulfated lithocholic acid is produced from lithocholic acid in the liver. The sulfate has a negative charge which reduces reabsorption on recycling and preventing accumulation. Although humans can efficiently sulfate lithocholic acid reducing its cytotoxicity, increased levels can lead to hepatotoxicity.

FIG. 2 shows the classification of bile acids. Bile acids are produced from cholesterol (1) in the liver and classified as primary, secondary or tertiary bile acids.

As outlined above increased levels of lithocholic acid can cause injury to the liver. As noted previously ursodeoxycholic acid is used for the treatment of liver disease, however, ursodeoxycholic acid is itself metabolised by colonic microflora producing lithocholic acid. While ursodeoxycholic acid can be highly effective in the treatment of serious liver disease, not all patients respond to ursodeoxycholic acid and some are susceptible to colorectal side effects at high doses. This may result from the unwanted build-up of lithocholic acid.

Cholestatic liver diseases are characterised by a disruption of bile flow, resulting in accumulation of secondary hydrophobic bile acids in the liver. It is well accepted that this increased level results in cytotoxicity. This occurs via perturbation of membrane fluidity and permeability to $Ca^{2+}$, inhibition of mitochondrial function (oxidative phosphorylation), induction of cytoskeletal changes, lipid peroxidation, alteration of DNA structure, and apoptosis. Hydrophobic bile acids are cytotoxic against a variety of different cell types including hepatocytes, erythrocytes, mast cells and gastrointestinal cells. In a chronic state, oxidative stress and apoptosis can induce the development of fibrosis and cirrhosis of the liver. Cholestasis is a symptom of several diseases including acute hepatitis, PBC and PSC.

Increased colonic delivery of bile acids in conditions of BA malabsorption leads to what is referred to as "BA diarrhoea". The dihydroxy bile acids chenodeoxycholic acid and deoxycholic acid have been blamed for this phenomenon. Ursodeoxycholic, despite having an opposite, antisecretory action in vitro, has been associated with diarrhoeal side effects when used at therapeutic doses. It has been suspected that in vivo dehydroxylation to lithocholic acid by gastrointestinal microbiota may account for this disparity between antisecretory activity in vitro and prosecretory activity in vivo.

Roda et al (J. Lipid Res, 1994, 35(12), p. 2268; Gasteroenterol. 1995, 108(4), p. 1204) described attempts to address C-7 metabolism on UDCA by modification of its steroid skeleton at the C-6 position.

Roda et al synthesised 6-α-fluoro ursodeoxycholic acid (8) and 6-α-methyl ursodeoxycholic acid (9) which were shown to possess increased metabolic stability compared to ursodeoxycholic acid.

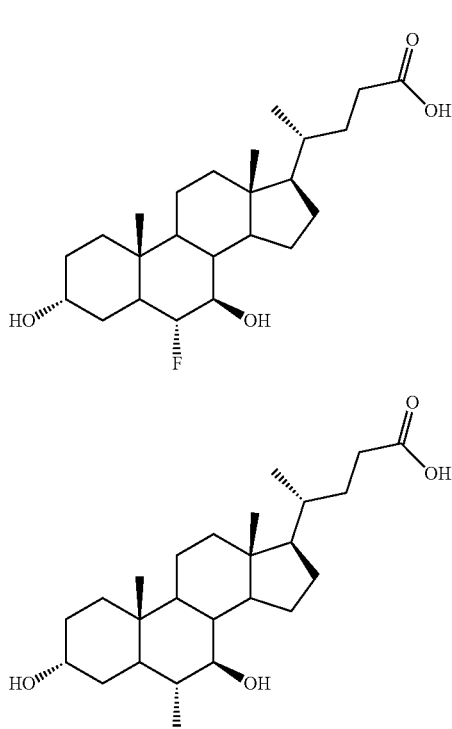

It has been suggested that 6-α-fluoro ursodeoxycholic acid has potential for treating cholestatic liver disease.

The 7α-methyl derivative of ursodeoxycholic acid shown below was first synthesised in 1984 in an effort to identify a derivative that would be more resistant to bacterial modification than ursodeoxycholic acid. The metabolism of this compound was analysed alongside its 7β-methyl chenodeoxycholic acid analogue in hamsters and was shown to be more resistant than the naturally occurring analogues (Une et al, Biochimica et Biophysica Acta, 1985, 833(2), p. 196). The 7α-position was also shown to be an important determinant of bile salt hydrolase activity.

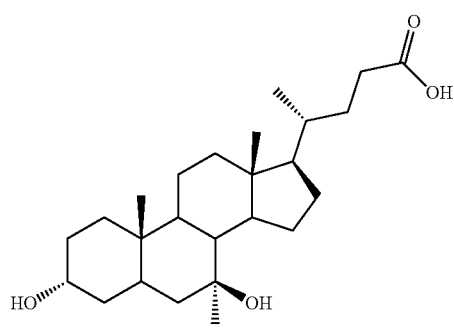

Rodrigues et al synthesised C-3 and C-7 sulfate derivatives of UDCA and administered them orally to rats (Gastroenterol., 1995, 109(6), p. 1835). The C-7 sulfate (15) reduced the faecal lithocholic acid/deoxycholic acid ratio while UDCA and its C-3 sulfate increased faecal lithocholic acid significantly, suggesting that C-7 sulfation inhibits bacterial metabolism.

Modification of the carboxy terminal side chain of UDCA has also been investigated.

International Patent Application Publication no. WO2006119803 describes nor-ursodeoxycholic acid which is a homolog of UDCA with a shortened side chain as having potential efficacy in the prevention and treatment of chronic liver diseases, particularly for human PSC and liver diseases related to MDR3 mutations. Nor-ursodeoxycholic acid has shown anti-inflammatory, anti-fibrotic and antiproliferative properties.

U.S. Pat. No. 5,512,558 discloses dimeric nor-derivatives of bile acids for use in the treatment of hyperlipidemia.

European Patent no. 0 652 773 discloses the use of nor- and homo-bile acids derivatives as absorption enhancers for medicaments. Said derivatives allegedly show the advantage of improving the absorption of medicaments through mucosae without being metabolized by the intestinal flora, thus allowing fast excretion. Moreover, the derivatives of EP'773 are also asserted to have a negligible toxicity.

U.S. Pat. No. 4,892,868 discloses 22-methyl-nor-ursodeoxycholic acid and 23-methyl-ursodeoxycholic acid for use in treating disorders of hepatobiliary function.

Notwithstanding the state of the art, it would be desirable to have new therapeutics for treating liver disease, in particular, novel therapies for treating PBC, PSC, non-alcoholic fatty liver disease (NAFLD) and non-alcoholic steatohepatitis (NASH).

It is an object of the present invention to provide alternative therapeutics for treating liver disease, suitably chronic liver disease, which are more effective than the state of the art therapies and desirably which have fewer side effects than the state of the art therapies.

SUMMARY

In one aspect, the present invention provides a compound having the formula:

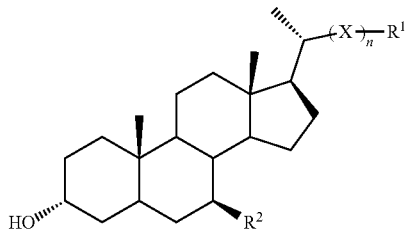

where n is 0 or 1, preferably n is 1,
where X is —$C_1$-$C_{12}$ aliphatic optionally substituted with one or more selected from the group consisting of O, S, hydroxyl, amino, amido, sulfonyl, sulphonamide, thiol, carboxyl, cyano, nitro, —$C_1$-$C_6$ alkyl, —$C_1$-$C_6$ alkoxy, —$C_1$-$C_6$ thioalkyl, oxo, —C(O)O—$C_1$-$C_6$ alkyl, —OC(O)O—$C_1$-$C_6$alkyl, —C(O)NR'R', —N(R')C(O)NR'R', —N(R)C(O)O—$C_1$-$C_6$alkyl, $C_3$-$C_6$ cycloalkyl;
$R^1$ is selected from the group consisting of carboxylate, —$CO_2H$, —C(O)OR', —C(O)NR'—$R^{A1}$, —N(R)C(O)—$R^{A1}$, —N(R)C(O)$OR^{A2}$, and sulfonate;
$R^2$ has a formula selected from the group consisting of:

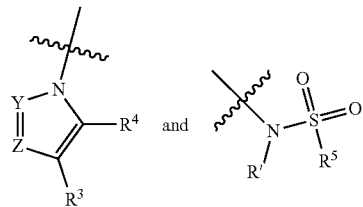

where:
Y and Z are each independently selected from N or —CH;
$R^3$ is H, $C_1$-$C_{12}$ aliphatic optionally substituted with one or more of O, S, hydroxyl, amino, amido, sulfonyl, sulphonamide, thiol, carboxyl, cyano, nitro, —$C_1$-$C_6$ alkyl, —$C_3$-$C_6$ cycloalkyl, —$C_1$-$C_6$ alkoxy, $C_1$-$C_6$ thioalkyl, oxo, —C(O)O—$C_1$-$C_6$ alkyl, —OC(O)O—$C_1$-$C_6$alkyl, —C(O)NR'R', —N(R')C(O)NR'R', —N(R)C(O)O—$C_1$-$C_6$alkyl, —NR'$R^{A2}$;
$R^4$ is H, halo, or $C_1$-$C_3$ alkyl; and
$R^5$ is $C_1$-$C_{12}$ aliphatic optionally substituted with one or more of O, S, hydroxyl, amino, amido, halo, sulfonyl, sulfonamide, thiol, carboxyl, cyano, nitro, —$C_1$-$C_6$ alkyl, —$C_1$-$C_6$ alkoxy, —$C_1$-$C_6$ thioalkyl, oxo, —C(O)O—$C_1$-$C_6$ alkyl, —OC(O)O—$C_1$-$C_6$alkyl, —C(O)NR'R', —N(R')C(O)NR'R', —N(R')C(O)O—$C_1$-$C_6$alkyl, —$C_3$-$C_6$ cycloalkyl;
R' is independently selected, for each occurrence, from the group consisting of hydrogen, $C_1$-$C_6$ alkyl optionally substituted with $R^{A1}$;
$R^{A1}$ is hydrogen, carboxylate, —$CO_2H$, sulfonate or $C_1$-$C_6$ alkyl, optionally substituted with one or more of hydroxyl, —$C_3$-$C_6$cycloalkyl, —$C_1$-$C_6$ alkenyl, —$C_1$-$C_6$ alkoxyl, carboxylate, —$CO_2H$, sulfonate;
$R^{A2}$ is $R^{A1}$, —C(O)$R^{A1}$, —$C_6$-$C_{12}$ aryl, —$C_6$-$C_{12}$ alkaryl, —$C_6$-$C_{12}$ alkenaryl, —$SO_2$—$C_1$-$C_6$ alkyl, —$SO_2$—$C_6$-$C_{12}$ aryl;

or a pharmaceutically acceptable salt, hydrate, stereoisomer, or prodrug thereof Advantageously, compounds of the present invention have demonstrated potential as therapeutics for the treatment of liver disease. In particular, the compounds of the invention have demonstrated enhanced therapeutic effects in comparison to ursodeoxycholic acid in several models of liver disease. Advantageously the compounds of the invention have potential as therapeutics for liver disease where ursodeoxycholic acid has marginal effect. In addition, the compounds of the invention may have reduced side effects in comparison to other therapeutics used in the treatment of liver disease.

Suitably, $R^2$ has the formula:

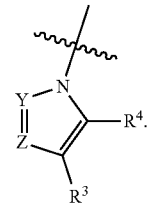

Preferably, $R^2$ has the formula:

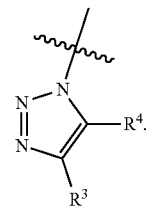

$R^3$ may be H, or —$C_1$-$C_6$ alkyl, such as methyl, ethyl, propyl, butyl, pentyl, hexyl or isomers thereof.
Suitably, $R^4$ is H.
$R^2$ may have the formula:

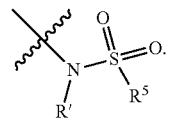

$R^5$ may be —$C_1$-$C_6$ alkyl optionally substituted with one or more halogen atoms, suitably one or more F and/or Cl. For example, $R^5$ may be $C_1$-$C_3$ alkyl optionally substituted with one or more halogen atoms, suitably one or more F and/or Cl.

Suitably, $R^5$ is a $C_1$ alkyl group, optionally substituted with one or more F and/or Cl. For example, $R^5$ may be methyl, ethyl, propyl, butyl, pentyl, hexyl or isomers thereof. Suitably, $R^5$ is methyl, fluoromethyl, difluomethyl or trifluoromethyl.

Preferably $R^5$ is methyl.

X may be —$C_1$-$C_6$ aliphatic, such as —$C_1$-$C_6$ alkyl, for example X may be a group selected from methylene, ethyl, propyl, butyl, pentyl, hexyl and isomers thereof.

X may optionally be substituted with one or more selected from the group consisting of hydroxyl, —$C_1$-$C_6$ alkyl, and —$C_3$-$C_6$ cycloalkyl.

Suitably, when n is 1, X is a $C_1$, $C_2$ or $C_3$ group.

$R^1$ may be carboxylate, —$CO_2H$, —C(O)OR' or sulfonate.

Preferably, n is 1, X is $C_1$-$C_3$ alkyl; and $R^1$ is carboxylate, —$CO_2H$, —C(O)OR' or sulfonate.

$R^1$ may be selected from the group consisting of carboxylate, —$CO_2H$, —C(O)OR', —C(O)NR'—$R^{A1}$, and sulfonate.

R' may be hydrogen or —$C_1$-$C_6$ alkyl, such as methyl, ethyl, propyl, butyl, pentyl, hexyl or isomers thereof.

$R^{A1}$ may be —$C_1$-$C_6$ alkyl optionally substituted with carboxylate, —$CO_2H$, or sulfonate.

Suitably, —$(X)_n$—$R^1$ is selected from the group consisting of:

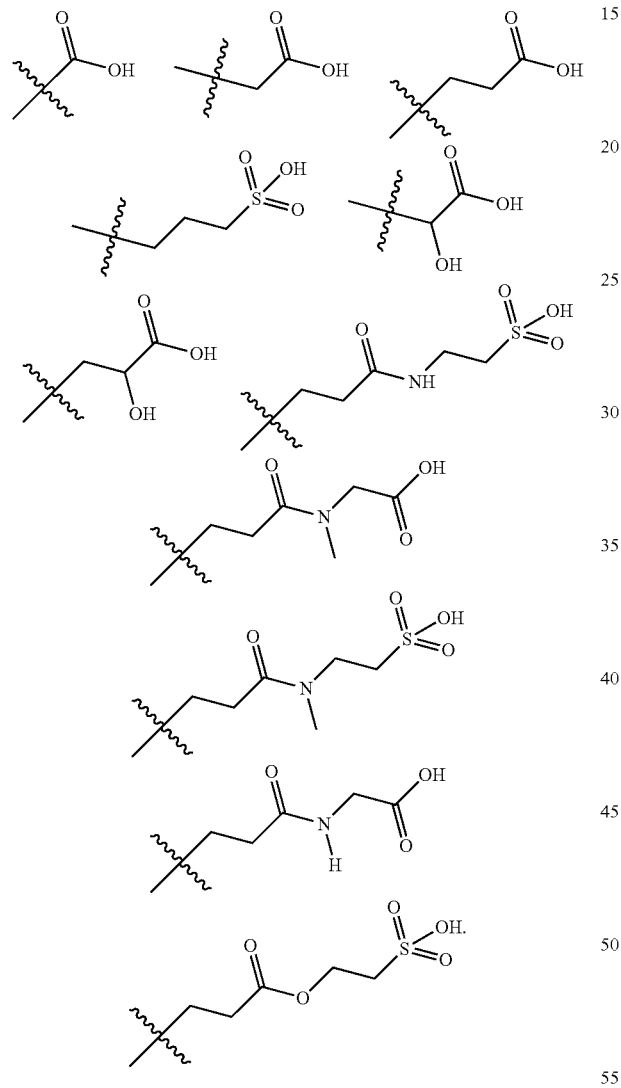

Preferably, X—$R^1$ is

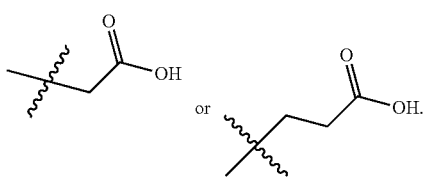 [SMILES: *CC(=O)O ; *CCC(=O)O]

The present invention also provides for a pharmaceutically acceptable salt, hydrate, stereoisomer or prodrug of a compound of the present invention.

For example the compound may have the structure:

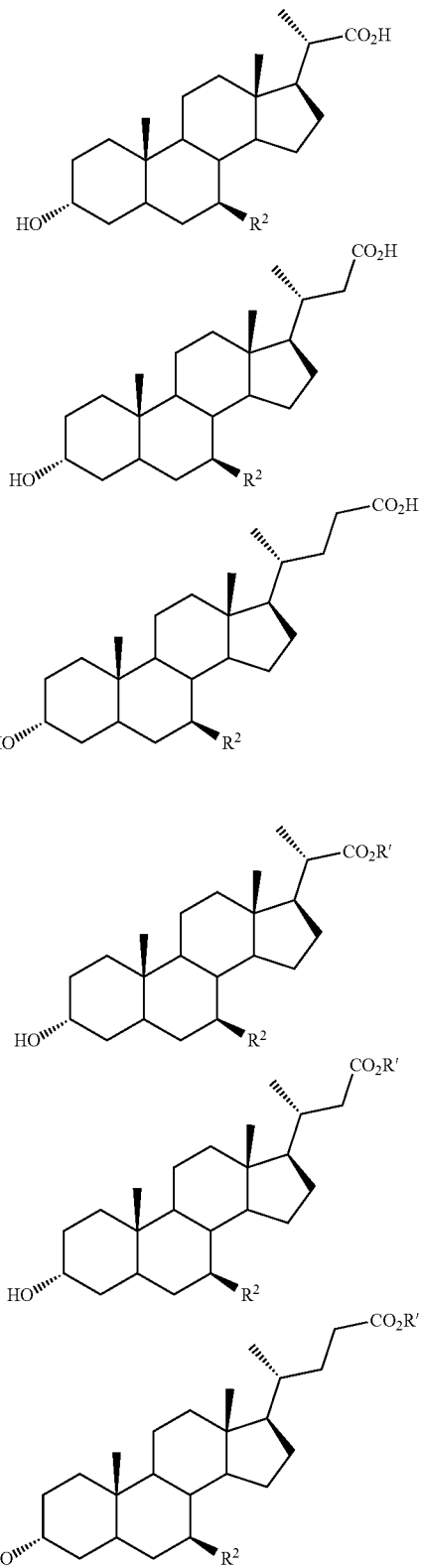

-continued
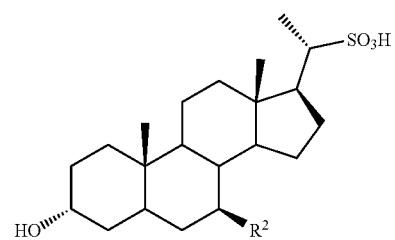
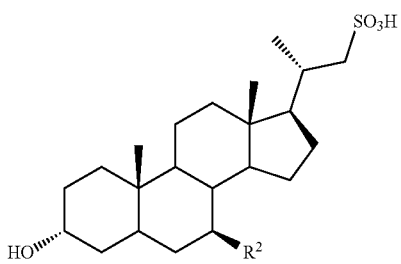
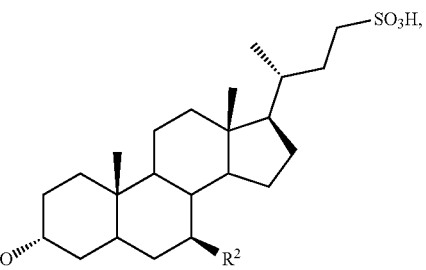
or a pharmaceutically acceptable salt, hydrate, stereoisomer or prodrug thereof.
In a preferred embodiment the compound has the formula:
-continued
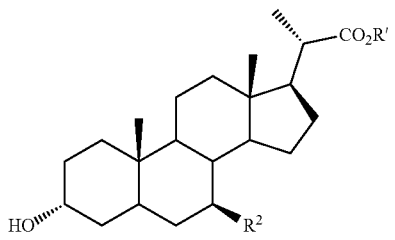
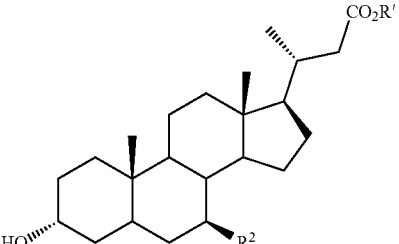
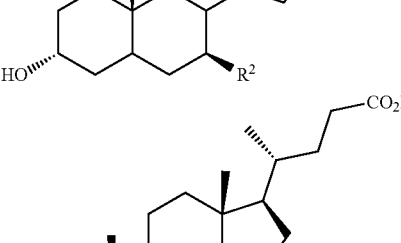
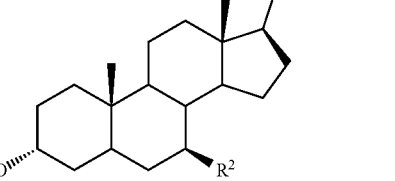
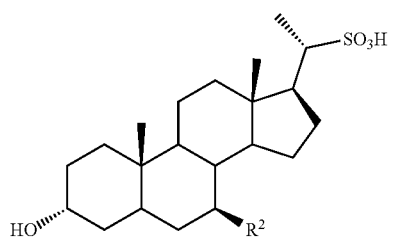
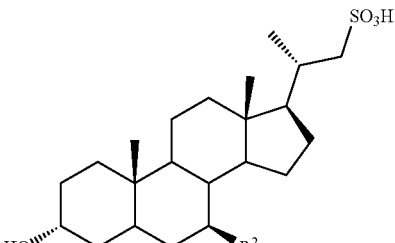
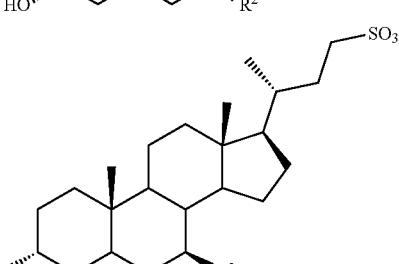

where R² is selected from:

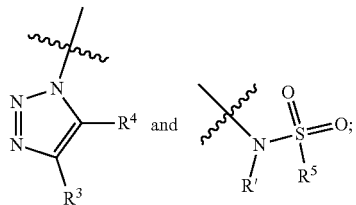

R³ is H, —C₁-C₁₂ aliphatic optionally substituted with one or more of O, S, hydroxyl, amino, amido, sulfonyl, sulphonamide, thiol, carboxyl, cyano, nitro, —C₁-C₆ alkyl, —C₃-C₆ cycloalkyl, —C₁-C₆ alkoxy, —C₁-C₆ thioalkyl, oxo, —C(O)O—C₁-C₆ alkyl, —OC(O)O—C₁-C₆alkyl, —C(O)NR'R', —N(R')C(O)NR'R', —N(R')C(O)O—C₁-C₆alkyl, —NR'R^{A2};

R⁴ is H, halo, or —C₁-C₃ alkyl; and

R⁵ is —C₁-C₁₂ aliphatic optionally substituted with one or more of O, S, hydroxyl, amino, amido, sulfonyl, sulphonamide, thiol, carboxyl, cyano, nitro, C₁-C₆ alkyl, C₁-C₆cycloalkyl, alkoxy, —C₁-C₆ thioalkyl, oxo, —C(O)O—C₁-C₆ alkyl, —OC(O)O—C₁-C₆-alkyl, —C(O)NR'R', —N(R')C(O)NR'R', —N(R')C(O)O—C₁-C₆alkyl, C₃-C₆ cycloalkyl;

R' is independently selected, for each occurrence, from the group consisting of hydrogen, —C₁-C₆ alkyl optionally substituted with R^{A1};

R^{A1} is hydrogen, carboxylate, —CO₂H, sulfonate or —C₁-C₆ alkyl, optionally substituted with one or more of hydroxyl, —C₃-C₆cycloalkyl, —C₁-C₆ alkenyl, —C₁-C₆ alkoxyl, carboxylate, —CO₂H, sulfonate;

R^{A2} is R^{A1}, —C(O)R^{A1}, —C₆-C₁₂ aryl, —C₆-C₁₂ alkaryl, —C₆-C₁₂ alkenaryl, —SO₂—C₁-C₆ alkyl, —SO₂—C₆-C₁₂ aryl;

or a pharmaceutically acceptable salt, hydrate, stereoisomer, or prodrug thereof.

For example, the compound may have the formula:

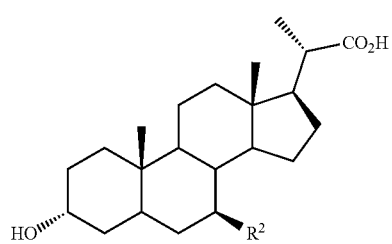

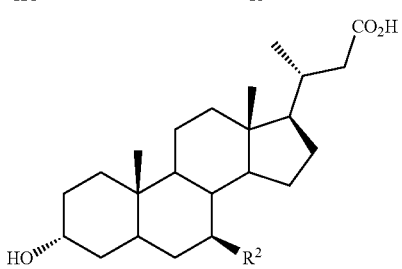

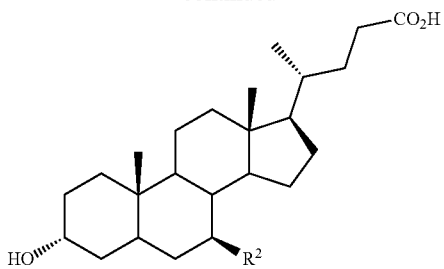

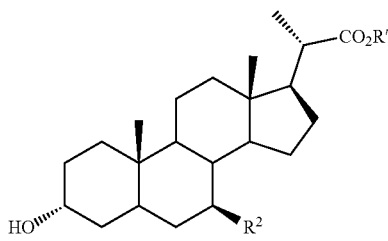

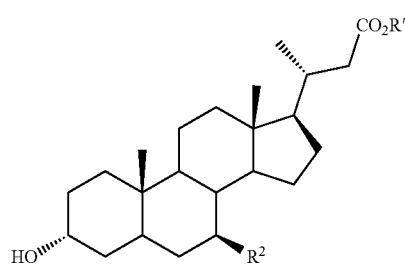

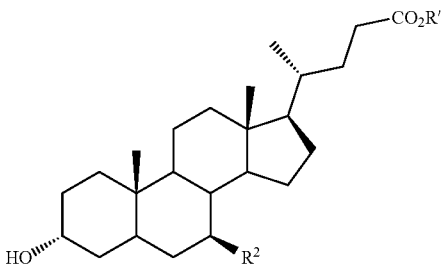

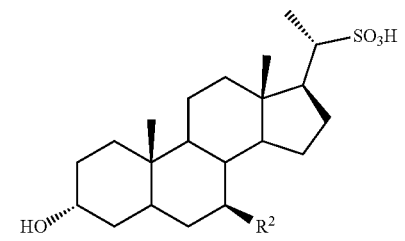

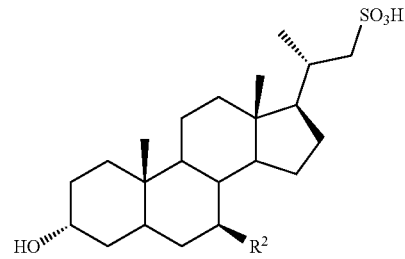

-continued

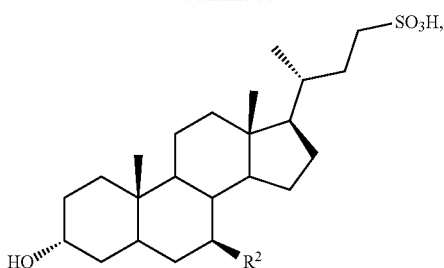

where R² is selected from:

R³ is H, or —C₁-C₁₂ aliphatic;
R⁴ is H, halo, or —C₁-C₃ alkyl;
R⁵ is —C₁-C₁₂ aliphatic; and
R' is H, or C₁-C₆ alkyl;
or a pharmaceutically acceptable salt, hydrate, stereoisomer, or prodrug thereof.

Suitably, R⁴ is —H and R' is —H.

In preferred embodiments the compound may have the formula:

or a pharmaceutically acceptable salt, hydrate, stereoisomer or prodrug thereof.

In another aspect the present invention provides a method for manufacturing the compounds of the invention comprising the steps of:
(i) providing chenodeoxycholic acid;
(ii) selectively activating the 7-hydroxyl group of chenodeoxycholic acid;
(iii) forming the 7-azido derivative of the compound of step (ii);
(iv) reacting the 7-azido group to form a compound as disclosed herein.

In still a further aspect the present invention provides a pharmaceutical composition comprising the compounds of the present invention and a pharmaceutically acceptable carrier and/or excipient.

In yet a further aspect the present invention provides compounds and pharmaceutical compositions as described herein, for use in the treatment of and/or prevention of liver disease.

Suitably, the liver disease is cholestatic liver disease or non-cholestatic liver disease. The cholestatic liver disease may be selected from primary sclerosing cholangitis (PSC), primary biliary cirrhosis (PBC) or progressive familial intrahepatic cholestasis, in particular progressive familial intrahepatic cholestasis type 1, 2 and 3, cystic fibrosis, drug-induced liver injury, such as drug induced cholestasis.

The non-cholestatic liver disease may be selected from chronic viral hepatitis (B, C, D), non-alcoholic fatty liver disease, alcoholic or non-alcoholic steatohepatitis, autoimmune hepatitis, hemochromatosis, Wilson disease or alpha-1-antitrypsin deficiency, liver carcinoma, suitably hepatocellular carcinoma and cholangiocarcinoma.

Also provided is a method for treating and/or preventing liver disease comprising administering to a patient in need thereof a therapeutically effective amount of a compound or pharmaceutical composition according to the present invention.

For example the liver disease may be a cholestatic liver disease or a non-cholestatic liver disease. The cholestatic liver disease may be selected from primary sclerosing cholangitis (PSC), primary biliary cirrhosis (PBC) or progressive familial intrahepatic cholestasis, in particular progressive familial intrahepatic cholestasis type 1, 2 and 3, cystic fibrosis, drug-induced cholestasis. The non-cholestatic liver disease is selected from chronic viral hepatitis (B, C, D), non-alcoholic fatty liver disease, alcoholic or non-alcoholic steatohepatitis, autoimmune hepatitis, hemochromatosis, Wilson disease or alpha-1-antitrypsin deficiency, liver carcinoma, suitably hepatocellular carcinoma and cholangiocarcinoma.

BRIEF DESCRIPTION OF THE DRAWINGS

Embodiments of the invention will be described, by way of example only, with reference to the accompanying drawings in which:

FIG. 3 shows the cell viability studies for HUH7 cells treated with DCA and GDCA at various concentrations

FIG. 9 shows the weight gain of the in HFD-F mice treated with vehicle, UDCA or sulfonamide (21) over time.

FIG. 10a shows visceral fat as a percentage of body weight for vehicle, UDCA and sulfonamide treated HFD-F mice.

FIG. 10b shows the liver weight as a percentage of body weight for vehicle, UDCA and sulfonamide (21) treated HFD-F mice.

DETAILED DESCRIPTION

Figure 1:
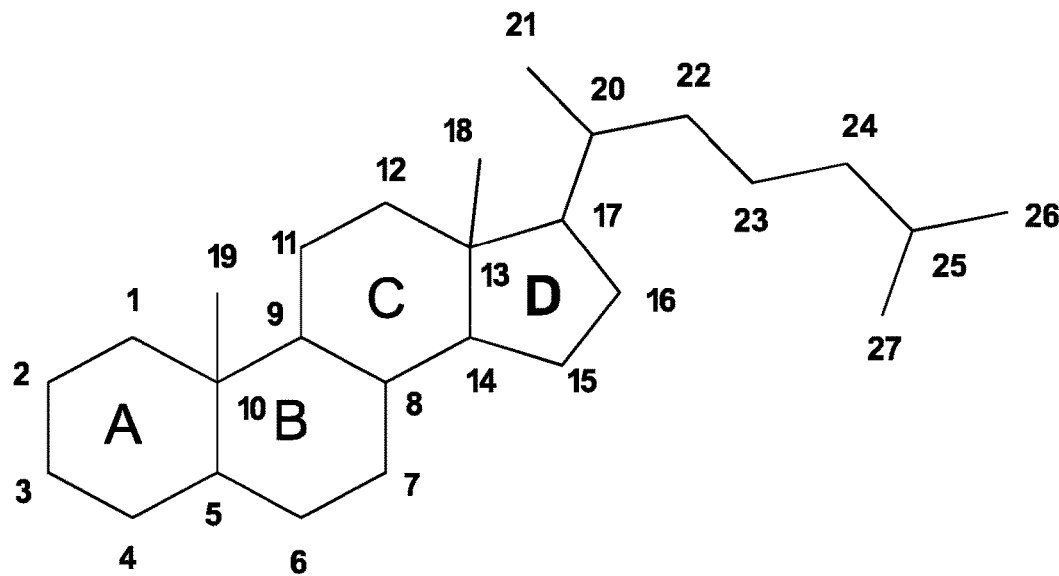
FIG. 1 shows a representative bile acid structure and associated nomenclature.
Figure 1:
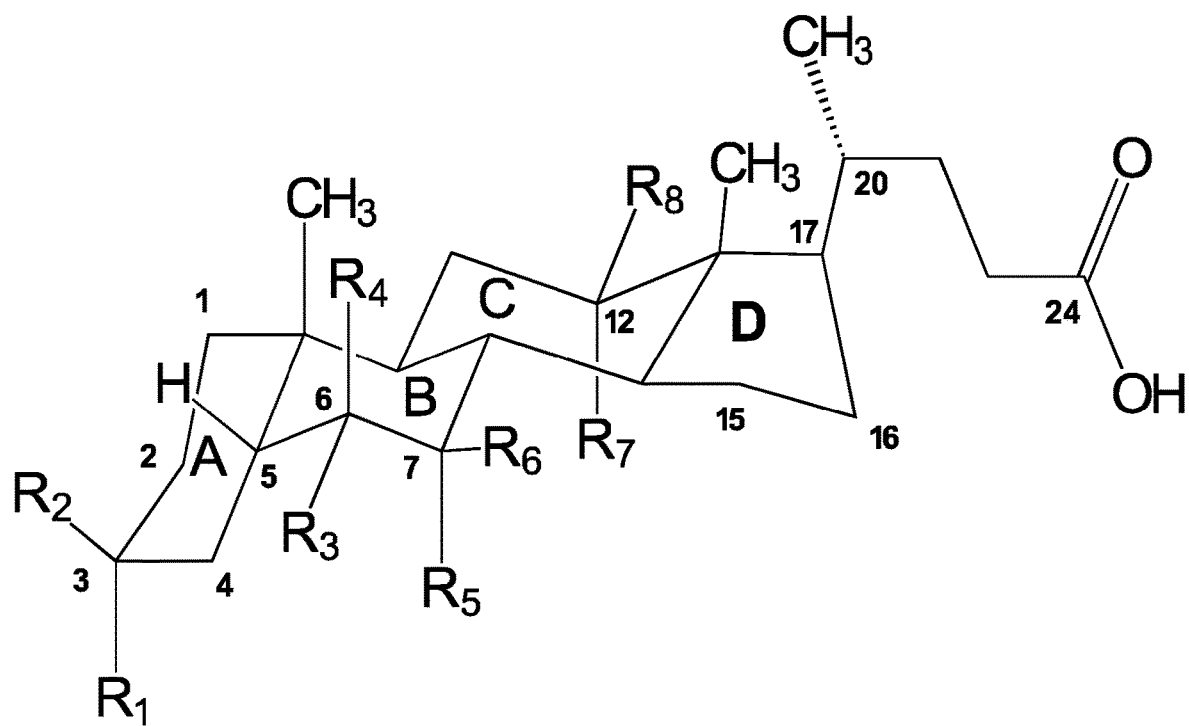
Figure 2:
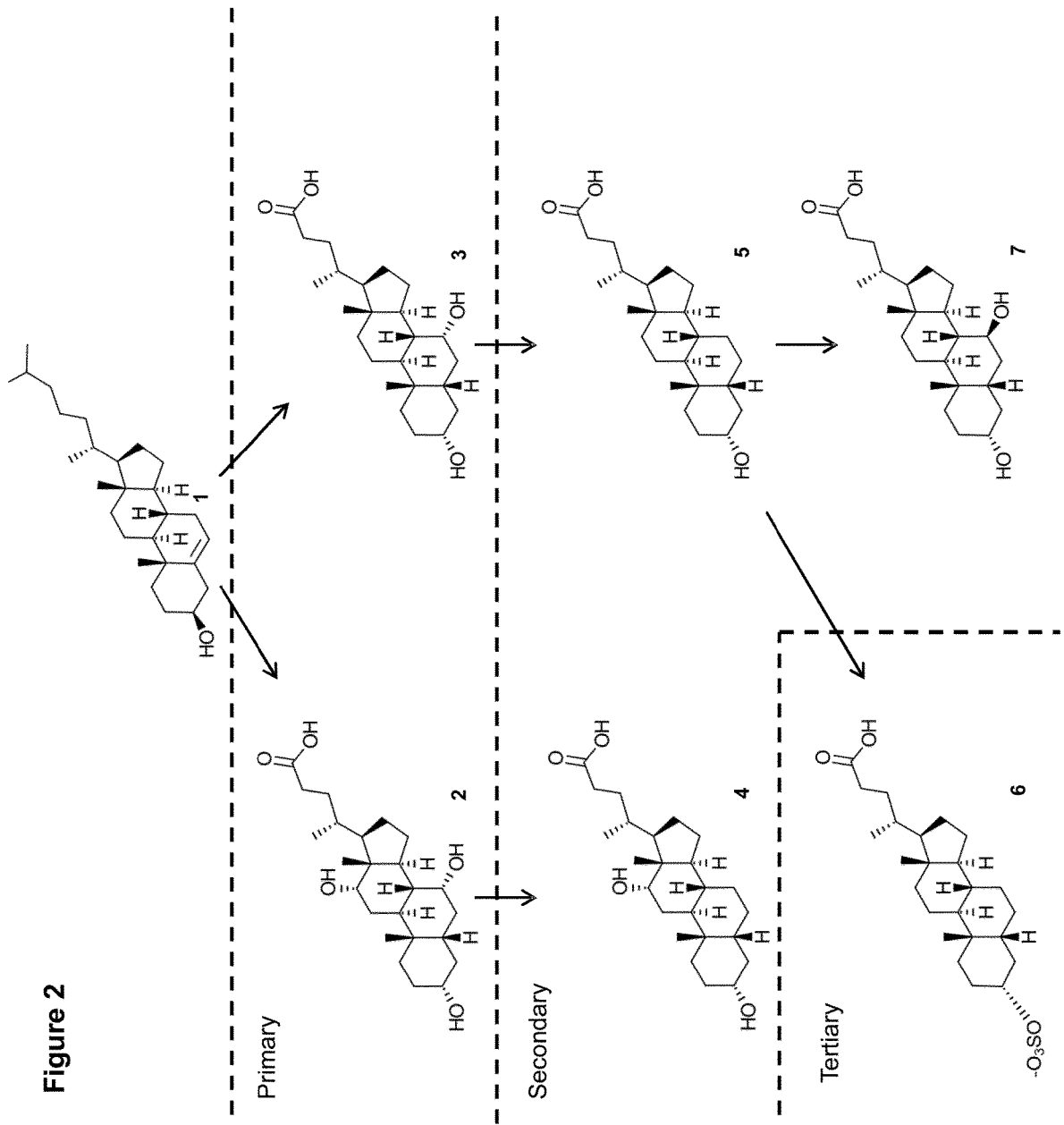
FIG. 2 shows the derivation of various bile acids which are biosynthesised from cholesterol.

Before further description, certain terms employed in the specification, examples and appended claims are collected here. These definitions should be read in light of the remainder of the disclosure and understood as by a person of skill in the art. Unless defined otherwise, all technical and scientific terms used herein have the same meaning as commonly understood by a person of ordinary skill in the art.

The term "pharmaceutically acceptable carrier" or "pharmaceutically acceptable excipient" as used herein refers to any of the following: solvents, dispersion media, coatings, isotonic and absorption delaying agents, with the proviso that they are compatible with pharmaceutical administration. The use of carriers and excipients for pharmaceutically active substances is well known to those skilled in the art. Each carrier must be "acceptable" in the sense of being compatible with the subject composition and its components and not injurious to the patient. Some examples of materials which may serve as pharmaceutically acceptable carriers include: (1) sugars, such as lactose, glucose and sucrose; (2) starches, such as corn starch and potato starch; (3) cellulose, and its derivatives, such as sodium carboxymethyl cellulose, ethyl cellulose and cellulose acetate; (4) powdered tragacanth; (5) malt; (6) gelatin; (7) talc; (8) excipients, such as cocoa butter and suppository waxes; (9) oils, such as peanut oil, cottonseed oil, safflower oil, sesame oil, olive oil, corn oil and soybean oil; (10) glycols, such as propylene glycol; (11) polyols, such as glycerin, sorbitol, mannitol and polyethylene glycol; (12) esters, such as ethyl oleate and ethyl laurate; (13) agar; (14) buffering agents, such as magnesium hydroxide and aluminum hydroxide; (15) alginic acid; (16) pyrogen-free water; (17) isotonic saline; (18) Ringer's solution; (19) ethyl alcohol; (20) phosphate buffer solutions; and (21) other non-toxic compatible substances employed in pharmaceutical formulations.

Furthermore, the compositions may further comprise other active compounds providing supplemental, additional, or enhanced therapeutic functions.

The term "pharmaceutical composition" as used herein refers to a composition comprising at least one compound as disclosed herein formulated together with one or more pharmaceutically acceptable carriers.

The compounds contemplated herein can be administered to a mammal, such as a human, but can also be administered to other mammals such as an animal, for example domestic animals, farm animals and laboratory animals, in need of veterinary treatment. The mammal treated in the methods contemplated herein is suitably a mammal with liver disease.

As used herein, the term "therapeutically effective amount" refers to the amount of the compound in question that will elicit the desired biological or medical response in a tissue, system or animal (e.g., mammal or human). The compounds contemplated herein are administered to the "subject", "individual" or "patient", (which can be a mammal as described above), in therapeutically effective amounts to treat a disease or disorder. Alternatively, a therapeutically effective amount of a compound is the quantity required to achieve a desired therapeutic and/or prophylactic effect.

The term "pharmaceutically acceptable salt(s)" as used in this specification refers to salts of acidic or basic groups that may be present in compounds used in the compositions. Basic compounds of the contemplated herein are capable of forming a plethora of salts with various inorganic and organic acids. Pharmaceutically acceptable acid addition salts of such basic compounds are those that form non-toxic acid addition salts, i.e., salts containing pharmacologically acceptable anions, including, but not limited to any of the following: chloride, bromide, iodide, nitrate, sulfate, bisulfate, methanesulfonate, ethanesulfonate, benzenesulfonate, p-toluenesulfonate, phosphate, acid phosphate, malate, oxalate, nicotinate, isonicotinate, acetate, lactate, salicylate, citrate, tartrate, oleate, tannate, pantothenate, saccharate, formate, benzoate, bitartrate, ascorbate, succinate, maleate, gentisinate, fumarate, gluconate, glucaronate, glutamate, and pamoate (i.e., 1,1'-methylene-bis-(2-hydroxy-3-naphthoate)) salts.

Acidic compounds contemplated herein are capable of forming a plethora of pharmaceutically acceptable salts with various basic substances. For example, the pharmaceutically acceptable salts may include alkali metal or alkaline earth metal salts and, particularly, calcium, magnesium, sodium, lithium, zinc, potassium, and iron salts. Compounds comprising a basic or acidic moiety may also form pharmaceutically acceptable salts with amino acids. The compounds of the disclosure may contain both acidic and basic groups; for example, one amino and one carboxylic acid group. In such a case, the compound can exist as an acid addition salt, a zwitterion, or a base salt.

The term "stereoisomers" when used herein consist of all enantiomers or diastereomers. These compounds may be designated by the symbols "(+)," "(−)," "R" or "S," depending on the configuration of substituents around the stereogenic carbon atom in question. The person having ordinary skill in the art will recognize that a structure may denote a chiral center implicitly.

The compounds disclosed herein can exist in solvated as well as unsolvated forms, for example as hydrates or with other pharmaceutically acceptable solvents such ethanol, and the like. The compounds disclosed herein embrace both solvated and unsolvated forms. The compound of the invention can be amorphous. The compound of the invention can exist as a single polymorph or as a mixture of polymorphs. In some embodiments, the compound of the invention is in a crystalline form.

The disclosure also embraces isotopically labelled compounds of the disclosure, wherein said isotopically labelled compounds are identical to the compounds of the invention except that one or more atoms are replaced by an isotopic variant. Isotopes that can be incorporated into compounds of the disclosure include isotopes of hydrogen, carbon, nitrogen, oxygen, phosphorus, sulfur, fluorine and chlorine, such as $^{2}H$, $^{3}H$, $^{13}C$, $^{14}C$, $^{15}N$, $^{18}O$, $^{17}O$, $^{31}P$, $^{32}P$, $^{35}S$, $^{18}F$, and $^{36}Cl$, respectively. For example, a compound of the disclosure may have one or more hydrogen atoms replaced with deuterium.

The term "prodrug" as used herein refers to compounds that are transformed in vivo to yield a disclosed compound or a pharmaceutically acceptable salt, hydrate or solvate of the compound. The prodrug may be transformed in vivo through various mechanisms for example, through the action of esterase, amidase or phosphatase enzymes, or via oxidative and or reductive metabolism. Such a transformation releasing the drug from the prodrug could occur in various locations, for example, in the intestinal lumen or upon transit of the intestine, blood or liver. The transformation may also or alternatively be by, chemical hydrolysis or enzymatic attack. Prodrugs are well known to those skilled in the art. For example, if a compound of the invention or a pharmaceutically acceptable salt, hydrate or solvate of the compound contains a carboxylic acid group, a prodrug may comprise an ester formed by the replacement of the hydrogen atom of the acid group with a group such as $(C_1-C_8)$ alkyl, $(C_2-C_{12})$ alkanoyloxymethyl, 1-(alkanoyloxy)ethyl having from 4 to 9 carbon atoms, 1-methyl-1-(alkanoyloxy)-ethyl having from 5 to 10 carbon atoms, alkoxycarbonyloxymethyl having from 3 to 6 carbon atoms, 1-(alkoxycarbonyloxy)ethyl having from 4 to 7 carbon atoms, 1-methyl-1-(alkoxycarbonyloxy)ethyl having from 5 to 8 carbon atoms, N-(alkoxycarbonyl)aminomethyl having from 3 to 9 carbon atoms, 1-(N-(alkoxycarbonyl)amino)ethyl having from 4 to 10 carbon atoms, 3-phthalidyl, 4-crotonolactonyl, gamma-butyrolacton-4-yl, di-N,N—$(C_{1-2})$alkylamino$(C_{2-3})$ alkyl (such as β-dimethylaminoethyl), carbamoyl-$(C_{1-2})$alkyl, N,N-di$(C_{1-2})$alkylcarbamoyl-$(C_{1-2})$alkyl and piperidino-, pyrrolidino- or morpholino$(C_{2-3})$alkyl.

Similarly, if a compound contemplated herein contains an alcohol functional group, a prodrug can be formed by the replacement of the hydrogen atom of the alcohol group with a group such as $(C_{1-6})$alkanoyloxymethyl, 1-(($C_{1-6}$)alkanoyloxy)ethyl, 1-methyl-1-($C_{1-6}$)alkanoyloxy)ethyl ($C_{1-6}$) alkoxycarbonyloxymethyl, N—(C1-6)alkoxycarbonylaminomethyl, succinoyl, $(C_{1-6})$alkanoyl, α-amino$(C_{1-4})$ alkanoyl, arylacyl and α-aminoacyl, or α-aminoacyl-α-aminoacyl, where each α-aminoacyl group is independently selected from the naturally occurring L-amino acids, —P(O)(OH)$_2$, —P(O)(O($C_{1-6}$)alkyl)$_2$ or glycosyl (the radical resulting from the removal of a hydroxyl group of the hemiacetal form of a carbohydrate).

If a compound contemplated herein incorporates an amine functional group, a prodrug can be formed, for example, by creation of an amide or carbamate, an N-acyloxyakyl derivative, an (oxodioxolenyl)methyl derivative, an N-Mannich base, imine or enamine.

Compositions contemplated herein may be administered by various means, depending on their intended use, as is well known in the art. For example, if compositions of the present invention are to be administered orally, they may be formulated as tablets, capsules, granules, powders or syrups. Alternatively, formulations of the present invention may be administered parenterally as injections (intravenous, intramuscular or subcutaneous), drop infusion preparations or suppositories. These formulations may be prepared by conventional means, and, if desired, the compositions may be mixed with any conventional additive, such as an excipient, a binder, a disintegrating agent, a lubricant, a corrigent, a solubilizing agent, a suspension aid, an emulsifying agent or a coating agent.

Compositions of the present invention may include wetting agents, emulsifiers and lubricants, such as sodium lauryl sulfate and magnesium stearate, as well as coloring agents, release agents, coating agents, sweetening, flavoring and perfuming agents, preservatives and antioxidants may be present in the formulated agents.

Subject compositions may be suitable for oral, nasal, topical (including buccal and sublingual), rectal, vaginal, aerosol and/or parenteral administration. The amount of composition that may be combined with a carrier material to produce a single dose vary depending upon the subject being treated, and the particular mode of administration.

Formulations of the compounds and pharmaceutical compositions of the invention, suitable for oral administration may be in the form of capsules, cachets, pills, tablets, lozenges (using a flavored basis, usually sucrose and acacia or tragacanth), powders, granules, or as a solution or a suspension in an aqueous or non-aqueous liquid, or as an oil-in-water or water-in-oil liquid emulsion, or as an elixir or syrup, or as pastilles (using an inert base, such as gelatin and glycerin, or sucrose and acacia), each containing a predetermined amount of a subject composition thereof as an active ingredient. Compositions of the present invention may also be administered as a bolus, electuary, or paste.

In solid dosage forms for oral administration (capsules, tablets, pills, film-coated tablets, sugar-coated tablets, powders, granules and the like), the subject composition is mixed with one or more pharmaceutically acceptable carriers, such as sodium citrate or dicalcium phosphate, and/or any of the following: (a) fillers or extenders, e.g. sucrose, glucose, mannitol, starches, lactose, and/or silicic acid; (b) binders, e.g. carboxymethylcellulose, alginates, gelatin, polyvinyl pyrrolidone, sucrose and/or acacia; (c) humectants, e.g. glycerol; (d) disintegrating agents, e.g. agar-agar, calcium carbonate, potato or tapioca starch, alginic acid, certain silicates, and sodium carbonate; (e) solution retarding agents, e.g. paraffin; (f) absorption accelerators, e.g. quaternary ammonium compounds; (g) wetting agents, e.g. acetyl alcohol and glycerol monostearate; (h) absorbents, e.g. kaolin and bentonite clay; (i) lubricants, e.g. talc, calcium stearate, magnesium stearate, solid polyethylene glycols, sodium lauryl sulfate, and mixtures thereof; and (j) coloring agents. In the case of capsules, tablets and pills, the compositions may also comprise buffering agents. Solid compositions of a similar type may also be employed as fillers in soft and hard-filled gelatin capsules using such excipients as lactose or milk sugars, as well as high molecular weight polyethylene glycols and the like.

Formulations and compositions may include micronized crystals of the disclosed compounds. Micronization may be performed on crystals of the compounds alone, or on a mixture of crystals and a part or whole of pharmaceutical excipients or carriers. Mean particle size of micronized crystals of a disclosed compound may be for example about 5 to about 200 microns, or about 10 to about 110 microns.

A tablet may be made by compression or molding, optionally with one or more accessory ingredients. Compressed tablets may be prepared using binder (for example, gelatin or hydroxypropylmethyl cellulose), lubricant, inert diluent, preservative, disintegrant (for example, sodium starch glycolate or cross-linked sodium carboxymethyl cellulose), surface-active or dispersing agent. Molded tablets may be made by molding in a suitable machine a mixture of the subject composition moistened with an inert liquid diluent. Tablets, and other solid dosage forms, such as film coated tablets or sugar coated tablets, capsules, pills and granules, may optionally be scored or prepared with coatings and shells, such as enteric coatings and other coatings well known in the pharmaceutical-formulating art.

Liquid dosage forms for oral administration include pharmaceutically acceptable emulsions, microemulsions, solutions, suspensions, syrups and elixirs. In addition to the subject composition, the liquid dosage forms may contain inert diluents commonly used in the art, such as, for example, water or other solvents, solubilizing agents and emulsifiers, such as ethyl alcohol, isopropyl alcohol, ethyl carbonate, ethyl acetate, benzyl alcohol, benzyl benzoate, propylene glycol, 1,3-butylene glycol, oils (in particular, cottonseed, groundnut, corn, germ, olive, castor and sesame oils), glycerol, tetrahydrofuryl alcohol, polyethylene glycols and fatty acid esters of sorbitan, cyclodextrins and mixtures thereof.

Suspensions, in addition to the subject composition, may contain suspending agents as, for example, ethoxylated isostearyl alcohols, polyoxyethylene sorbitol and sorbitan esters, microcrystalline cellulose, aluminum metahydroxide, bentonite, agar-agar and tragacanth, and mixtures thereof.

Formulations for rectal or vaginal administration may be presented as a suppository, which may be prepared by mixing a subject composition with one or more suitable non-irritating excipients or carriers comprising, for example, cocoa butter, polyethylene glycol, a suppository wax or a salicylate, and which is solid at room temperature, but liquid at body temperature and, therefore, will melt in the body cavity and release the active agent. Formulations which are suitable for vaginal administration also include pessaries, tampons, creams, gels, pastes, foams or spray formulations containing such carriers as are known in the art to be appropriate.

Dosage forms for transdermal or topical administration of a subject composition include powders, sprays, ointments, pastes, creams, lotions, gels, solutions, patches and inhalants. The active component may be mixed under sterile conditions with a pharmaceutically acceptable carrier, and with any preservatives, buffers, or propellants which may be required.

Pharmaceutical compositions of this invention suitable for parenteral administration comprise a subject composition in combination with one or more pharmaceutically-acceptable sterile isotonic aqueous or non-aqueous solutions, dispersions, suspensions or emulsions, or sterile powders which may be reconstituted into sterile injectable solutions or dispersions just prior to use, which may contain antioxidants, buffers, bacteriostats, solutes which render the formulation isotonic with the blood of the intended recipient or suspending or thickening agents.

Examples of suitable aqueous and non-aqueous carriers which may be employed in the pharmaceutical compositions of the invention include water, ethanol, polyols (such as glycerol, propylene glycol, polyethylene glycol, and the like), and suitable mixtures thereof, vegetable oils, such as olive oil, and injectable organic esters, such as ethyl oleate and cyclodextrins. Proper fluidity may be maintained, for example, by the use of coating materials, such as lecithin, by the maintenance of the required particle size in the case of dispersions, and by the use of surfactants. The efficacy of treatment with the subject compositions may be determined in a number of fashions known to those of skill in the art.

Throughout the description, where compositions are described as having, including, or comprising specific components, it is contemplated that compositions also consist essentially of, or consist of, the recited components. Similarly, where processes are described as having, including, or comprising specific process steps, the processes also consist essentially of, or consist of, the recited processing steps. Except where indicated otherwise, the order of steps or order for performing certain actions are immaterial so long as the invention remains operable. Moreover, unless otherwise noted, two or more steps or actions may be conducted simultaneously.

Embodiments

Embodiments of the present invention may relate to one or more of the enumerated examples, below.

(1) A compound having the formula:

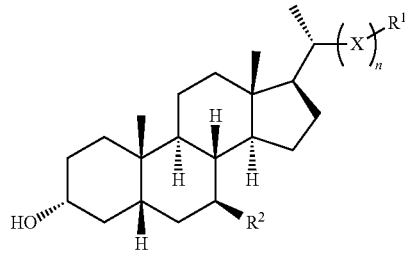

where n is 0 or 1, preferably n is 1, where X is —$C_1$-$C_{12}$ aliphatic optionally substituted with one or more selected from the group consisting of O, S, hydroxyl, amino, amido, sulfonyl, sulphonamide, thiol, carboxyl, cyano, nitro, —$C_1$-$C_6$ alkyl, —$C_1$-$C_6$ alkoxy, —$C_1$-$C_6$ thioalkyl, oxo, —C(O)O—$C_1$-$C_6$ alkyl, —OC(O)O—$C_1$-$C_6$alkyl, —C(O)NR'R', —N(R')C(O)NR'R', —N(R')C(O)O—$C_1$-$C_6$alkyl, $C_3$-$C_6$ cycloalkyl;

$R^1$ is selected from the group consisting of carboxylate, —$CO_2H$, —C(O)OR', —C(O)NR'—$R^{41}$, —N(R)C(O)—$R^{41}$, —N(R)C(O)OR$^{42}$, and sulfonate;

$R^2$ has a formula selected from the group consisting of:

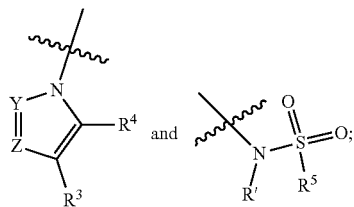

where:

Y and Z are each independently selected from N or —CH;

$R^3$ is H, $C_1$-$C_{12}$ aliphatic optionally substituted with one or more of O, S, hydroxyl, amino, amido, sulfonyl, sulphonamide, thiol, carboxyl, cyano, nitro, —$C_1$-$C_6$ alkyl, —$C_3$-$C_6$ cycloalkyl, —$C_1$-$C_6$ alkoxy, $C_1$-$C_6$ thioalkyl, oxo, —C(O)O—$C_1$-$C_6$ alkyl, —OC(O)O—$C_1$-$C_6$alkyl, —C(O)NR'R', —N(R')C(O)NR'R', —N(R)C(O)O—$C_1$-$C_6$alkyl, —NR'R$^{42}$;

$R^4$ is H, halo, or $C_1$-$C_3$ alkyl; and $R^5$ is $C_1$-$C_{12}$ aliphatic optionally substituted with one or more of O, S, hydroxyl, amino, amido, halo, sulfonyl, sulfonamide, thiol, carboxyl, cyano, nitro, —$C_1$-$C_6$ alkyl, —$C_1$-$C_6$ alkoxy, —$C_1$-$C_6$ thioalkyl, oxo, —C(O)O—$C_1$-$C_6$ alkyl, —OC(O)O—$C_1$-$C_6$alkyl, —C(O)NR'R', —N(R')C(O)NR'R', —N(R)C(O)O—$C_1$-$C_6$alkyl, —$C_3$-$C_6$ cycloalkyl;

R' is independently selected, for each occurrence, from the group consisting of hydrogen, $C_1$-$C_6$ alkyl optionally substituted with $R^{41}$;

$R^{41}$ is hydrogen, carboxylate, —$CO_2H$, sulfonate or $C_1$-$C_6$ alkyl, optionally substituted with one or more of hydroxyl, —$C_3$-$C_6$cycloalkyl, —$C_1$-$C_6$ alkenyl, —$C_1$-$C_6$ alkoxyl, carboxylate, —$CO_2H$, sulfonate;

$R^{42}$ is $R^{41}$, —C(O)$R^{41}$, —$C_6$-$C_{12}$ aryl, —$C_6$-$C_{12}$ alkaryl, —$C_6$-$C_{12}$ alkenaryl, —$SO_2$—$C_1$-$C_6$ alkyl, —$SO_2$—$C_6$-$C_{12}$ aryl;

or a pharmaceutically acceptable salt, hydrate, stereoisomer, or prodrug thereof (2) The compound of enumerated example embodiment 1, wherein $R^2$ has the formula:

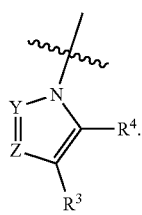

(3) The compound of enumerated example embodiment 1 or 2, wherein $R^2$ has the formula:

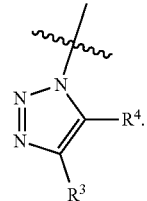

(4) The compound of any preceding enumerated example embodiment, wherein $R^3$ is H, or —$C_1$-$C_6$ alkyl, such as methyl, ethyl, propyl, butyl, pentyl, hexyl or isomers thereof.

(5) The compound of any preceding enumerated example embodiment wherein $R^4$ is H.

(6) The compound of any preceding enumerated example embodiment wherein $R^2$ has the formula:

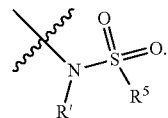

(7) The compound of any preceding enumerated example embodiment wherein $R^5$ may be —$C_1$-$C_6$ alkyl optionally substituted with one or more halogen atoms, suitably one or more F and/or Cl, for example, $R^5$ may be $C_1$-$C_3$ alkyl optionally substituted with one or more halogen atoms, suitably one or more F and/or Cl.

(8) The compound of any preceding enumerated example embodiment wherein $R^5$ is a $C_1$ alkyl group, optionally substituted with one or more F and/or Cl, for example, $R^5$ may be methyl, ethyl, propyl, butyl, pentyl, hexyl or isomers thereof, suitably, $R^5$ is methyl, fluoromethyl, difluomethyl or trifluoromethyl, preferably $R^5$ is methyl.

(9) The compound of any preceding enumerated example embodiment wherein X is —$C_1$-$C_6$ aliphatic, such as —$C_1$-$C_6$ alkyl, for example X may be a group selected from methylene, ethyl, propyl, butyl, pentyl, hexyl and isomers thereof.

(10) The compound of any preceding enumerated example embodiment wherein X may optionally be substituted with one or more selected from the group consisting of hydroxyl, —$C_1$-$C_6$ alkyl, and —$C_3$-$C_6$ cycloalkyl.

(11) The compound of any preceding enumerated example embodiment wherein when n is 1, X is a $C_1$, $C_2$ or $C_3$ group.

(12) The compound of any preceding enumerated example embodiment wherein $R^1$ may be carboxylate, —$CO_2H$, —C(O)OR' or sulfonate.

(13) The compound of any preceding enumerated example embodiment wherein n is 1, X is $C_1$-$C_3$ alkyl; and $R^1$ is carboxylate, —$CO_2H$, —C(O)OR' or sulfonate.

(14) The compound of any preceding enumerated example embodiment wherein $R^1$ is selected from the group consisting of carboxylate, —$CO_2H$, —C(O)OR', —C(O)NR'—$R^{41}$, and sulfonate.

(15) The compound of any preceding enumerated example embodiment wherein R' may be hydrogen or —$C_1$-$C_6$ alkyl, such as methyl, ethyl, propyl, butyl, pentyl, hexyl or isomers thereof.

(16) The compound of any preceding enumerated example embodiment wherein $R^{41}$ is —$C_1$-$C_6$alkyl optionally substituted with carboxylate, —$CO_2H$, or sulfonate.

(17) The compound of any preceding enumerated example embodiment wherein —$(X)_n$—$R^1$ is selected from the group consisting of:

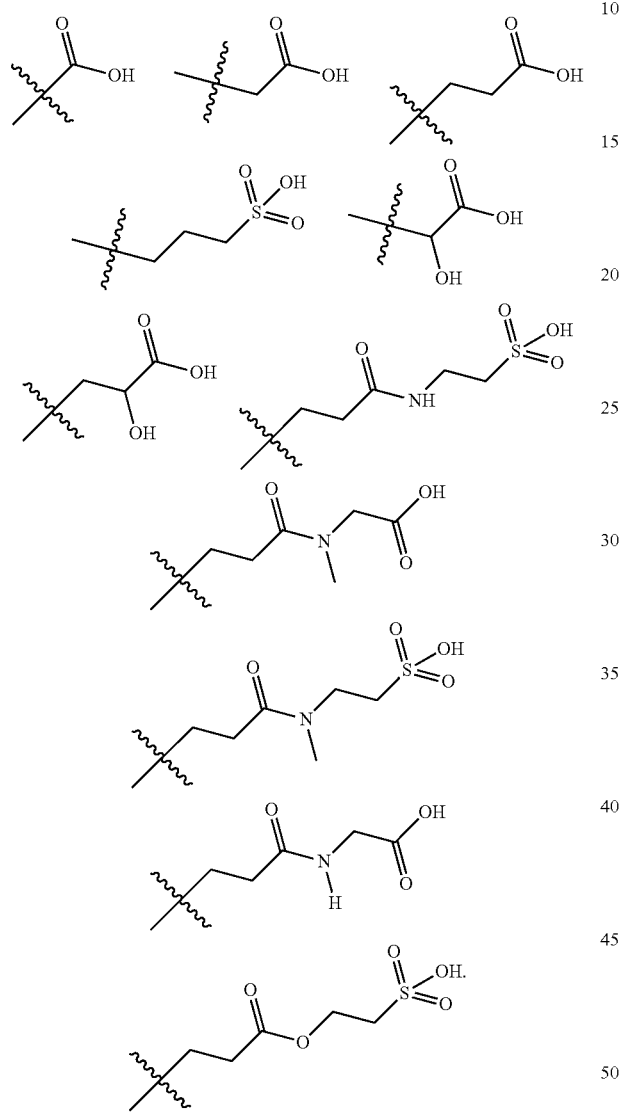

(18) The compound of any preceding enumerated example embodiment wherein X—$R^1$ is

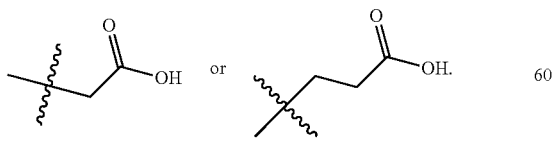

(19) A pharmaceutically acceptable salt, hydrate, stereoisomer or prodrug of a compound of the enumerated example embodiments provided herein.

(20) A compound having the structure:

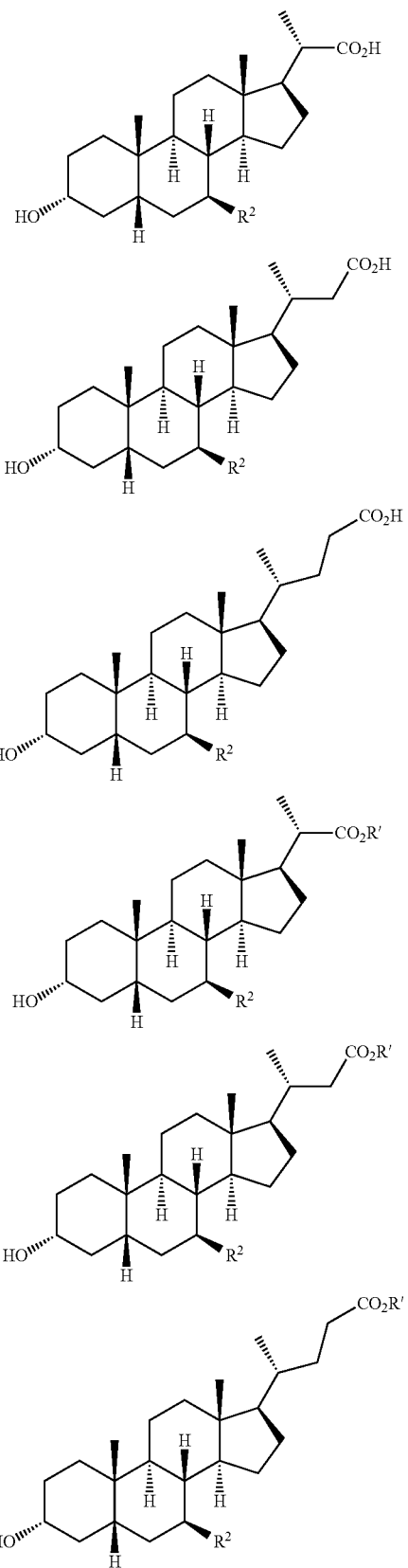

-continued
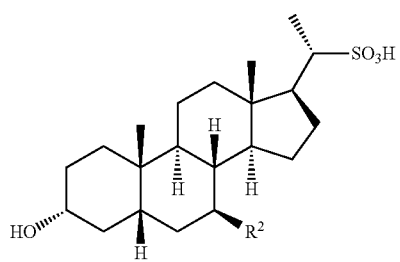
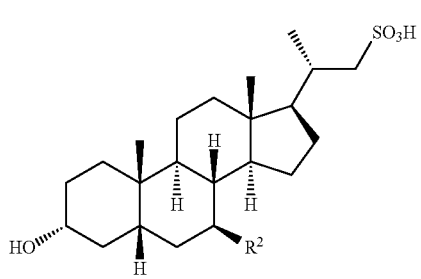
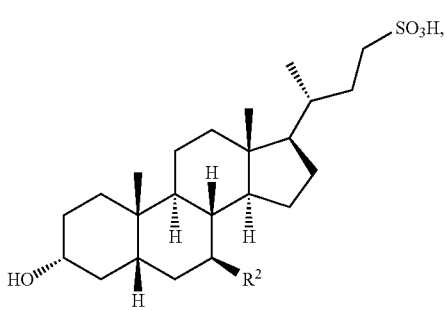
or a pharmaceutically acceptable salt, hydrate, stereoisomer or prodrug thereof.
(21) The compound having the formula:
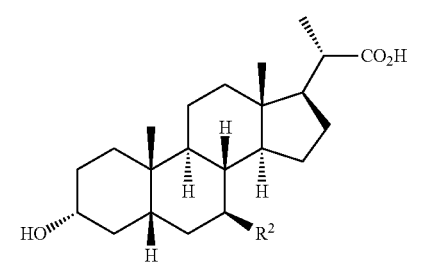
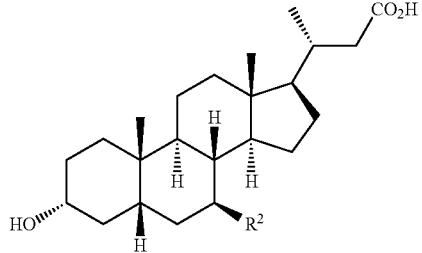
-continued
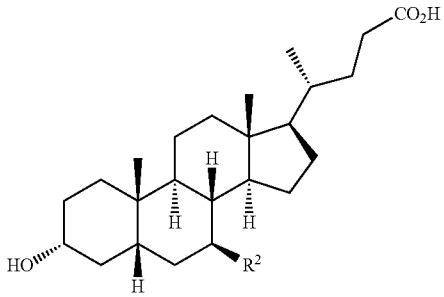
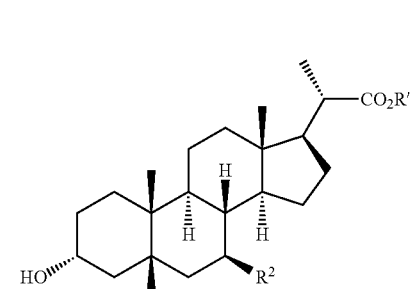
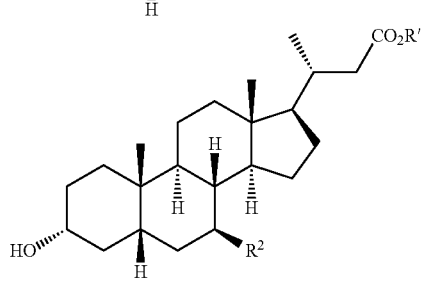
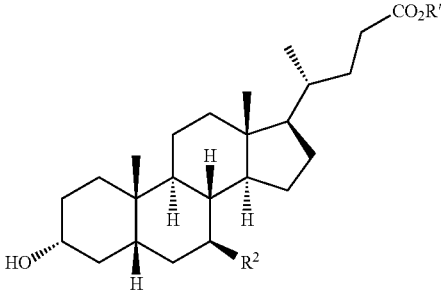
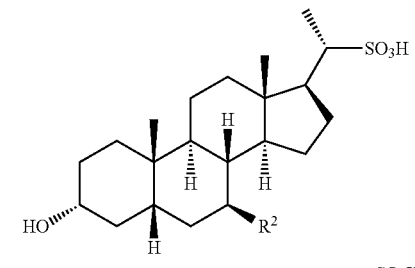
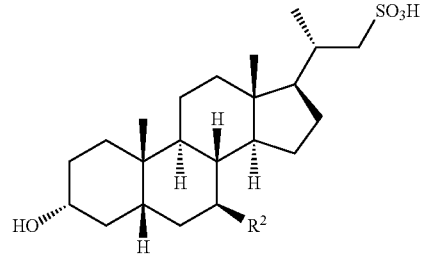

-continued

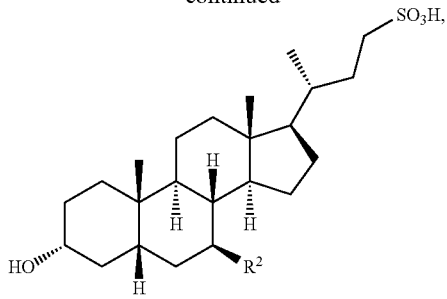

where R² is selected from:

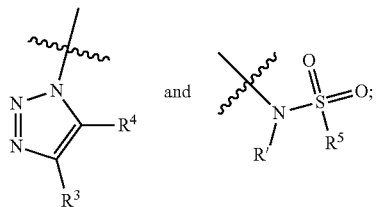

and

R³ is H, —C₁-C₁₂ aliphatic optionally substituted with one or more of O, S, hydroxyl, amino, amido, sulfonyl, sulphonamide, thiol, carboxyl, cyano, nitro, —C₁-C₆ alkyl, —C₃-C₆ cycloalkyl, —C₁-C₆ alkoxy, —C₁-C₆ thioalkyl, oxo, —C(O)O—C₁-C₆ alkyl, —OC(O)O—C₁-C₆alkyl, —C(O)NR'R', —N(R')C(O)NR'R', —N(R')C(O)O—C₁-C₆alkyl, —NR'R^A2;

R⁴ is H, halo, or —C₁-C₃ alkyl; and

R⁵ is —C₁-C₁₂ aliphatic optionally substituted with one or more of O, S, hydroxyl, amino, amido, sulfonyl, sulphonamide, thiol, carboxyl, cyano, nitro, C₁-C₆ alkyl, C₁-C₆cycloalkyl, —C₁-C₆ alkoxy, —C₁-C₆ thioalkyl, oxo, —C(O)O—C₁-C₆ alkyl, —OC(O)O—C₁-C₆-alkyl, —C(O)NR'R', —N(R')C(O)NR'R', —N(R')C(O)O—C₁-C₆alkyl, C₃-C₆ cycloalkyl;

R' is independently selected, for each occurrence, from the group consisting of hydrogen, —C₁-C₆ alkyl optionally substituted with R^A1;

R^A1 is hydrogen, carboxylate, —CO₂H, sulfonate or —C₁-C₆ alkyl, optionally substituted with one or more of hydroxyl, —C₃-C₆cycloalkyl, —C₁-C₆ alkenyl, —C₁-C₆ alkoxyl, carboxylate, —CO₂H, sulfonate;

R^A2 is R^A1, —C(O)R^A1, —C₆-C₁₂ aryl, —C₆-C₁₂ alkaryl, —C₆-C₁₂ alkenaryl, —SO₂—C₁-C₆ alkyl, —SO₂—C₆-C₁₂ aryl;

or a pharmaceutically acceptable salt, hydrate, stereoisomer, or prodrug thereof.

(22) The compound having the formula:

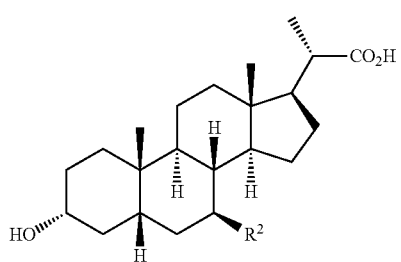

-continued

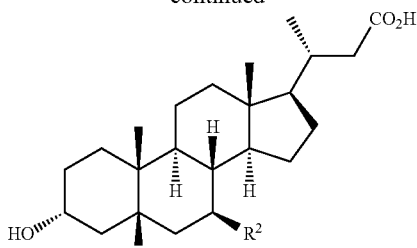

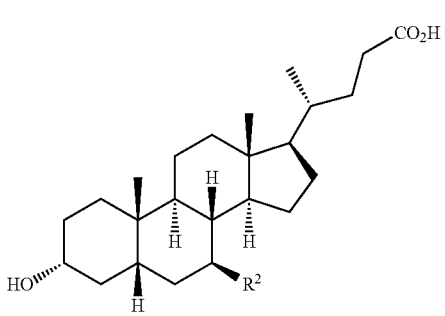

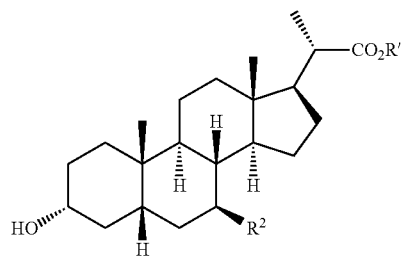

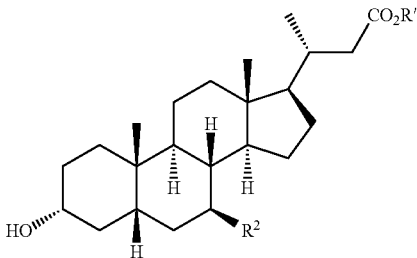

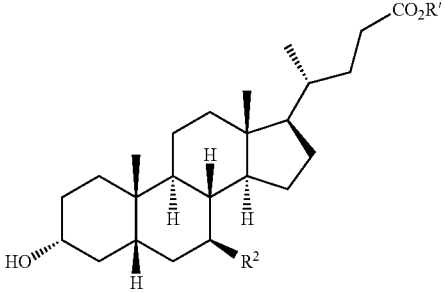

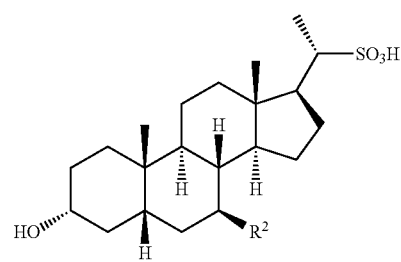

-continued

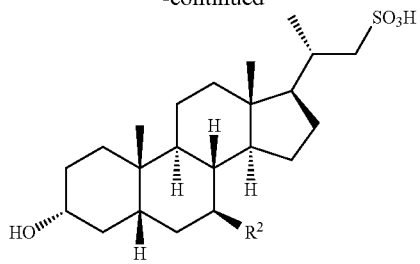

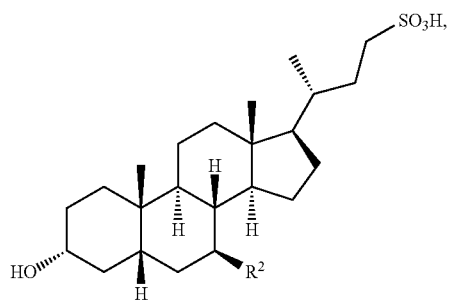

where R² is selected from:

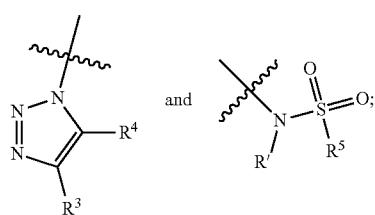

R³ is H, or —C₁-C₁₂ aliphatic;
R⁴ is H, halo, or —C₁-C₃ alkyl;
R⁵ is —C₁-C₁₂ aliphatic; and
R' is H, or C₁-C₆ alkyl;
or a pharmaceutically acceptable salt, hydrate, stereoisomer, or prodrug thereof.

(23) The compound according to any preceding enumerated example embodiment wherein R⁴ is —H and R' is —H.

(24) The compound having the formula:

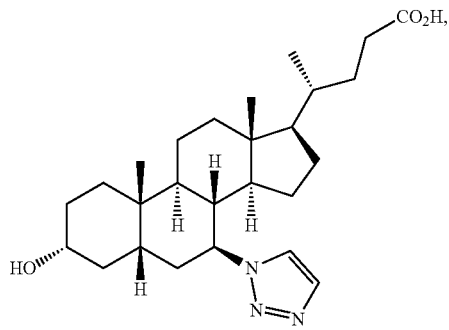

-continued

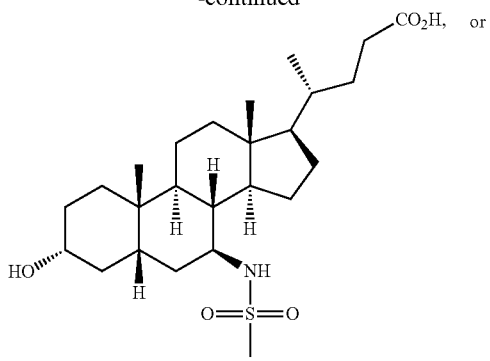

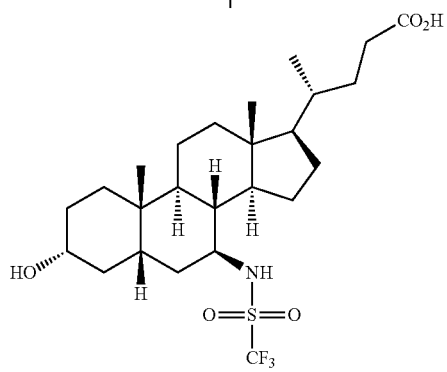

or a pharmaceutically acceptable salt, hydrate, stereoisomer or prodrug thereof.

(25) A method for manufacturing the compounds of the disclosed herein comprising the steps of:
(i) providing chenodeoxycholic acid;
(ii) selectively activating the 7-hydroxyl group of chenodeoxycholic acid;
(iii) forming the 7-azido derivative of the compound of step (ii);
(iv) reacting the 7-azido group to form a compound as disclosed herein.

(26) A pharmaceutical composition comprising the compounds of the present disclosure and a pharmaceutically acceptable carrier and/or excipient.

(27) A compound or pharmaceutical composition as described herein, for use in the treatment of and/or prevention of liver disease.

(28) The compound or pharmaceuitical composition as described in enumerated example embodiment 27, wherein the liver disease is cholestatic liver disease or non-cholestatic liver disease.

(29) The compound or pharmaceutical composition according to enumerated example embodiment 28, wherein the cholestatic liver disease is selected from primary sclerosing cholangitis (PSC), primary biliary cirrhosis (PBC) or progressive familial intrahepatic cholestasis, in particular progressive familial intrahepatic cholestasis type 1, 2 and 3, cystic fibrosis, drug-induced liver injury, such as drug induced cholestasis.

(30) The compound or pharmaceutical composition according to enumerated example embodiment 28, wherein the non-cholestatic liver disease may be selected from chronic viral hepatitis (B, C, D), non-alcoholic fatty liver disease, alcoholic or non-alcoholic steatohepatitis, autoimmune hepatitis, hemochromatosis, Wilson disease or alpha-1-antitrypsin deficiency, liver carcinoma, suitably hepatocellular carcinoma and cholangiocarcinoma.

(31) A method for treating and/or preventing liver disease comprising administering to a patient in need thereof a therapeutically effective amount of a compound or pharmaceutical composition according to the present disclosure.
(32) The method for treating and/or preventing liver disease according to enumerated example embodiment 31, wherein the liver disease is a cholestatic liver disease or a non-cholestatic liver disease.
(33) The method for treating and/or preventing liver disease according to enumerated example embodiment 31, wherein the cholestatic liver disease is selected from primary sclerosing cholangitis (PSC), primary biliary cirrhosis (PBC) or progressive familial intrahepatic cholestasis, in particular progressive familial intrahepatic cholestasis type 1, 2 and 3, cystic fibrosis, drug-induced cholestasis.
(34) The method for treating and/or preventing liver disease according to enumerated example embodiment 31, wherein the non-cholestatic liver disease is selected from chronic viral hepatitis (B, C, D), non-alcoholic fatty liver disease, alcoholic or non-alcoholic steatohepatitis, autoimmune hepatitis, hemochromatosis, Wilson disease or alpha-1-antitrypsin deficiency, liver carcinoma, suitably hepatocellular carcinoma and cholangiocarcinoma.

Compound Synthesis

Synthesis of 7β-bile Acid Derivatives

At the outset the present inventors sought to synthesize 7β-amino ursodeoxycholic acid, which could be subsequently derivatised to form a library of bile acid derivatives for biological evaluation. The development of a viable synthetic route to 7β-amino ursodeoxycholic acid proved very challenging, with various theoretical synthetic routes proving not to be viable when attempted in the laboratory. For example an oxime-based strategy for the synthesis of the amine and subsequent amidation was considered at the outset as oxidation of the 7-hydroxy compound to the corresponding ketone had previously been reported. However, the resulting oxime could not be converted to the desired amine in good yield, thereby requiring an alternative synthetic route to the amine to be developed. The strategy outlined below proved more fruitful.

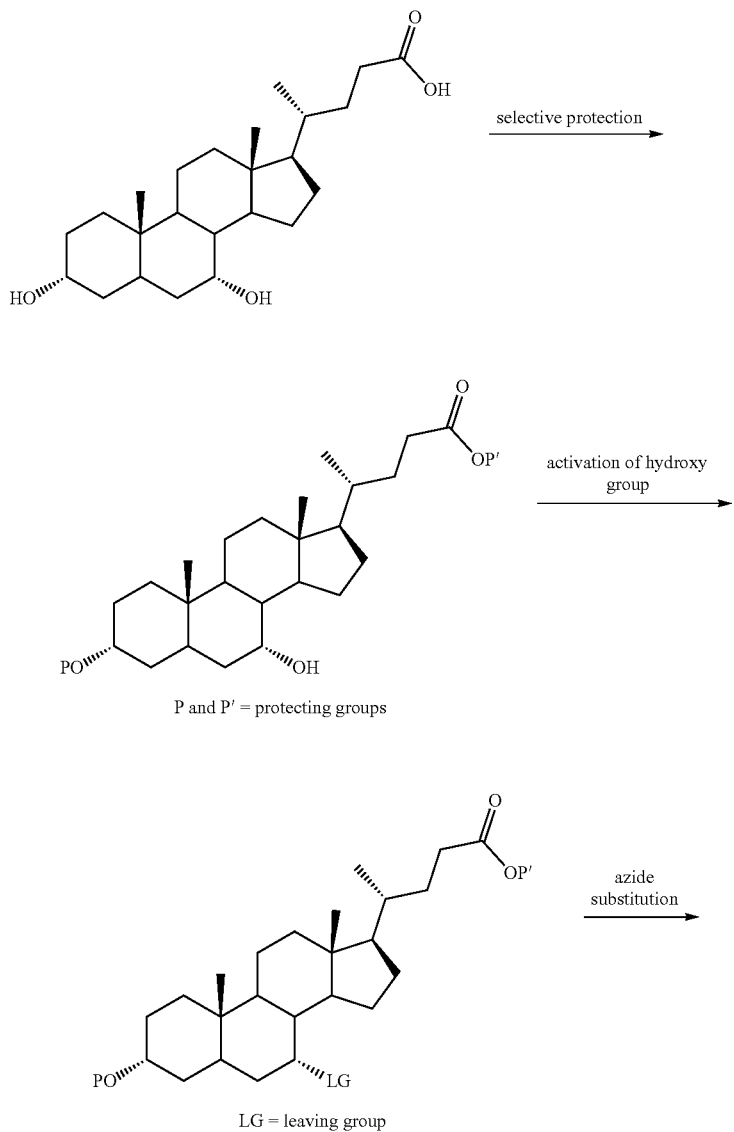

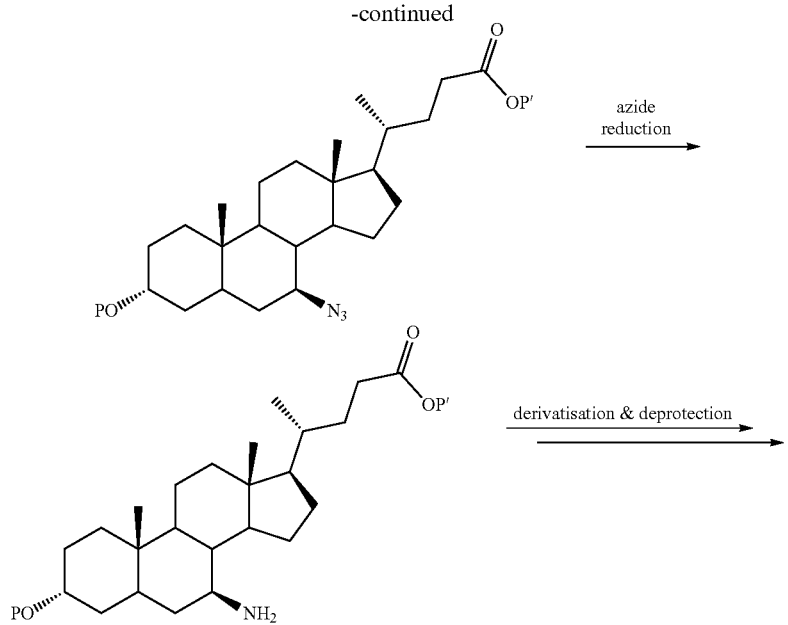

The following is an optimised route to the 7β-azido ursodeoxycholic acid derivative, which could subsequently be reduced to form the corresponding 7β-amino species which was reacted in situ to form a plethora of ursodeoxycholic acid derivatives for biological evaluation. Surprisingly, attempts to mesylate the 7-hydroxy group with mesyl chloride and trimethylamine were not successful, however, when pyridine was employed the desired mesylate was obtained in good yield.

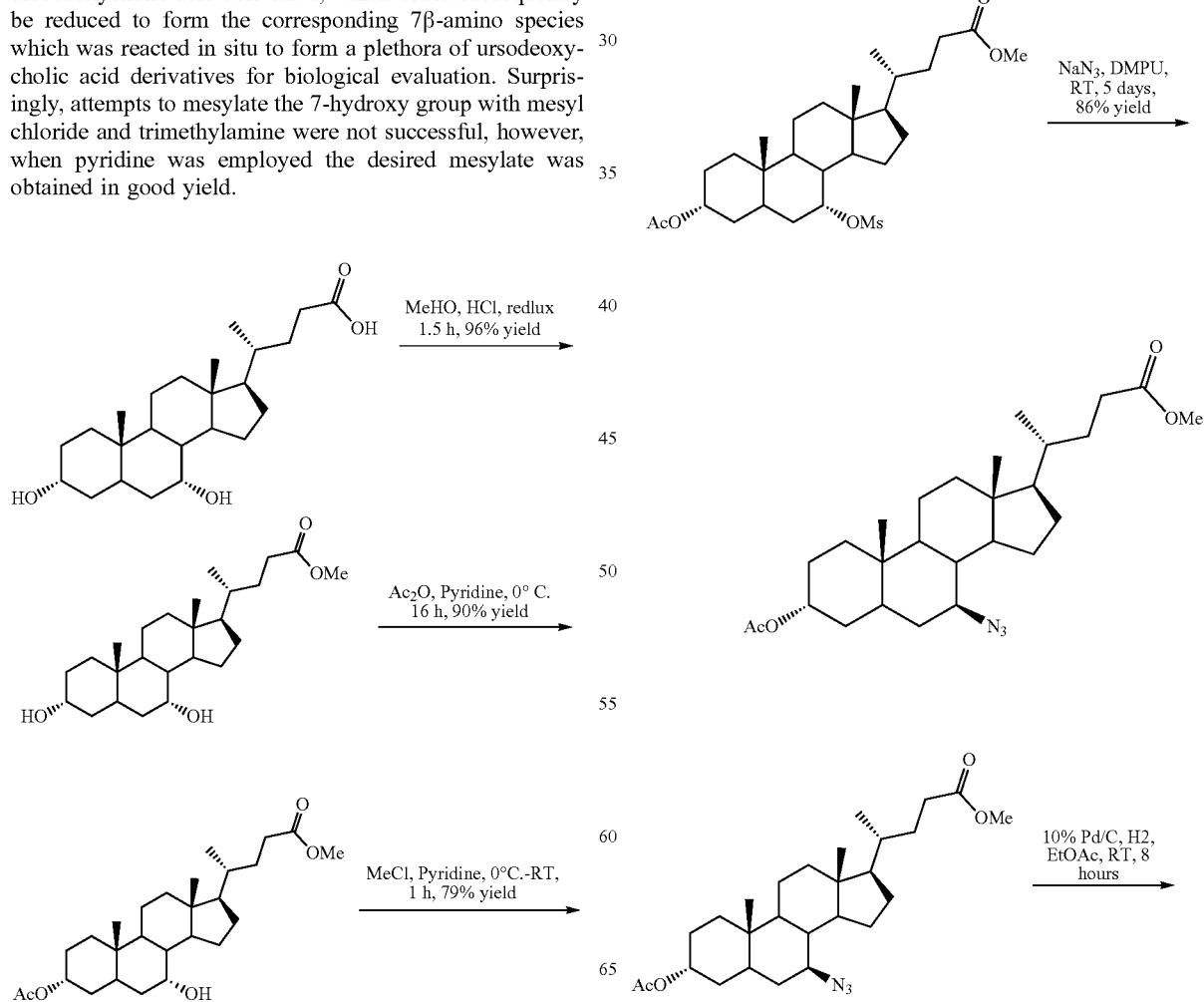

-continued

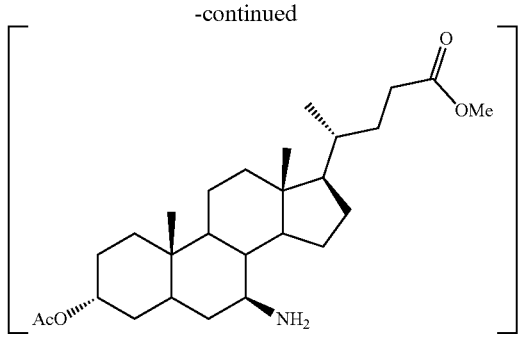

amine intermediate (not isolated)

1) 2M NaOH, MeOH, pH 14, redlux, 1 h
2) R—X—LG, Et₃N, 0° C.-RT, 8 hours

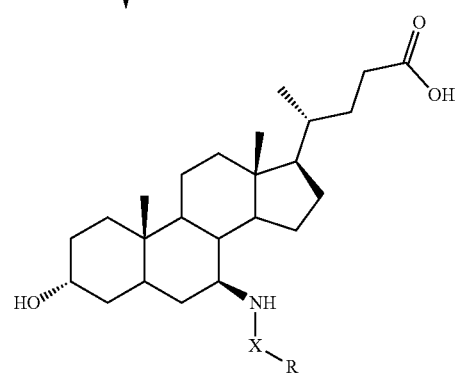

Representative compounds synthesized by the above route are shown in Table 1.

| R | X | LG | Compound No. |
|---|---|---|---|
| Methyl | C=O | Cl | 16 |
| Phenyl | C=O | Cl | 17 |
| 4-Bromophenyl | C=O | Cl | 18 |
| 4-fluorophenyl | C=O | Cl | 19 |
| 4-chlorophenyl | C=O | Cl | 20 |
| methyl | —SO₂— | Cl | 21 |
| ethyl | —SO₂— | Cl | 22 |
| propyl | —SO₂— | Cl | 23 |
| phenyl | —SO₂— | Cl | 24 |
| 5-naphthyl | —SO₂— | Cl | 25 |

With a viable synthetic route to the bis-protected 7β-azido ursodeoxycholic acid (14) and indeed 7β-amino ursodeoxy- cholic acid (15) in hand, the formation of heterocyclic derivatives was also investigated.

A feasibility study was initially carried out to assess whether the copper catalysed click reaction could furnish the 1,2,3-triazole derivatives by reacting the bis-protected 7β-azido ursodeoxycholic acid with an alkyne. The feasibility study was conducted using a copper sulfate catalyst, in the presence of sodium ascorbate in a tert-butanol-water solvent mixture (see below). Phenylacetylene was employed in the test reaction.

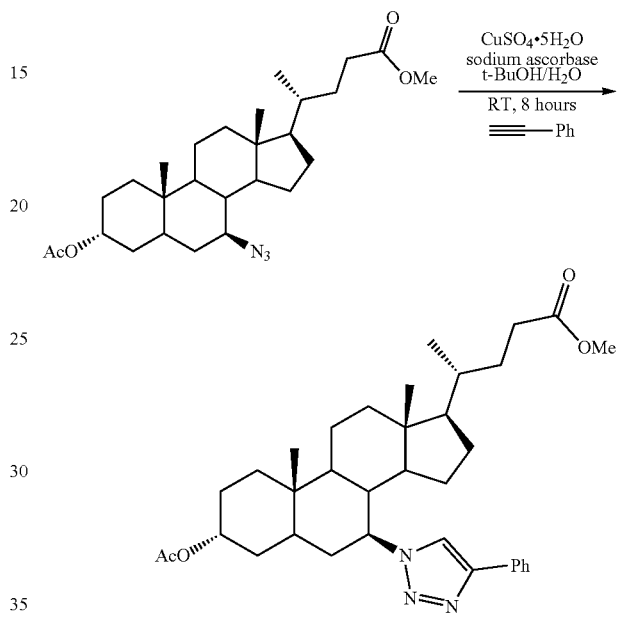

The reaction proved a success and a variety of 1,2,3-triazole analogues were subsequently formed using similar conditions.

Representative 1,2,3-triazoles are shown in Table 2.

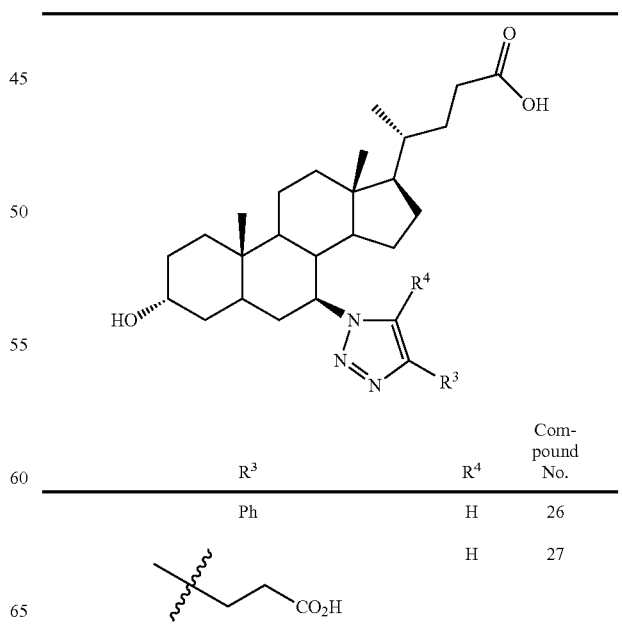

| R³ | R⁴ | Compound No. |
|---|---|---|
| Ph | H | 26 |
| ⟨CH₂CH₂CO₂H⟩ | H | 27 |

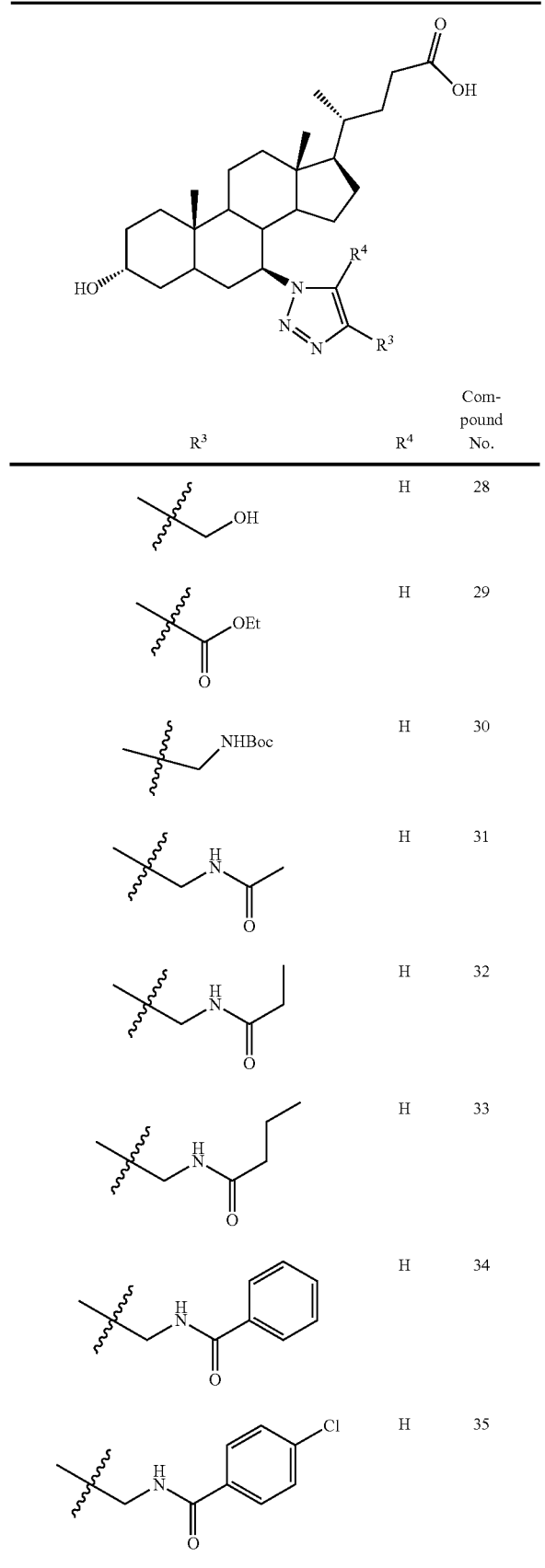

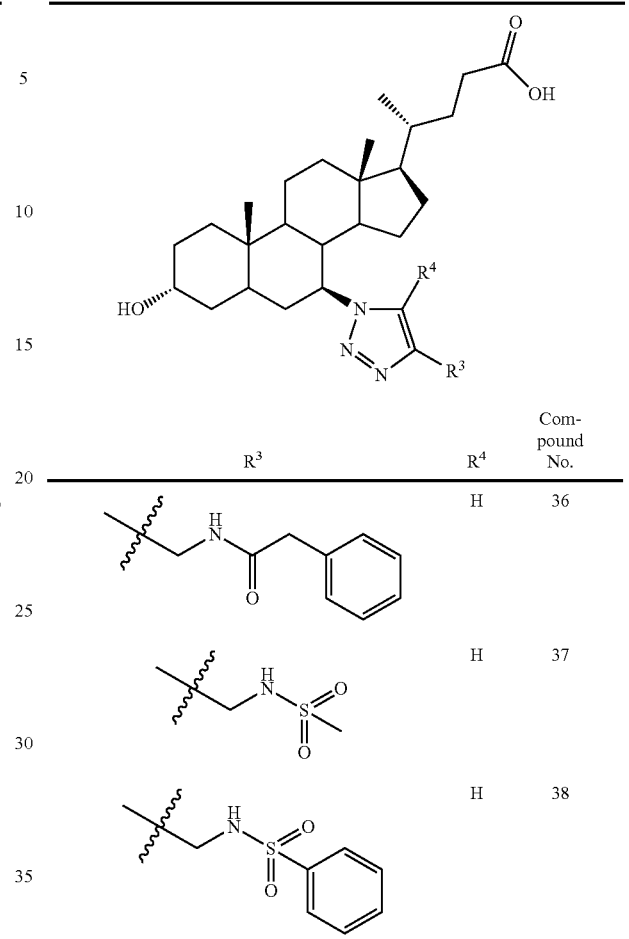

The formation of the monosubstituted 7β-triazole derivative was also investigated. Jia et al (Org. Lett. 2010, 12(9), p. 2000) demonstrated the oxidative decarboxylation of propiolic acids using a copper catalyst. This discovery was applied by Xu et al (Synthesis, 2011, p. 223) as a novel approach to forming 1-monosubstituted 1,2,3-triazoles. They made dual use of copper catalysis by using the click reaction to form the triazole along with copper-catalysed decarboxylation of propiolic acid. These reaction conditions were applied in the instant case to form the corresponding monosubstituted 7β-triazole derivative (38) from the 7β azide (14) at 60° C. in the presence of DBU to form the 1-monosubstituted triazole in moderate yield (62%). Xu et al found greater yields using sodium ascorbate, and copper iodide as a source of copper (II). After formation of 39, it could be easily deprotected at high pH to form 40 (82%).

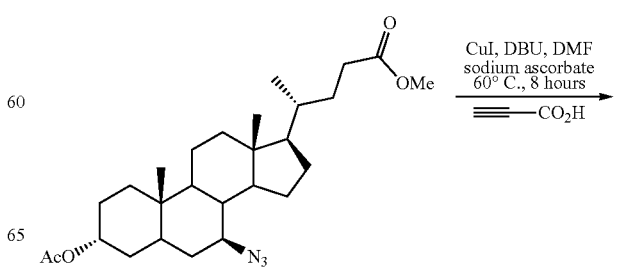

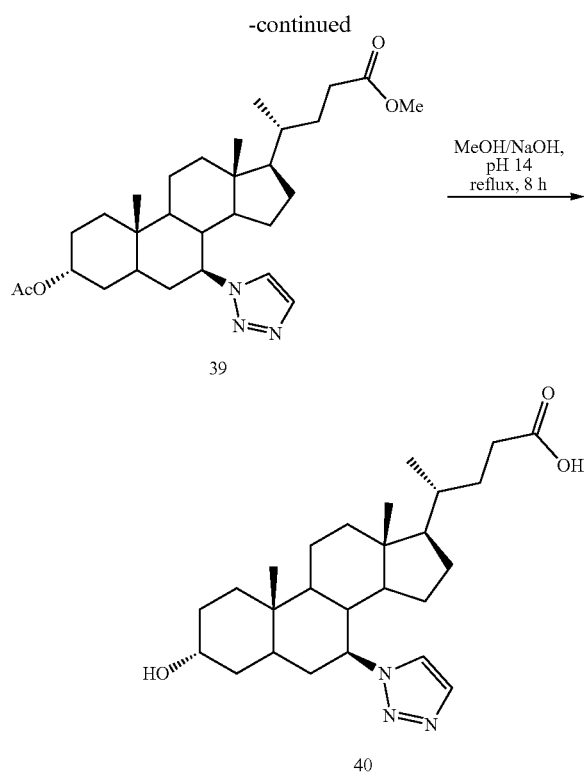

Compound Synthesis

All chemicals were purchased from Sigma-Aldrich (Dublin, Ireland), except where stated. All reactions were monitored using TLC. Uncorrected melting points were measured on a Stuart SMP11 melting point apparatus. Infra-red (IR) spectra were performed on an Elmer 205 FT infrared Paragon 1000 spectrometer. Band positions are given in cm-1. 1H and 13C nuclear magnetic resonance (NMR) spectra were recorded at 27° C. on a Bruker DPX 400 and an Agilent 400MR DD2 spectrometer (400.13 MHz, 1H; 100.61 MHz, 13C) using tetramethylsilane as internal standard. Recorded shifts are reported in parts per million ($\delta$) and calibrated using residual undeuterated solvent. Coupling constants are reported in Hertz. For 1H-NMR assignments, chemical shifts are reported: shift value (number of protons, description of absorption (s) singlet, (d) doublet, (t) triplet, (q) quartet, (m) multiplet), coupling constant(s) where applicable). High resolution mass spectrometry (HRMS) was performed on a Thermo Scientific LTQ Orbitrap Discovery System in electrospray ionization mode. Mass measurement accuracies of <5 ppm were obtained. Flash chromatography was performed on Merck Kieselgel 60 particle size 0.040-0.063 mm. Thin layer chromatography (TLC) was performed on silica gel Merck F-254 plates. Compounds were visually detected by absorbance at 254 nm and/or vanillin or ammonium molybdate staining.

24-Methyl 3α-acetoxy-7α-hydroxy-5β-cholanoate (12) To a solution of CDCA (5 g, 12.7 mmol) dissolved in MeOH (94 mL), concentrated HCl (37%, 0.53 mL, 6.35 mmol) was added drop-wise using a syringe. The mixture was stirred under reflux and left overnight. The formation of the product was followed using TLC analysis. When the reaction was complete, the solvent was removed under reduced pressure giving white, odourless solid (4.99 g, 96%). This was dissolved in DCM (30 mL) at 0° C. Acetic anhydride (8.5 mL, 86 mmol) and dry pyridine (14.6 mL, 175 mmol) were added to this mixture, warmed to room temperature and stirred. After 16 h, methanol (0.5 mL) was added to stop the reaction and the mixture was washed with water (2×50 mL), HCl (2×50 mL), NaHCO3 (1×50 mL) and brine (1×50 mL). The organic layer was dried over MgSO4 and filtered. The solvent was removed and the semi-solid residue was purified by flash column chromatography using hexane:EtOAc (3:1) to afford pure monoacetate (90%, 4.964 g) and a small amount of diacetate side product (400 mg, 7%). 1H-NMR $\delta$ (CDCl3): 0.68 (3H, s, 18-CH3), 0.95 (6H, m, 19-CH3, 21-CH3), 2.02 (3-H, s, 3-OCH3), 3.69 (3-H, s, 24-OCH3), 3.88 (1-H, m, 7β-H), 4.60 (1-H, s, 3β-H). 13C-NMR ppm (CDCl3): 51.1 (OCH3), 68.1 (7-C, CH), 73.9 (3-C, CH), 170.4 (3-OC, C=O), 174.3 (24-C, C=OCH3). IR vmax (KBr): 3531, 2943, 1737 cm$^{-1}$. HRMS: Found: (M+Na)$^+$= 471.3095, calculated $C_{27}H_{44}NaO_6^+$=471.3081.

24-Methyl 3α-acetoxy-7β-azido-5β-cholanoate (14) Methyl monoacetate (12) (500 mg, 1.114 mmol) was dissolved in dry pyridine (5 mL) and cooled to 0° C. To this methanesulfonyl chloride (2.07 mL, 5.57 mmol) was added drop-wise over 10 min while stirring. The mixture was allowed to warm to room temperature and allowed to react for 1 h, forming a dark solution. TLC analysis showed formation of two products: one with a lower Rf of 0.4 compared to 0.5 of the starting material, and one with a higher Rf of 0.8 (mobile phase ethyl acetate:hexane 1:1). The solution was dripped into cold water and then extracted with DCM (2×20 mL). The organic layers were combined and washed with HCl (6×15 mL) to neutralize the pyridine. The organic layer was dried over MgSO4 and the solvent removed in vacuo to yield an orange residue. Column chromatography of the mixture with gradient elution (hexane—1:2 ethyl acetate:hexane) gave a two white products (79% 440.2 mg mesylate, 21% 90 mg eliminate product, total yield 95.4%). The mesylate was the spot with lower Rf. The mesylate (360 mg, 1.684 mmol) was dissolved in DMPU (1 mL). This solution was then saturated with sodium azide and the mixture left at room temperature for 5 days. TLC analysis revealed formation of the azide with some eliminated side product. The mixture was partitioned between ethyl acetate and water. The organic layer was retrieved and dried over MgSO4. Column chromatography of the residue eluting with 10% EtOAc in hexane afforded a colourless sticky resin product (240 mg, 91%) and a small amount of eliminate side product (23 mg, 9%) with total yield 86%. 1H-NMR $\delta$ (CDCl3): 0.68 (3H, s, 18-CH3), 0.95 (6H, m, 19-CH3, 21-CH3), 2.03 (3H, s, 3-OCH3), 3.03 (1H, s, 7α-H), 3.67 (3H, s, 24-OCH3), 4.69 (1H, s, 3β-H). 13C-NMR ppm (CDCl3): 28.5 (OC(CH3)3, CH3), 51.5 (OCH3), 61.2 (7-C, CH), 73.5 (3-C, CH), 170.5 (3-OC, C=O), 174.6 (24-C, C=OCH3). IRvmax (KBr): 2945, 2870. 2090, 1734 cm$^{-1}$. HRMS: Found: (M+Na)+= 496.3151, calculated C27H43N3NaO4+=496.3146.

3α-hydroxy-7β-acetamido-5β-cholanoate (16): 14 (120 mg, 0.268 mmol) was reduced and reacted with triethylamine (74.8 μL, 0.5361 mmol) and acetic anhydride (37.9 μL, 0.4020 mmol) to yield a white solid (117 mg, 0.2389 mmol, 89%) after chromatography (50%-65% EtOAc in hexane). The solid (75 mg, 0.153 mmol) was hydrolysed to yield a clear resin (59 mg, 0.136 mmol, 89%). 1H-NMR $\delta$ (MeOD): 0.71 (3H, s, 18-CH3), 0.95 (6H, m, 19-CH3, 21-CH3), 1.84 (3H, s, —COCH3), 3.50 (1H, m, 3β-H), 3.76 (1H, m, 7α-H). 13C-NMR ppm (MeOD): 23.9 (OCH3, CH3), 48.5 (7-C, CH), 72.2 (3-C, CH), 171.9 (24-C, COOH). IR vmax (ATR): 2932, 2852, 1744, 1694, 1626 cm$^{-1}$. HRMS: Found: (M+Na)$^+$=456.3085, calculated $C_{26}H_{43}NNaO_4^+$=456.3084.

3α-hydroxy-7β-benzamido-5β-cholanoate (17): 14 (115 mg, 0.2569 mmol) was reduced and reacted with triethylamine (81.1 µL, 0.5138 mmol) and benzoyl chloride (44.8 µL, 0.3854 mmol) to yield a white solid (84.6 mg, 0.1533 mmol, 60%) after chromatography (20%-33% EtOAc in hexane). This was hydrolysed and purified by flash column chromatography (1-10% EtOH in DCM) to yield a white solid (34 mg, 0.069 mmol, 45%). 1H-NMR δ (CDCl3): 0.69 (3H, s, 18-CH3), 0.93 (3H, d, J=6.1 Hz, 21-CH3,), 0.97 (3H, s, 19-CH3,), 3.65 (1H, m, 3β-H), 4.10 (1H, m, 7a-H), 5.87 (1H, d, J=8.5 Hz, —NH), 7.43 (2H, m, aromatic-H), 7.49 (1H, m, aromatic-H), 7.73 (2H, d, J=7.3 Hz, aromatic-H). 13C-NMR ppm (CDCl3): 49.2 (7-C, CH), 71.5 (3-C, CH), 126.7 (aromatic-C, CH), 128.6 (aromatic-C, CH), 131.3 (aromatic-C, CH), 178.7 (24-C, COOH). IR vmax (ATR): 2930, 2865, 1739, 1698, 1630 cm$^{-1}$. HRMS: Found: (M+H)+=496.3444, calculated $C_{31}H_{46}NO_4^+$=496.3421.

3α-hydroxy-7β-(4-bromobenzamido)-5β-cholanoate (18): 14 (115 mg, 0.2569 mmol) was reduced and reacted with triethylamine (81.1 µL, 0.5138 mmol) and 4-bromobenzoyl chloride (84.6 mg, 0.3854 mmol) to yield a white solid (104.4 mg, 0.1656 mmol, 64%) after chromatography (20% 33% EtOAc in hexane). This was hydrolysed and purified by flash column chromatography (1-10% EtOH in DCM) to yield a white solid (27.3 mg, 0.0475 mmol, 29%). Yield was poor due to spillage during workup. 1H-NMR δ (CDCl3): 0.68 (3H, s, 18-CH3), 0.93 (3H, d, J=6.1 Hz, 21-CH3,), 0.96 (3H, s, 19-CH3,), 3.64 (1H, m, 3β-H), 4.07 (1H, m, 7α-H), 5.84 (1H, d, J=9.2 Hz, —NH), 7.58 (4H, m, aromatic-H). 13C-NMR ppm (CDCl3): 50.7 (7-C, CH), 72.3 (3-C, CH), 126.9 (aromatic-C, C), 130.2 (aromatic-C, CH), 132.9 (aromatic-C, CH), 134.5 (aromatic-C, C). IRvmax (ATR): 2929, 2866, 1739, 1698 cm$^{-1}$. HRMS: Found: (M+H)+=574.2539, calculated $C_{31}H_{45}BrNO_4^+$=574.2526.

3α-hydroxy-7β-(4-fluorobenzamido)-5β-cholanoate (19): 14 (115 mg, 0.2569 mmol) was reduced and reacted with triethylamine (81.1 µL, 0.5138 mmol) and 4-fluorobenzoyl chloride (45.5 µL, 0.3854 mmol) to yield a white solid (89.1 mg, 0.1564 mmol, 61%) after chromatography (20% 33% EtOAc in hexane). This was hydrolysed and purified by flash column chromatography (1-10% EtOH in DCM) to yield an off-white solid (9 mg, 0.0147 mmol, 9%). Yield was poor due to spillage during workup. 1H-NMR δ (CDCl3): 0.69 (3H, s, 18-CH3), 0.94 (3H, d, J=6.1 Hz, 21-CH3,), 0.97 (3H, s, 19-CH3,), 3.63 (1H, m, 3β-H), 4.10 (1H, m, 7α-H), 5.75 (1H, d, J=8.5 Hz, —NH), 7.11 (2H, d, J=8.5 Hz, aromatic-H), 7.73, d, J=8.5 Hz, aromatic-H). 1H-NMR δ (MeOD): 0.76 (3H, s, 18-CH3), 0.96 (3H, d, J=6.6 Hz, 21-CH3,), 1.03 (3H, s, 19-CH3,), 3.54 (1H, m, 3β-H), 4.03 (1H, m, 7α-H), 7.19 (2H, m, aromatic-H), 7.84, m, aromatic-H). 13C-NMR ppm (MeOD): 49.0 (7-C, CH), 72.2 (3-C, CH), 116.4 (aromatic-C, CH), 116.6 (aromatic-C, CH), 130.9 (aromatic-C, C), 131.0 (aromatic-C, CH), 167.9 (24-C, COOH). IR vmax (ATR): 2929, 2868, 1738, 1698 cm$^{-1}$. HRMS: Found: (M+H)+=514.3348, calculated $C_{31}H_{45}FNO_4^+$=514.3327.

3α-hydroxy-7β-(4-chlorobenzamido)-5β-cholanoate (20): 14 (115 mg, 0.2569 mmol) was reduced and reacted with triethylamine (81.1 µL, 0.5138 mmol) and 4-chlorobenzoyl chloride (49 µL, 0.3854 mmol) to yield a white solid (80.6 mg, 0.1800 mmol, 70%) after chromatography (20%-33% EtOAc in hexane). This was hydrolysed and purified by flash column chromatography (1-10% EtOH in DCM) to yield an off-white solid (19.7 mg, 0.0372 mmol, 21%). Yield was poor due to spillage during workup. 1H-NMR δ (CDCl3): 0.69 (3H, s, 18-CH3), 0.93 (3H, d, J=6.1 Hz, 21-CH3,), 0.96 (3H, s, 19-CH3,), 3.63 (1H, m, 3β-H), 4.11 (1H, m, 7α-H), 5.86 (1H, d, J=8.5 Hz, —NH), 7.40 (2H, d, J=8.5 Hz, aromatic-H), 7.67 (d, J=8.5, aromatic-H). 13C-NMR ppm (CDCl3): 49.3 (7-C, CH), 71.4 (3-C, CH), 128.2 (aromatic-C, CH), 131.5, (aromatic-C, CH), 133.4 (aromatic-C, C), 137.5 (aromatic-C, C), 178.9 (24-C, COOH). IR vmax (ATR): 2931, 2857, 1740, 1696 cm$^{-1}$. HRMS: Found: (M+H)+=530.3056, calculated $C_{31}H_{45}ClNO_4^+$=530.3032.

3α-hydroxy-7β-(methanesulfonamido)-5β-cholanoate (21): 14 (230 mg, 0.5138 mmol) was reduced and reacted with triethylamine (143 µL, 1.028 mmol) and methanesulfonyl chloride (60 µL, 0.7077 mmol) to yield a white foam (67 mg, 0.1497 mmol, 29%) after chromatography (30%-50% EtOAc in hexane). 40.9 mg (0.074 mmol) of this was hydrolysed, yielding a white solid (25 mg, 0.532 mmol, 72%). 1H-NMR δ (MeOD): 0.71 (3H, s, 18-CH3), 0.97 (6H, m, 19-CH3, 21-CH3), 2.91 (3H, s, S—CH3), 3.28 (1H, m, 7α-H), 3.52 (1H, m, 3β-H). 13C-NMR ppm (MeOD): 43.8 (S—CH3, CH3), 54.7 (7-C, CH), 72.2 (3-C, CH), 178.5 (24-C, COOH). IR vmax (ATR): 2930, 2862, 1740, 1698, 1382, 1306, 1141 cm$^{-1}$. HRMS: Found: (M+Na)+=492.2742, calculated $C_{25}H_{43}NO_5NaS^+$=492.2760.

3α-hydroxy-7β-(ethanesulfonamido)-5β-cholanoate (22): 14 (100 mg, 0.2234 mmol) was reduced and reacted with triethylamine (34.6 µL, 0.4468 mmol) and ethanesulfonyl chloride (31.7 µL, 0.3351 mmol) to yield a clear resin (87 mg, 0.1798 mmol, 81%) after workup. The resin (25 mg, 0.0517 mmol) was hydrolysed and purified by flash column chromatography (hexane:EtOAc:AcOH 25:75:0.1) to yield a white solid (19 mg, 0.0393 mmol, 76%). 1H-NMR δ (MeOD): 0.72 (3H, s, 18-CH3), 0.97 (6H, m, 19-CH3, 21-CH3), 1.31 (3H, t, J=7.3 Hz, S—CH2CH3), 2.98 (2H, m, S—CH2CH3), 3.28 (1H, m, 7α-H), 3.52 (1H, m, 3β-H). 13C-NMR ppm (MeOD): 7.1 (S—CH2CH3, CH3), 48.2 (SCH2CH3, CH2), 53.1 (7-C, CH), 70.6 (3-C, CH), 176.7 (24-C, COOH). IR vmax (ATR): 2932, 2866, 1737, 1701, 1382, 1306, 1141 cm$^{-1}$. HRMS: Found: (M+Na)+=506.2922, calculated $C_{26}H_{45}NO_5NaS^+$=506.2911.

3α-hydroxy-7β-(propanesulfonamido)-5β-cholanoate (23): 14 (150 mg, 0.3351 mmol) was reduced and reacted with triethylamine (52 µL, 0.6702 mmol) and propanesulfonyl chloride (57 µL, 0.5026 mmol) to yield a white foam (110 mg, 0.1986 mmol, 59%) after chromatography (25% EtOAc in hexane). The foam (94 mg, 0.1697 mmol) was hydrolysed, yielding a white solid (66 mg, 0.1326 mmol, 78%). 1H-NMR δ (MeOD): 0.72 (3H, s, 18-CH3), 0.97 (6H, m, 19-CH3, 21-CH3), 1.04 (3H, t, H=7.6 Hz, S—CH2CH2CH3), 1.79 (2H, m, S—CH2CH2CH3), 2.96 (2H, m, S—CH2CH2CH3), 3.29 (1H, m, 7α-H), 3.51 (1H, m, 3β-H). 13C-NMR ppm (MeOD): (S—CH2CH2CH3, CH2), 18.5 (S—CH2CH2CH3, CH2), 58.3 (S—CH2CH2CH3, CH2), 54.7 (7-C, CH), 72.1 (3-C, CH), 176.7 (24-C, COOH). IR vmax (ATR): 2932, 2867, 1737, 1702, 1307, 1140 cm$^{-1}$. HRMS: Found: (M+Na)+=520.3056, calculated $C_{27}H_{47}NO_5NaS^+$=520.3067.

3α-hydroxy-7β-(benzenesulfonamido)-5β-cholanoate (24): 14 (150 mg, 0.3351 mmol) was reduced and reacted with triethylamine (52 µL, 0.6702 mmol) and benzenesulfonyl chloride (64 µL, 0.5026 mmol) to yield a white solid (107 mg, 0.1820 mmol, 54%) after chromatography (25% EtOAc in hexane). The solid (94 mg, 0.1599 mmol) was hydrolysed and purified by flash column chromatography (hexane:EtOAc:AcOH 50:50:0.1) to yield a white solid (63 mg, 0.1185 mmol, 74%). 1H-NMR δ (CDCl3): 0.62 (3H, s, 18-CH3), 0.83 (3H, s, 19-CH3), 0.92 (3H, d, J=6.7 Hz, 21-CH3,), 3.32 (1H, m, 7α-H), 3.52 (1H, m, 3β-H), 4.66 (1H, d, J=9.2 Hz, —NH), 7.52 (3H, m, aromatic-H), 7.83 (2H, d, J=7.3 Hz, aromatic-H). 13C-NMR ppm (CDCl3):

53.9 (7-C, CH), 71.2 (3-C, CH), 126.7 (aromatic-C, CH), 129.0 (aromatic-C, CH), 132.4 (aromatic-C, CH) 179.5 (24-C, COOH). IR vmax (ATR): 2932, 2867, 1737, 1702, 1382, 1308, 1139 cm$^{-1}$. HRMS: Found: (M+Na)+= 554.2916, calculated $C_{30}H_{45}NO_5NaS^+$=554.2911.

3α-hydroxy-7β-dansyl-5β-cholanoate (25): 14 (180 mg, 0.4020 mmol) was reduced and reacted with triethylamine (127 μL, 0.8041 mmol) and dansyl chloride (162.7 mg, 0.6030 mmol) to yield a yellow solid (65.4 mg, 0.096 mmol, 24%) after chromatography (25% EtOAc in hexane). The solid (57 mg, 0.0837 mmol) was hydrolysed and purified by flash column chromatography (DCM:EtOH:AcOH 95:5:0.01) to yield a yellow solid (32.2 mg, 0.0515 mmol, 62%). 1H-NMR δ (CDCl3): 0.64 (3H, s, 18-CH3), 0.77 (3H, s, 19-CH3,), 0.94 (3H, d, J=6.1 Hz, 21-CH3,), 2.98 (6H, s, —N(CH3)2), 3.34 (1H, m, 7α-H), 3.42 (1H, m, 3β-H), 4.42 (1H, d, J=6.7 Hz, —NH), 7.59 (4H, m, aromatic-H), 8.28 (1H, m, aromatic-H), 8.37 (1H, m, aromatic-H), 8.64 (1H, m, aromatic-H). 13C-NMR ppm (CDCl3): 54.6 (7-C, CH), 71.2 (3-C, CH), 118.8 (aromatic-C, CH), 123.4 (aromatic-C, CH), 128.3 (aromatic-C, CH), 128.9 (aromatic-C, CH), 130.1 (aromatic-C, CH), 132.0 (aromatic-C, CH) 179.1 (24-C, COOH). IR vmax (ATR): 2932, 2867, 1737, 1702, 1382, 1038, 1139 cm$^{-1}$. HRMS: Found: (M+H)+=625.3676, calculated $C_{36}H_{53}N_2O_5S^+$=625.3670.

3α-hydroxy-7β-(4-phenyl-1,2,3-triazol-1-yl)-5β-cholanoate (26): 14 (300 mg, 0.6333 mmol) was dissolved in t-butanol:H2O (1:1) (10 mL). CuSO4.5H2O (cat.) and (+)-sodium-L-ascorbate (41.1 mg, 0.209 mmol) were added and stirred until dissolved. Phenylacetylene (139 μL, 1.267 mmol) was added and allowed to react overnight until disappearance of the starting material (TLC: hexane:EtOAc 3:1). The t-butanol was removed under reduced pressure and the product extracted with DCM (3×5 mL) and washed with HCl (2×10 mL), sat. NaHCO3 (2×10 mL) and brine (2×10 mL). The organic layer was dried over MgSO4 and filtered. The solvent was removed in vacuo and the residue purified by flash column chromatography (hexane:EtOAc 4:1) to afford a white foamy solid (261.3 mg, 0.454 mmol, 72%). This solid (36.9 mg, 0.0625 mmol) was dissolved in MeOH (5 mL), 2 M NaOH solution was added to pH~14 and refluxed for 2 h. The solution was acidified with 2 M HCl and an impure orange precipitate formed (31.7 mg). This was purified using flash column chromatography (DCM:MeOH:AcOH 95:5:0.1) to afford a white solid (7.2 mg, 0.0139 mmol, 22%). 1H-NMR δ (MeOD): 0.71 (3H, s, 18-CH3), 0.94 (3H, m, 19-CH3), 1.16 (3H, s, 21-CH3) 3.56 (1-H, m, 3β-H), 4.60 (1H, brs, 7α-H), 7.31 (1H, m, aromatic-H), 7.41 (2H, m, aromatic-H), 7.8 (2H, d, J=7.3 Hz, aromatic H). 13C-NMR ppm (MeOD):, 63.2 (7-C, CH), 72.0 (3-C, CH), 126.8 (aromatic-C, CH), 129.4 (aromatic-C, CH), 130.1 (aromatic-C, CH), 132.0 (aromatic-C, C). IR vmax (ATR): 3566, 2941, 2865, 1737, 1389, 1321, 1147, 1089, 1067 cm$^{-1}$. HRMS: Found: (M+H)+=520.3544, calculated $C_{32}H_{46}N_3O_3^+$=520.3534.

3α-hydroxy-7β-(4-(2-carboxyethyl)-1,2,3-triazol-1-yl)-5β-cholanoate (27): 14 (250 mg, 0.5278 mmol) was dissolved in t-butanol:H2O (1:1) (5 mL). CuSO4.5H2O (cat.) and (+)-sodium-L-ascorbate (34.8 mg, 0.1758 mmol) were added and stirred until dissolved. 4-Pentynoic acid (94.5 μL, 1.056 mmol) was added and allowed to react overnight until disappearance of the starting material (TLC: hexane:EtOAc 1:4). The t-butanol was removed under reduced pressure and the product extracted with DCM (3×5 mL) and washed with HCl (2×10 mL), sat. NaHCO3 (2×10 mL) and brine (2×10 mL). The organic layer was dried over MgSO4 and filtered. The solvent was removed in vacuo and the residue purified by flash column chromatography (hexane:EtOAc:AcOH 3:1:0.01) to afford a white foam (156 mg, 0.2728 mmol, 52%). 21.8 mg of this solid (0.0381 mmol) was dissolved in MeOH (5 mL), 2 M NaOH solution was added to pH~14 and refluxed for 2 h. The solution was acidified with 2 M HCl and a white solid precipitate formed which was filtered and allowed to dry (14.7 mg, 0.0285 mmol, 75%). 1H-NMR δ (MeOD): 0.66 (3H, s, 18-CH3), 0.92 (3H, d, J=0.92 Hz, 19-CH3), 1.10 (3H, s, 21-CH3), 2.64 (2H, brs, —CH2CH2COOH), 2.95 (2H, brs, —CH2CH2COOH), 3.56 (1-H, m, 3β-H), 4.52 (1H, m, 7α-H), 7.83 (1H, s, triazole-H). 13C-NMR ppm (MeOD): 19.0 (—CH2CH2COOH, CH2), 32.4 (—CH2CH2COOH, CH2), 62.8 (7-C, CH), 72.0 (3-C, CH), 176.6 (24-C, —COOH). IR vmax (ATR): 3567, 2934, 2865, 1737, 1381, 1321, 1147, 1089, 1067 cm-1. HRMS: Found: (M−H)−=514.3282, calculated $C_{29}H_{44}N_3O_5^-$=514.3286.

3α-hydroxy-7β-(4-hydroxymethyl-1,2,3-triazol-1-yl)-5β-cholanoate (28): 14 (250 mg, 0.5278 mmol) was dissolved in t-butanol:H2O (1:1) (5 mL). CuSO4.5H2O (cat.) and (+)-sodium-L-ascorbate (34.8 mg, 0.1758 mmol) were added and stirred until dissolved. Propargyl alcohol (62 μL, 1.056 mmol) was added and allowed to react overnight until disappearance of the starting material (TLC: hexane:EtOAc 1:4). The t-butanol was removed under reduced pressure and the product extracted with DCM (3×5 mL) and washed with HCl (2×10 mL), sat. NaHCO3 (2×10 mL) and brine (2×10 mL). The organic layer was dried over MgSO4 and filtered. The solvent was removed in vacuo and the residue purified by flash column chromatography (hexane:EtOAc 1:4) to afford a white solid (108.8 mg, 0.2054 mmol, 39%). This solid (54 mg, 0.1019 mmol) was dissolved in MeOH (5 mL), 2 M NaOH solution was added to pH ~14 and refluxed for 2 h. The solution was acidified with 2 M HCl and a white solid precipitate formed which was purified using flash column chromatography to afford a white solid product (19.1 mg, 0.0403 mmol, 40%). 1H-NMR δ (MeOD): 0.66 (3H, s, 18-CH3), 0.91 (3H, m, 19-CH3), 1.10 (3H, s, 21-CH3), 3.55 (1-H, m, 3β-H), 4.62 (1H, m, 7α-H), 4.76 (2H, s, —CH2OH), 7.46 (1H, s, triazole-H). 13C-NMR ppm (MeOD): 56.7 (—CH2OH, CH2), 62.4 (7-C, CH), 72.0 (3-C, CH), 176.6 (24-C, —COOH). IR vmax (ATR): 3565, 2934, 2866, 1737, 1789, 1322, 1147, 1089, 1068 cm-1. HRMS: Found: (M−H)−=472.3172, calculated $C_{27}H_{42}N_3O_4^-$=472.3181.

3α-hydroxy-7β-(4-ethoxycarbonyl-1,2,3-triazol-1-yl)-5β-cholanoate (29): 14 (250 mg, 0.5278 mmol) was dissolved in t-butanol:H2O (1:1) (5 mL). CuSO4.5H2O (cat.) and (+)-sodium-L-ascorbate (34.8 mg, 0.1758 mmol) were added and stirred until dissolved. Ethyl propiolate (107 μL, 1.056 mmol) was added and allowed to react overnight until disappearance of the starting material (TLC: hexane:EtOAc 1:4). The t-butanol was removed under reduced pressure and the product extracted with DCM (3×5 mL) and washed with HCl (2×10 mL), sat. NaHCO3 (2×10 mL) and brine (2×10 mL). The organic layer was dried over MgSO4 and filtered. The solvent was removed in vacuo and the residue purified by flash column chromatography under gradient elution (hexane:EtOAc 3:1-1:3) to afford a white solid (55 mg, 0.0962 mmol, 18%). This was dissolved in MeOH (5 mL), 2 M NaOH solution was added to pH~14 and stirred at room temperature overnight rather than at reflux so as to avoid cleavage of the ethyl ester. The solution was acidified with 2 M HCl and a white solid precipitate formed which was filtered and allowed to dry (32.3 mg, 0.0626 mmol, 65%). 1H-NMR δ (MeOD): 0.67 (3H, s, 18-CH3), 0.91 (3H, m, 19-CH3), 1.10 (3H, s, 21-CH3), 1.37 (3H, t, J=7 Hz, —OCH2CH3). 3.55 (1H, m, 3β-H), 4.37 (2H, q, J=7.3 Hz, —OCH2CH3) 4.65 (1H, 7α-H), 8.01 (1H, s, triazole-H). 13C-NMR ppm (MeOD): 14.3 (OCH2CH3, CH3), 54.6 (7-C, CH), 61.3 (OCH2CH3, CH2), 70.4 (3-C, CH), 176.6 (24-C, —COOH). IRvmax (ATR): 3566, 2935, 2856, 1737, 1388, 1322, 1148, 1089, 1067 cm-1. HRMS: Found: (M+Na)+=538.3253, calculated C29H45N3NaO5+= 538.3251.

3α-hydroxy-7β-(4-N-Boc-aminomethyl)-1,2,3-triazol-1-yl)-5β-cholanoate (30): Propargylamine hydrochloride (400 mg, 4.37 mmol) and triethylamine (1.2 mL, 8.74 mmol) were dissolved in THF (10 mL) on ice, and Boc2O (1.14 g, 5.24 mmol) was added. The reaction was stirred for 1 h, when TLC analysis (hexane:EtOAc 1:4) showed disappearance of the hydroxylamine starting material. The solvent was removed under reduced pressure and the product was dissolved in EtOAc (10 mL) and washed with HCl (2×5 mL), sat. NaHCO3 (2×5 mL), brine (2×5 mL), passed through a short plug of silica and flushed with EtOAc. The solvent was removed in vacuo to yield an off-white solid (125 613.8 mg, 4.35 mmol, 99%). This solid (55 mg, 0.3895 mmol) was dissolved in t-butanol:H2O (1:1) (5 mL). CuSO4.5H2O (cat.) and (+)-sodium-L-ascorbate (20.6 mg, 0.1039 mmol) were added and stirred until dissolved. The azide 41 (123 mg, 0.2597 mmol) was added and allowed to react overnight until disappearance of the starting material (TLC: DCM:EtOH 95:5). The t-butanol was removed under reduced pressure and the product extracted with EtOAc (3×5 mL) and washed with water (2×10 mL), and brine (2×10 mL). The organic layer was dried over MgSO4 and filtered. The solvent was removed in vacuo and the residue purified by flash column chromatography (DCM:EtOH 95:5) to afford a white solid (83 mg, 0.2148 mmol, 83%). This was dissolved in MeOH (5 mL), 2 M NaOH solution was added to pH~14 and refluxed for 2 h. The solution was acidified with 2 M HCl and a white solid precipitate formed which was filtered and allowed to dry (89.5 mg, 0.1563 mmol, 89%). 1H-NMR δ (MeOD): 0.67 (3H, s, 18-CH3), 0.93 (3H, d, J=6.1 Hz, 19-CH3), 1.14 (3H, s, 21-CH3), 1.43 (9H, s, —OC(CH3)3), 3.55 (1H, m, 3β-H), 4.27 (2H, s, —CH2NHBoc), 4.67 (1H, 7α-H), 7.89 (1H, s, triazole-H). 13C-NMR ppm (MeOD): 28.9 (—OC(CH3)3, CH3), 54.6 (7-C, CH), 70.4 (3-C, CH), 75.3 (—OC(CH3)3, CH3), 176.6 (24-C, —COOH). IR vmax (ATR): 3570, 2935, 2865, 1737, 1698, 1388, 1322, 1148, 1067 cm-1. HRMS: Found: (M+H)+=573.3998, calculated C32H53N4O5+=573.4010.

General Procedure for Synthesis of Propargylamine-Derived Amidomethyl 7β-1,2,3-triazole UDCA Compounds Propargylamine hydrochloride (100 mg, 1.09 mmol) and triethylamine (182.6 μL, 1.31 mmol) were dissolved in THF (5 mL) on ice, and an acid chloride (1.64 mmol) (or suitably a sulfonyl chloride) was added. The reaction was stirred for 1 h. The solvent was removed under reduced pressure and the product was dissolved in EtOAc (10 mL) and washed HCl (2×5 mL), sat. NaHCO3 (2×5 mL), brine (2×5 mL), dried over MgSO4 and filtered. The solvent was removed in vacuo to yield amide intermediates. These were dissolved in t-butanol:H2O (1:1) (5 mL). CuSO4.5H2O (cat.) and (+)-sodium-L-ascorbate were added and stirred until dissolved. The azide 14 was added to each and allowed to react overnight until disappearance of the starting material (TLC: DCM:EtOH 95:5). The t-butanol was removed under reduced pressure and the product extracted with EtOAc (3×5 mL) and washed with water (2×10 mL), and brine (2×10 mL). The organic layer was dried over MgSO4 and filtered. The solvent was removed in vacuo and the residue purified by flash column chromatography (DCM:EtOH 95:5) to afford the protected triazole intermediates. These were dissolved in MeOH (5 mL), 2 M NaOH solution was added to pH~14 and refluxed for 2 h. The solutions were acidified with 2 M HCl and a white solid precipitate formed which was filtered and allowed to dry.

3α-hydroxy-7β-(4-acetamidomethyl-1,2,3-triazol-1-yl)-5β-cholanoate (31): Acetyl chloride (116.6 μL, 1.64 mmol) was reacted with propargyl amine hydrochloride as per general procedure to yield an impure white solid which was purified by gradient flash column chromatography (hexane:EtOAc 3:1-EtOAc) to afford a white solid (20 mg, 0.2059 mmol, 18%). This solid (9.5 mg, 0.0978 mmol) was reacted with azide 14 (46.3 mg, 0.0978 mmol) to yield a white solid (26.4 mg, 0.0463 mmol, 47%). Deprotection of this intermediate (18.8 mg, 0.033 mmol) yielded a white solid (12.1 mg, 0.0235 mmol, 71%). 1H-NMR δ (MeOD): 0.68 (3H, s, 18-CH3), 0.93 (3H, d, J=6.1 Hz, 19-CH3), 1.12 (3H, s, 21-CH3), 3.58 (1-H, m, 3β-H), 4.47 (2H, s, —CH2NH—), 4.69 (1H, m, 7α-H), 8.28 (1H, s, triazole-H). 13C-NMR ppm (MeOD): 22.4 (COCH3, CH3), 35.3 (—CH2NH—, CH2), 64.5 (7-C, CH), 71.9 (3-C, CH), 173.7 (COCH3, C), 176.5 (24-C, —COOH). IRvmax (ATR): 2932, 2866, 1737, 1701, 1376, 1324, 1149, 1054 cm-1. HRMS: Found: (M–H)−=513.3433, calculated C29H45N4O4−=513.3446.

3α-hydroxy-7β-(4-propionamidomethyl)-1,2,3-triazol-1-yl)-5β-cholanoate (32): Propionyl chloride (142.5 μL, 1.64 mmol) was reacted with propargyl amine hydrochloride as per general procedure to yield a white solid (31 mg, 0.279 mmol, 17%). This solid (13 mg, 0.117 mmol) was reacted with azide 14 (55.4 mg, 0.117 mmol) to yield a yellow solid (36.6 mg, 0.626 mmol, 54%). Deprotection of this intermediate (23.9 mg, 0.0409 mmol) yielded a white solid (15.8 mg, 0.0299 mmol, 73%). 1H-NMR δ (MeOD): 0.68 (3H, s, 18-CH3), 0.93 (3H, d, J=6.1 Hz, 19-CH3), 1.12 (3H, s, 21-CH3), 1.12 (3H, t, J=7.9 Hz, —COCH2CH3), 2.24 (q, J=7.5 Hz, —COCH2CH3), 3.57 (1-H, m, 3β-H), 4.44 (2H, s, —CH2NH—), 4.63 (1H, m, 7α-H), 8.12 (1H, s, triazole-H). 13C-NMR ppm (MeOD): 10.4 (COCH2CH3, CH3), 31.9 (COCH2CH3, CH2), 35.3 (—CH2NH—, CH2), 63.8 (7-C, CH), 71.7 (3-C, CH), 176.4 (COCH3, C), 178.1 (24-C, —COOH). IR vmax (ATR): 2933, 2866, 1737, 1701, 1376, 1324, 1150, 1053 cm-1. HRMS: Found: (M–H)−=527.3597, calculated C30H47N4O4−=527.3603.

3α-hydroxy-7β-(4-butyramidomethyl)-1,2,3-triazol-1-yl)-5β-cholanoate (33): Butyryl chloride (171.7 μL, 1.64 mmol) was reacted with propargyl amine hydrochloride as per general procedure to yield a white solid (41.1 mg, 0.328 mmol, 20%). This solid (10.6 mg, 0.0847 mmol) was reacted with azide 14 (40.1 mg, 0.0847 mmol) to yield a yellow solid (43.2 mg, 0.0721 mmol, 85%). Deprotection of this intermediate (32.5 mg, 0.0543 mmol) yielded a white solid (15.2 mg, 0.028 mmol, 52%). 1H-NMR δ (MeOD): 0.67 (3H, s, 18-CH3), 0.93 (3H, d, J=6.52 Hz, 21-CH3), 0.92 (3H, t, J=7.9 Hz, —CH2CH2CH3), 0.93 (3H, s, 19-CH3,), 1.12 (3H, s, 21-CH3), 1.63 (2H, m, —CH2CH2CH3) 2.21 (2H, t, J=7.5 Hz, —CH2CH2CH3), 3.58 (1H, m, 3β-H), 4.46 (2H, s, —CH2NH—), 4.68 (1H, m, 7α-H), 8.23 (1H, s, triazole-H). 13C-NMR ppm (MeOD): 14.2 (—CH2CH2CH3, CH3), 20.4 (—CH2CH2CH3, CH2), 31.9 (—CH2CH2CH3, CH2), 35.0 (—CH2NH—, CH2), 64.3 (7-C, CH), 71.9 (3-C, CH), 176.4 (COCH3, C). IR vmax (ATR): 2933, 2867, 1737, 1701, 1376, 1326, 1156, 1054 cm-1. HRMS: Found: (M–H)−=541.3765, calculated C31H49N4O4−=541.3759.

3α-hydroxy-7β-(4-benzamidomethyl)-1,2,3-triazol-1-yl)-5β-cholanoate (34): Benzoyl chloride (190.4 μL, 1.64 mmol) was reacted with propargyl amine hydrochloride as per general procedure to yield a white solid (92 mg, 0.578 mmol, 35%). This solid (28 mg, 0.1759 mmol) was reacted with azide 14 (83.3 mg, 0.1759 mmol) to yield an impure solid (157 mg) which was further purified by flash column chromatography to afford a white product (99.8 mg, 0.1578 mmol, 90%). Deprotection of this intermediate (58 mg, 0.0917 mmol) yielded a white solid (36 mg, 0.0624 mmol, 68%). 1H-NMR δ (MeOD): 0.64 (3H, s, 18-CH3), 0.92 (3H, d, J=6.7 Hz, 19-CH3), 1.11 (3H, s, 21-CH3), 3.56 (1-H, m, 3β-H), 4.58 (1H, m, 7α-H), 4.62 (2H, s, —CH2NH—), 7.45 (2H, m, aromatic-H), 7.53 (1H, m, aromatic-H), 7.83 (2H, m, aromatic-H), 7.98 (1H, s, triazole-H). 13C-NMR ppm (MeOD): 35.1 (—CH2NH—, CH2), 65.9 (7-C, CH), 71.1 (3-C, CH), 127.1 (aromatic-C, CH), 128.5 (aromatic-C, CH), 131.6 (aromatic-C, C), 133.9 (aromatic-C, C), 167.5 (—NHCO, C), 177.9 (24-C, —COOH). IR vmax (ATR): 2932, 2867, 1737, 1698, 1376, 1326, 1157, 1053 cm-1. HRMS: Found: (M−H)−=575.3597, calculated C34H47N4O4−=575.3603.

3α-hydroxy-7β-(4-(2-phenylacetamido)methyl)-1,2,3-triazol-1-yl)-5β-cholanoate (36): Phenylacetyl chloride (217.3 µL, 1.64 mmol) was reacted as per general procedure to yield an impure white solid which was purified by gradient flash column chromatography (hexane:EtOAc 3:1-2:1) to afford a white solid (50 mg, 0.289 mmol, 18%). This solid (18.8 mg, 0.1085 mmol) was reacted with azide 14 (51.4 mg, 0.1085 mmol) to yield an impure solid (74 mg) which was further purified by gradient flash column chromatography (EtOH 0-5% in DCM) to afford a white product (55.5 mg, 0.0858 mmol, 79%). Deprotection of this intermediate (38.1 mg, 0.0589 mmol) yielded a white solid (34 mg, 0.0575 mmol, 98%). 1H-NMR δ (MeOD): 0.64 (3H, s, 18-CH3), 0.94 (3H, d, J=6.7 Hz, 19-CH3), 1.10 (3H, s, 21-CH3), 3.52 (2H, s, —COCH2) 3.57 (1-H, m, 3β-H), 4.41 (2H, s, —CH2NH—), 4.52 (1H, m, 7α-H), 7.23 masked by CDCl3 (2H, m, aromatic-H), 7.25 masked by CDCl3 (2H, m, aromatic-H), 7.27 masked by CDCl3 (1H, m, aromatic-H), 7.76 (1H, s, triazole-H). 13C-NMR ppm (MeOD): 35.3 (—CH2NH—, CH2), 62.9 (7-C, CH), 72.0 (3-C, CH), 128.1 (aromatic-C, C), 129.8 (aromatic-C, CH), 130.2 (aromatic-C, CH, 137.0 (aromatic-C, C), 174.1 (—NHCO, C), 178.3 (24-C, —COOH). IR vmax (ATR): 2932, 2867, 1737, 1698, 1376, 1327, 1157, 1054 cm-1. HRMS: Found: (M+H)+= 591.3919, calculated C35H51N4O4+=591.3905.

3α-hydroxy-7β-(4-methanesulfonamidomethyl)-1,2,3-triazol-1-yl)-5β-cholanoate (37): Methanesulfonyl chloride (127.5 µL, 1.64 mmol) was reacted as per general procedure with propargyl amine hydrochloride to yield an impure white solid which was purified by flash column chromatography (hexane:EtOAc 2:1) to afford a colourless oil (93 mg, 0.698 mmol, 43%). This oil (24.6 mg, 0.1846 mmol) was reacted with azide 14 (87.5 mg, 0.1846 mmol) to yield a white solid (107 mg, 0.1765 mmol, 96%). Deprotection of this intermediate (43.3 mg, 0.0714 mmol) yielded a white solid (34.8 mg, 0.0632 mmol, 88%). 1H-NMR δ (MeOD): 0.69 (3H, s, 18-CH3), 0.94 (3H, d, J=6.7 Hz, 19-CH3), 1.12 (3H, s, 21-CH3), 2.93 (3H, s, —SO2CH3), 3.58 (1-H, m, 3β-H), 4.36 (2H, s, —CH2NH—), 4.61 (1H, m, 7α-H), 8.06 (1H, s, triazole-H). 13C-NMR ppm (MeOD): 35.3 (—CH2NH—, CH2), 40.8 (—SO2CH3, CH3), 63.2 (7-C, CH), 72.0 (3-C, CH), 178.1 (24-C, —COOH). IR vmax (ATR): 2933, 2867, 1736, 1702, 1375, 1324, 1148, 1053 cm-1. HRMS: Found: (M−H)−=549.3102, calculated C28H45N4O5S−=549.3116.

3α-hydroxy-7β-(4-benzenesulfonamidomethyl)-1,2,3-triazol-1-yl)-5β-cholanoate (38): Benzenesulfonyl chloride (209.3 µL, 1.64 mmol) was reacted as per general procedure with propargyl amine hydrochloride to yield an impure white solid which was purified by flash column chromatography (hexane:EtOAc 3:1) to afford a colourless oil (150 mg, 0.768 mmol, 47%). This oil (20 mg, 0.1024 mmol) of this was reacted with azide 14 (48.5 mg, 0.1024 mmol) to yield a white solid (60.4 mg, 0.0904 mmol, 88%). Deprotection of this intermediate (32 mg, 0.0479 mmol) yielded a white solid (21 mg, 0.343 mmol, 72%). 1H-NMR δ (MeOD): 0.66 (3H, s, 18-CH3), 0.93 (3H, d, J=6.7 Hz, 19-CH3), 1.10 (3H, s, 21-CH3), 3.57 (1-H, m, 3β-H), 4.20 (2H, s, —CH2NH—), 4.54 (1H, m, 7α-H), 7.57 (2H, m, aromatic-H), 7.64 (1H, m, aromatic-H), 7.87 (2H, m, aromatic-H). 13C-NMR ppm (MeOD): 39.1 (—CH2NH—, CH2), 63.4 (7-C, CH), 72.0 (3-C, CH), 128.2 (aromatic-C, CH), 130.4 (aromatic-C, CH), 134.0 (aromatic-C, C), 142.0 (aromatic-C, C), 176.5 (24-C, —COOH). IR vmax (ATR): 2932, 2867, 1736, 1702, 1375, 1325, 1153, 1053 cm-1. HRMS: Found:(M+H)+= 613.3437, calculated C33H49N4O5S+=613.3418.

3α-hydroxy-7β-(4-(4-chlorobenzamido)methyl)-1,2,3-triazol-1-yl)-5β-cholanoate (35): 4-Chlorobenzoyl chloride (210.3 µL, 1.64 mmol) was reacted as per general procedure with propargyl amine hydrochloride to yield an impure white solid which was purified by flash column chromatography (hexane:EtOAc 3:1) to afford a white solid (115.9 mg, 0.594 mmol, 36%). This solid (23 mg, 0.1188 mmol) was reacted with azide 14 (56.3 mg, 0.1188 mmol) to yield an impure solid (77.1 mg) which was further purified by gradient flash column chromatography (EtOH 0-5% in DCM) to afford a white product (69.9 mg, 0.1048 mmol, 88%). Deprotection of this intermediate (56.8 mg, 0.0852 mmol) yielded a white solid (23.4 mg, 0.383 mmol, 45%). 1H-NMR δ (MeOD): 0.64 (3H, s, 18-CH3), 0.92 (3H, d, J=6.6 Hz, 19-CH3), 1.10 (3H, s, 21-CH3), 3.56 (1-H, m, 3β-H), 4.56 (1H, m, 7α-H), 4.60 (2H, s, —CH2NH—), 7.46 (2H, m, aromatic-H), 7.81 (2H, m, aromatic-H), 7.99 (1H, s, triazole-H). 13C-NMR ppm (MeOD): 36.6 (—CH2NH—, CH2), 63.0 (7-C, CH), 72.0 (3-C, CH), 129.9 (aromatic-C, CH), 130.3 (aromatic-C, CH), 134.1 (aromatic-C, C), 139.1 (aromatic-C, C), 169.0 (—NHCO, C), 178.2 (24-C, —COOH). IRvmax (ATR): 2932, 2868, 1736, 1702, 1375, 1325, 1152 cm-1. HRMS: Found: (M+H)+=611.3402, calculated C34H48ClN4O4+=611.3359.

3α-hydroxy-7β-(1H-1,2,3-triazol-1-yl)-5β-cholanoate (40): 14 (142 mg, 0.3 mmol) was dissolved in DMF (2 mL). DBU (22.6 µL, 0.15 mmol), CuSO4.5H2O (cat.) and (+)-sodium-L-ascorbate (24 mg, 0.12 mmol) were added and stirred until dissolved. Propiolic acid (28.2 µL, 0.45 mmol) was added and allowed to react at 60° C. overnight until disappearance of the starting material (TLC: hexane:EtOAc 1:1). The solvent was removed under reduced pressure and the product dissolved in EtOAc (10 mL) and washed with H2O (2×10 mL) and brine (2×10 mL), dried over MgSO4 and filtered. The solvent was removed in vacuo and the residue purified by flash column chromatography (DCM: EtOH 95:5) to afford a white solid (86.7 mg, 0.1735 mmol, 58%). This solid (70 mg, 0.14 mmol) was dissolved in MeOH (5 mL), 2M NaOH solution was added to pH~14 and stirred at room temperature overnight. The solution was acidified with 2 M HCl and a white solid precipitate was filtered and allowed to dry (51.1 mg, 0.115 mmol, 82%). 1H-NMR δ (MeOD): 0.68 (3H, s, 18-CH3), 0.94 (3H, d, J=6.1 Hz, 19-CH3), 1.13 (3H, s, 21-CH3), 3.60 (1-H, m, 3β-H), 4.66 (1H, m, 7α-H), 4.86 (2H, s, —CH2NH—), 7.77 (1H, s, triazole-H), 8.16 (1H, s, triazole-H). 13C-NMR ppm (MeOD): 62.9 (7-C, CH), 72.0 (3-C, CH), 178.1 (24-C, —COOH). IR vmax (ATR): 2934, 2866, 1736, 1701, 1376, 1323, 1149, 1089 cm-1. HRMS: Found: (M+H)+=444.3216, calculated $C_{26}H_{42}N_3O_3+$=444.3221.

As outlined above, the compounds of the invention may be obtained using chenodeoxycholic acid as a starting material. The stereochemistry of the core A, B, C, D ring structure of the products corresponds with that of UDCA.

Biological Studies

Metabolism of UDCA

Following oral administration of UDCA, approximately 30-60% is absorbed, with around 80% of this occurring in the small intestine via passive diffusion. After absorption, UDCA enters the portal circulation and actively enters the hepatocyte via the Na+/taurocholate co-transporting polypeptide (NTCP). There it is efficiently conjugated with glycine or taurine which decreases its pKa, increasing solubility and polarity and further reducing intrinsic toxicity.

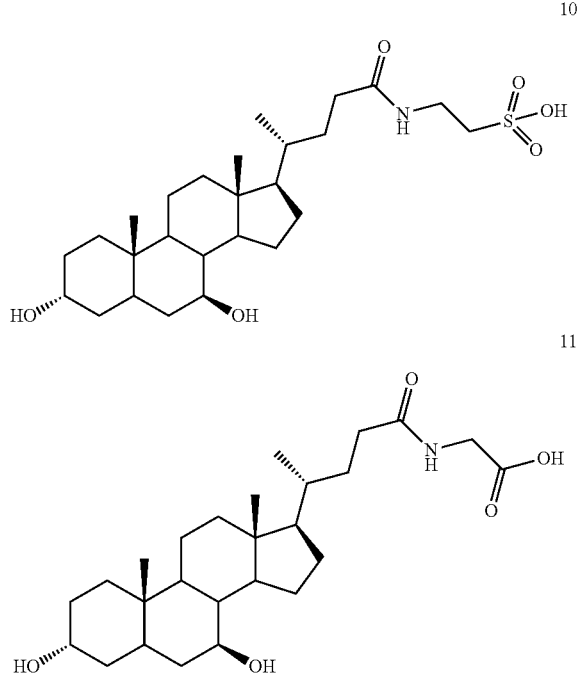

N-acyl amidation of UDCA by the amino acid taurine leads to the formation of tauroursodeoxycholic acid (TUDCA, 10), and amidation of UDCA by the amino acid glycine leads to the formation of glycoursodeoxycholic acid (GUDCA, 11).

In Vitro Model for Identification of Active Compounds

In cholestatic liver disease, bile acids build up in the liver to toxic levels, causing tissue damage. UDCA therapy attenuates this and its addition to hepatocytes in cell culture is reported to increase their resistance to apoptosis and necrosis caused by more toxic bile acids such as DCA (deoxycholic acid) and glycochenodeoxycholic acid (GDCA). GCDCA is the major liver bile acid product in man. Tauroursodeoxycholic acid (TUDCA) exhibits this protective property more consistently causing some in the field to suspect that this important metabolite of UDCA contributes to its clinical effects. Concentration dependent cytoprotective properties of UDCA and TUDCA can be observed in vitro. TUDCA is weakly but consistently protective in cell-based models (in vitro) up to the mM concentration range. A protective or anti-apoptotic effect of UDCA can be observed at lower concentration but it can contribute to cell death at higher concentration (>200 μM). Cytoprotective effects are less easily observed in vitro with UDCA than with TUDCA but they are significant. UDCA has demonstrated efficacy in treating cholestatic liver disease, and this is overall consistent with its effects in vitro.

A model of bile-acid induced liver injury was developed using HUH-7 liver cancer cells growing in culture. These were treated with increasing concentrations of DCA and GCDCA and the effect monitored using cell count on a high content platform (for example on an IN Cell analyser), MTT as a measure of metabolic activity and propidium iodide (PI). PI is normally cell impermeable so cellular staining is used as a way to detect cells with damaged walls. Appearance of PI positive cells soon after treatment with bile acid and PI indicated necrosis possibly through surfactant damage to the cell wall. A reduction in cell number or metabolic activity occurred without significant PI staining is consistent with an apoptotic form of cell death. DCA caused significant cell death in the range 200-500 μM associated with apoptosis because of the low levels of PI staining. GCDCA caused reduction in cell viability at higher concentration with greater evidence of necrosis. (See FIG. 3(a) and FIG. 3(b)).

Figures 4A, 4B, 4C:
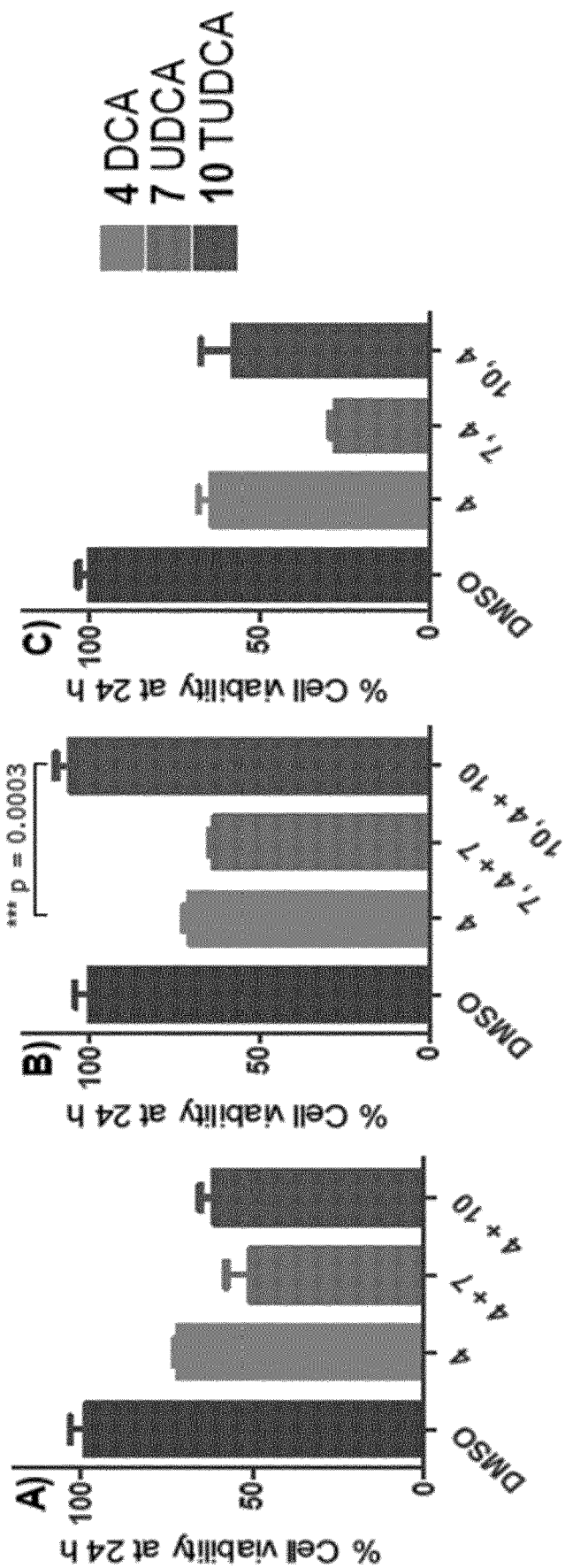
FIG. 4 shows cell viability studies for HUH7 cells treated with DCA, UDCA and TUDCA.

HUH-7 cells were then treated with UDCA and TUDCA in increasing concentration. UDCA caused significant cell death in the range 300 μM-1 mM whereas TUDCA did not (not shown). The combination of DCA and UDCA or TUDCA did not lead to increased cell viability at 24 h post treatment (FIG. 4a). However when cells were treated first with TUDCA for 24 h (middle panel FIG. 4b) and then DCA (200 μM) was added there was a significant increase in cell viability 24 h later compared to DCA alone. This indicates that pre-treatment with TUDCA (1 mM) protected the cells from the subsequent addition of DCA (200 μM). However UDCA (100 μM, 7) when added for 24 h before addition of DCA did not consistently exert a protective effect. The final panel (right, FIG. 4c) shows results for experiments in which cells were treated first with UDCA (100 μM) or TUDCA (1 mM) for 24 h and then with DCA but in these experiments UDCA or TUDCA were withdrawn. In this case the protective effect of TUDCA was not observed showing that it must continue to be present in order to exert its effects. When UDCA was withdrawn following 24 h treatment and DCA is added, the cytotoxic effect of the added DCA was increased.

Figure 5B:
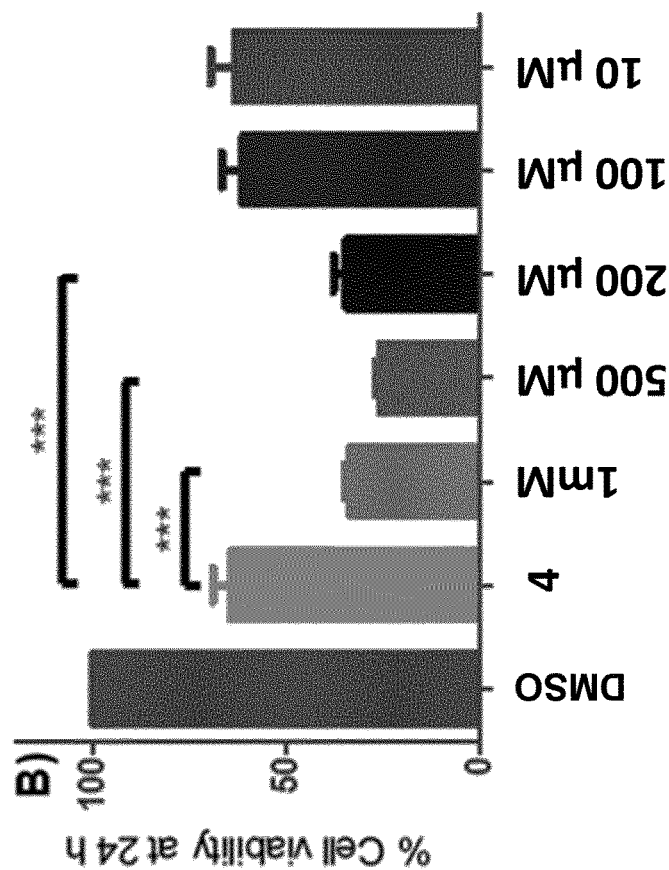
FIG. 5a and FIG. 5b show cell viability studies for HUH7 cells treated with various concentrations of TUDCA (FIG. 5a) and UDCA (FIG. 5b).
Figure 5A:
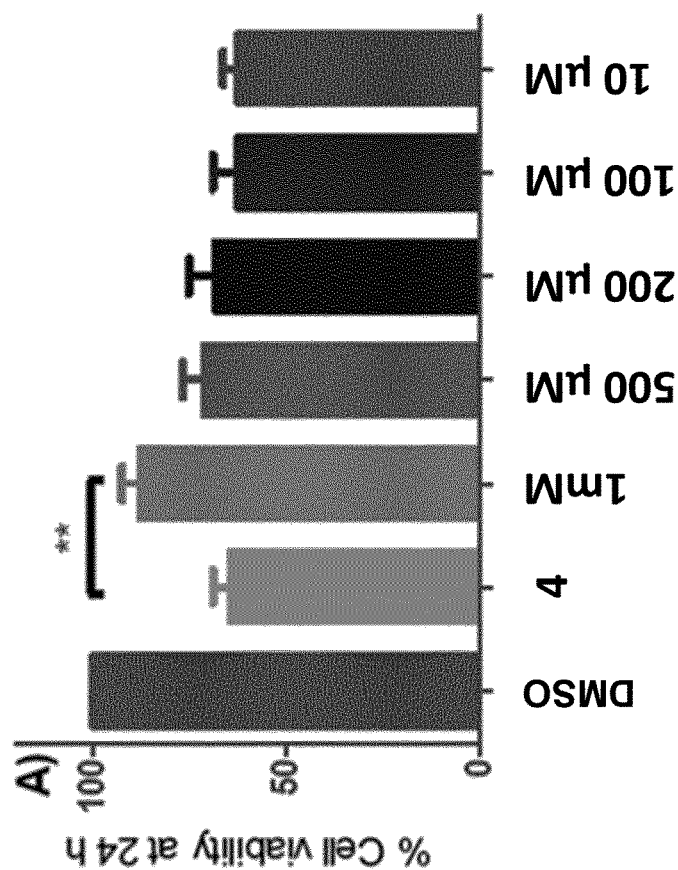

Once the cytoprotective sequence was identified, the concentration of UDCA/TUDCA was varied in order to determine the relationship between concentration and effect (see FIG. 5a and FIG. 5b). A statistically significant increase in cell viability on pre-/co-treatment was not observed at concentrations of TUDCA lower than 1 mM TUDCA. UDCA caused modest and inconsistent cytoprotective effects in this model. Similar findings were made when the studies were repeated with GCDCA which caused more necrotic cell death. TUDCA caused a significant cytoprotective effect when cells were pre-treated for 24 h and then co-treated GCDCA/TUDCA. UDCA caused a small increase in cell viability under these circumstances but this was not significant.

Figure 6:
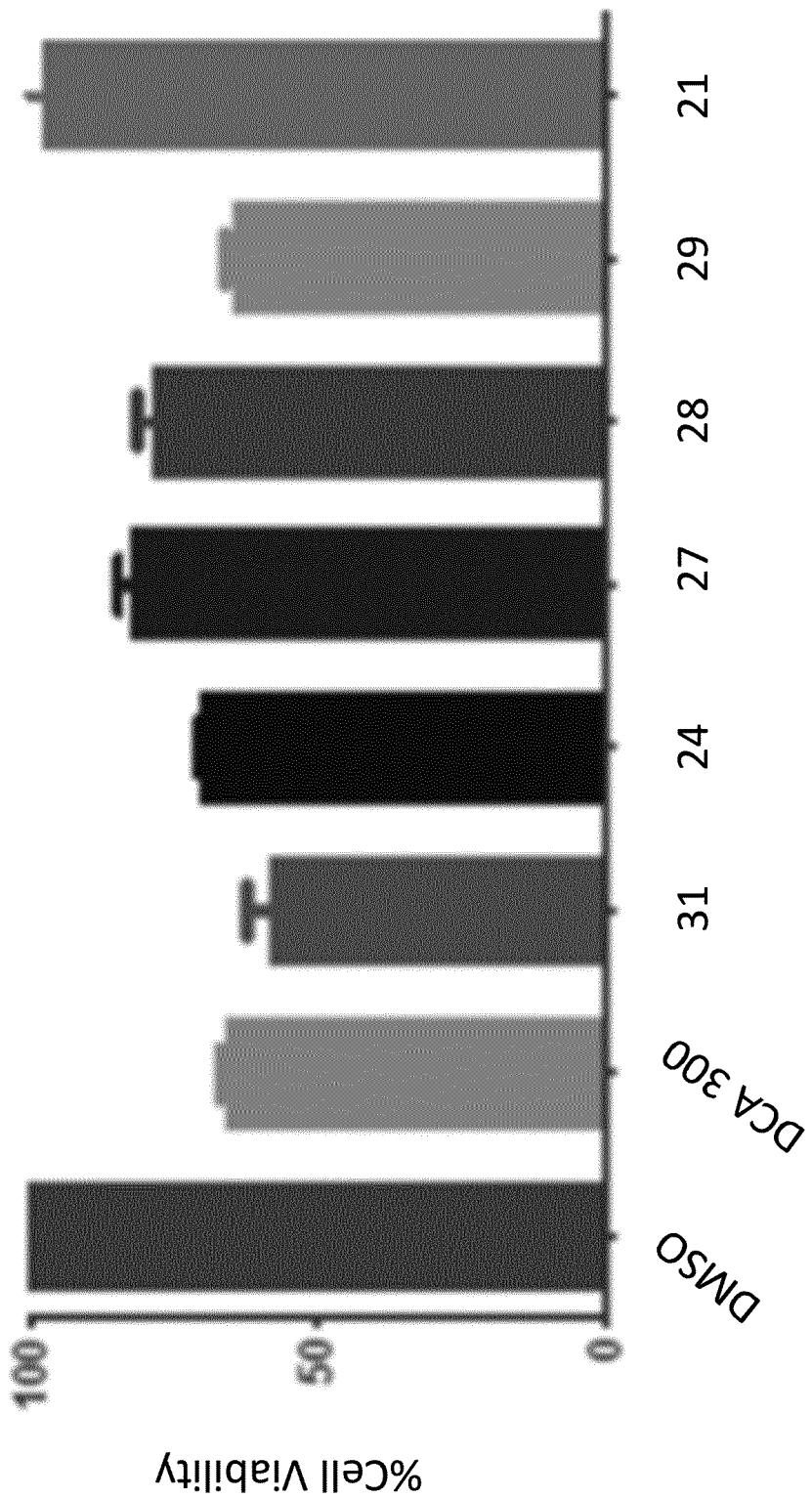
FIG. 6 shows cell viability studies for HUH7 cells treated with representative triazole compounds at a concentration of 100 μM.

HUH-7 cells in culture were then treated with a large library of UDCA 7-analogues to screen for compounds lacking intrinsic toxicity. Compounds that did not themselves cause cell death in the range 100-500 μM were selected for further study in the cytoprotection model. Data are shown in FIG. 6 for a selection of triazoles that were added to HUH7 cells for 24 h before the addition of DCA and then co-treated with DCA for a further 24 h. The unsubstituted triazole 40 exerted a significant effect on cell viability when pre-/co-incubated.

Figure 7B:
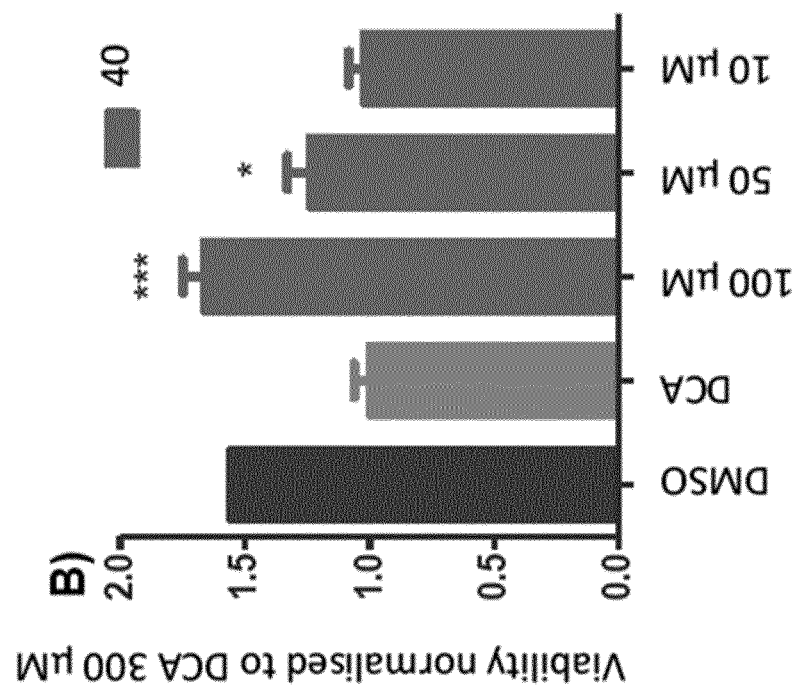
FIG. 7 shows cell viability normalised to DCA treated cells at 300 μM, following treatment with various 7-beta amides at a concentration 100 μM.
Figure 7A:
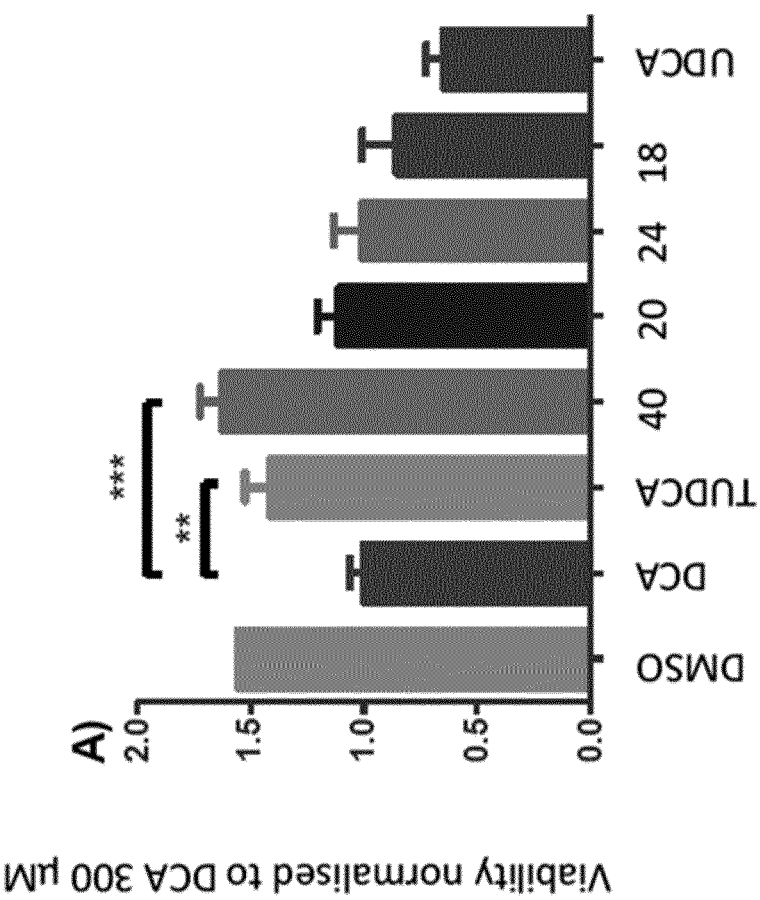

A range of UDCA 7-beta amide and sulphonamides were also assayed in this system to monitor for cytoprotection potential (see FIG. 7a and FIG. 7b). The methane sulfonamide (21) was an effective inhibitor of DCA-induced cell death in the range 10-100 µM.

Figure 14A:
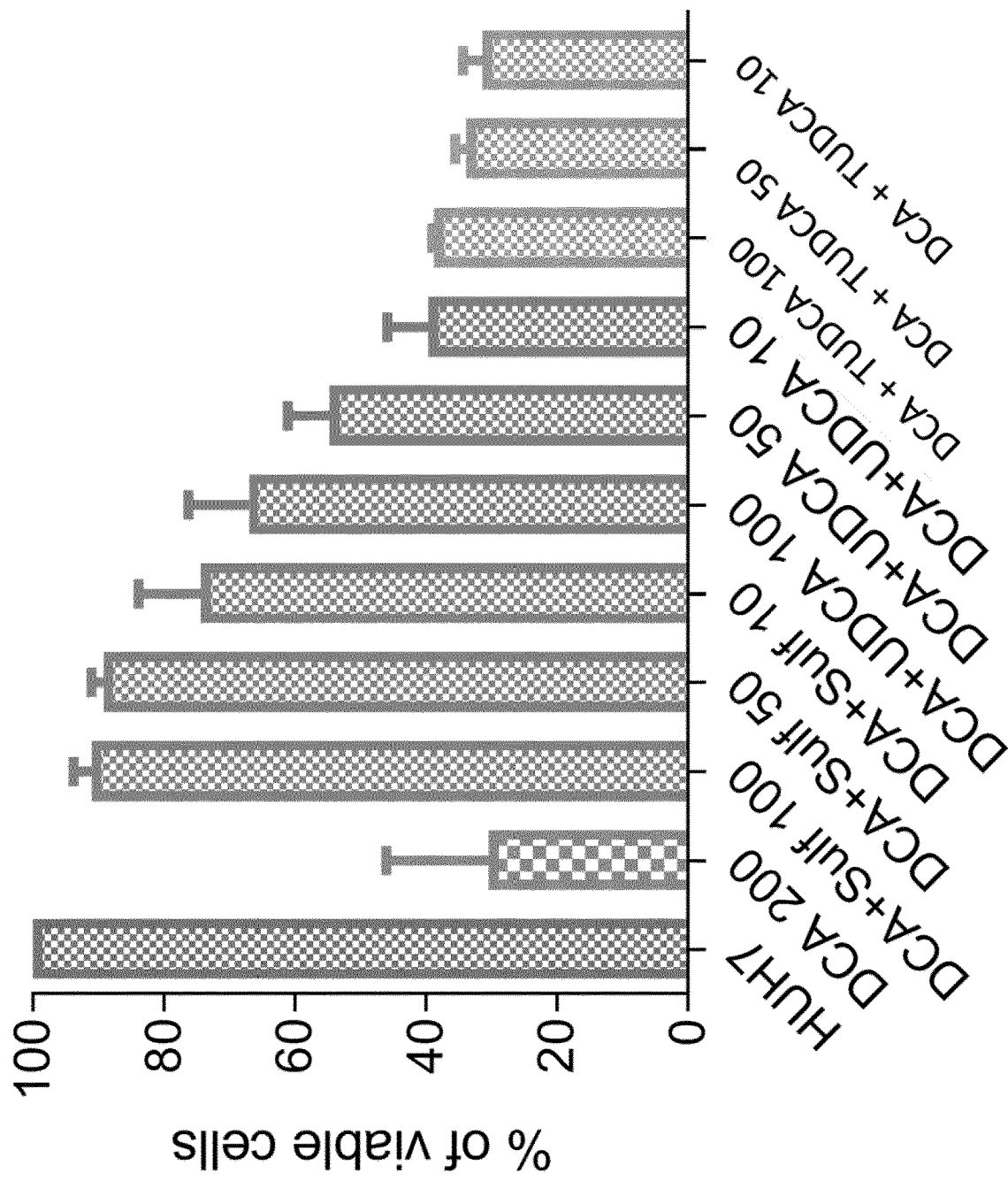
FIG. 14a shows the results of an alamarBlue™ cell viability assay on HUH-7 cells treated with DCA alone, DCA and sulfonamide (21), DCA and UDCA, and DCA and TUDCA.

FIG. 14a shows the results of an alamarBlue™ cell viability assay on HUH-7 cells treated with:
(i) DCA alone at a concentration of 200 µM,
(ii) DCA (200 µM) and sulfonamide (21) concentrations of 100 µM, 50 µM, 10 µM),
(iii) DCA (200 µM) and UDCA (concentration of 100 µM, 50 µM, 10 µM), and
(iv) DCA (200 µM) and TUDCA (concentrations of 100 µM, 50 µM, 10 µM).

Data are shown in FIG. 14a a range of sulfonamide (21), UDCA and TUDCA concentrations which were added to HUH7 cells for 24 h before the addition of DCA (200 µM) and then co-treated with DCA for a further 24 h. As shown in FIG. 14a, sulfonamide (21) had a significant cytoprotective effect at all concentrations measured, with almost complete cell viability/cytoprotection observed at 50 µM and above. Increasing concentrations of UDCA had a cyctoprotective effect, though the magnitude of the effect was significantly less than that observed for sulfonamide (21). A cytoprotective effect could also be observed with TUDCA in this concentration range but it was less than with UDCA and the sulphonamide (21).

Figure 14B:
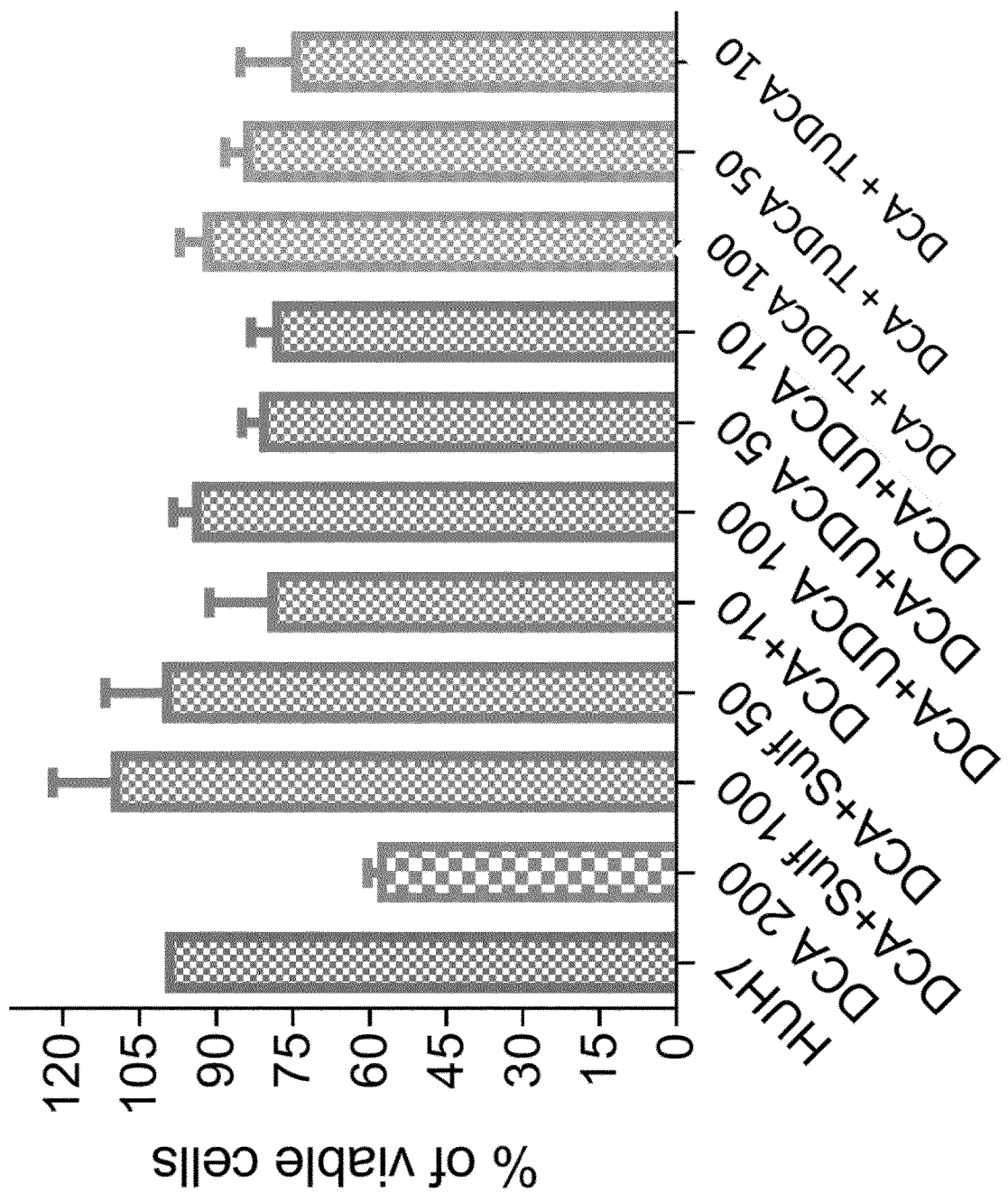
FIG. 14b shows the results of an MTT cell viability assay on HUH-7 cells treated with DCA alone, DCA and sulfonamide (21), DCA and UDCA, and DCA and TUDCA.

FIG. 14b shows the results of an MTT cell viability assay on HUH-7 cells treated with:
(i) DCA alone at a concentration of 200 µM,
(ii) DCA (200 µM) and sulfonamide (21) concentrations of 100 µM, 50 µM, 10 µM),
(iii) DCA (200 µM) and UDCA (concentration of 100 µM, 50 µM, 10 µM), and
(iv) DCA (200 µM) and TUDCA (concentrations of 100 µM, 50 µM, 10 µM).

Data are shown in FIG. 14b for a range of sulfonamide (21), UDCA and TUDCA concentrations which were added to HUH7 cells for 24 h before the addition of DCA (200 µM) and then co-treated with DCA for a further 24 h. FIG. 14b shows that in the MTT assay sulphonamide 21 had a significant cytoprotective effect, at a concentration of 10 µM, cell viability was approximately 75% and cell viability increased at higher concentrations. An increase in cell viability was also observed in the MTT assay for cells treated with UDCA and TUDCA, though to a significantly lesser degree than was observed for cells treated with sulfonamide. The difference between the observed cell viability in each of the assays is a consequence of the different properties measured in each assay. The alamarBlue™ assay uses resazurin-based reagents that function as cell health indicators by using the reducing power of living cells to quantitatively measure viability. Upon entering living cells, resazurin is reduced to resorufin, a compound that is red in color and highly fluorescent. The MTT assay is a colorimetric assay for assessing cell metabolic activity. NAD(P)H-dependent cellular oxidoreductase enzymes may, under defined conditions, reflect the number of viable cells present.

Figure 15A:
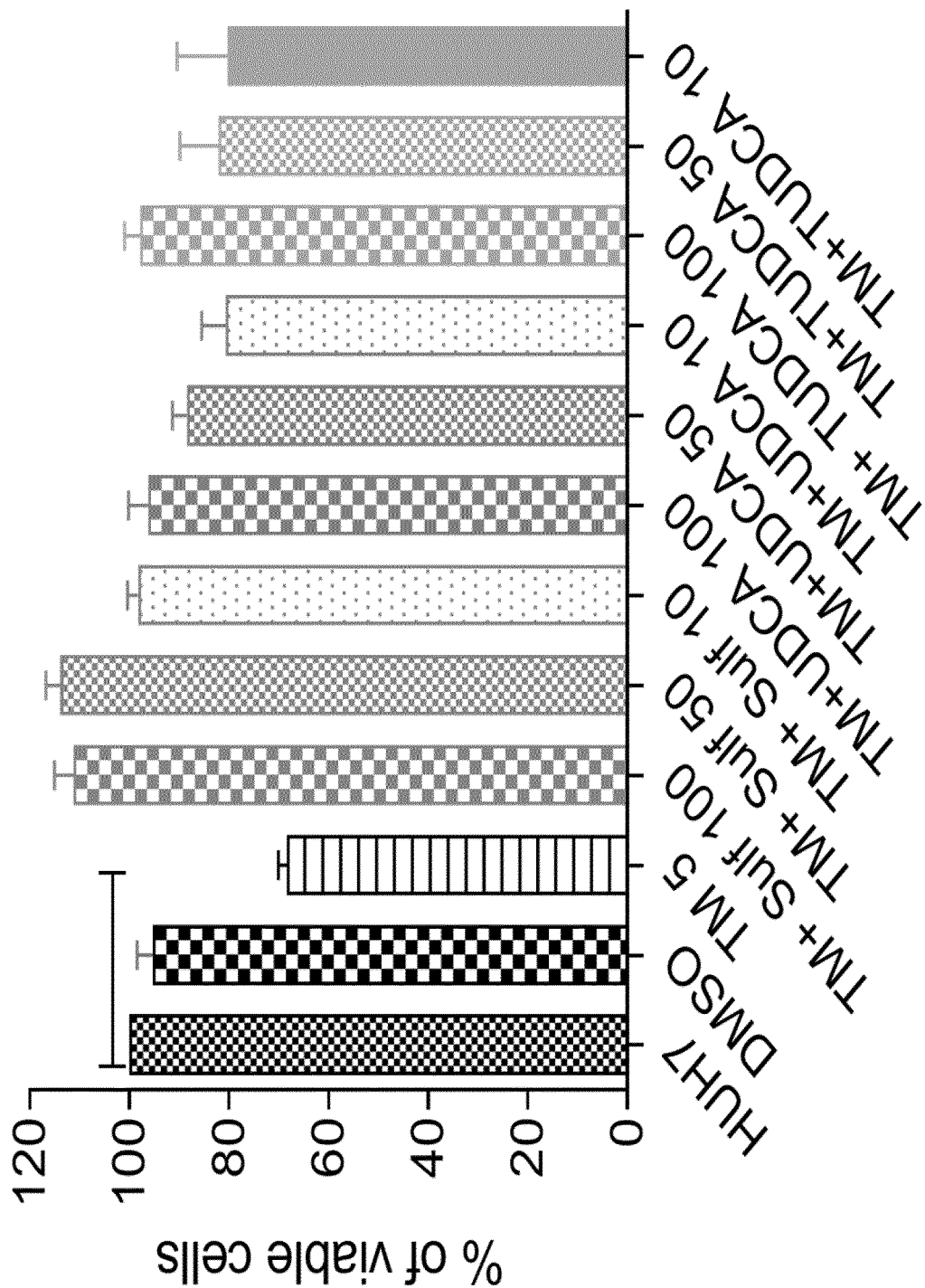
FIG. 15a shows the results of an alamarBlue™ cell viability assay on HUH-7 cells treated with tunicamycin (TM) alone, TM and sulfonamide (21), TM and UDCA.

FIG. 15a shows the results of an alamarBlue™ cell viability assay on HUH-7 cells treated with:
(i) tunicamycin (TM) alone at a concentration of 5 µM,
(ii) TM (5 µM) and sulfonamide (21) (100 µM, 50 µM, 10 µM),
(iii) TM and UDCA (100 µM, 50 µM, 10 µM);
(iv) TM and TUDCA (100 µM, 50 µM, 10 µM).

Tunicamycin is known to induce Endoplasmic Reticulum (ER) stress, resulting ultimately in induction of apopotosis. HUH7 cells were treated with tunicamycin at a concentration of 5 µM, the result of which was a decrease in cell viability in an alamarBlue assay of approximately 30%. Data are shown in FIG. 15a for a range of sulfonamide (21), UDCA and TUDCA concentrations which were added to HUH7 cells for 24 h before the addition of TM (5 µM) and then co-treated with TM for a further 24 h. FIG. 15a shows that pre/co-treatment of cells with tunicamycin and sulfonamide (21) resulted in a significant increase in cell viability. Treatment with sulfonamide (21) at a concentration of 10 µM, led to complete maintenance of cell viability, whereas 100 µM of UDCA and TUDCA was required to achieve effects of similar size.

Figure 15B:
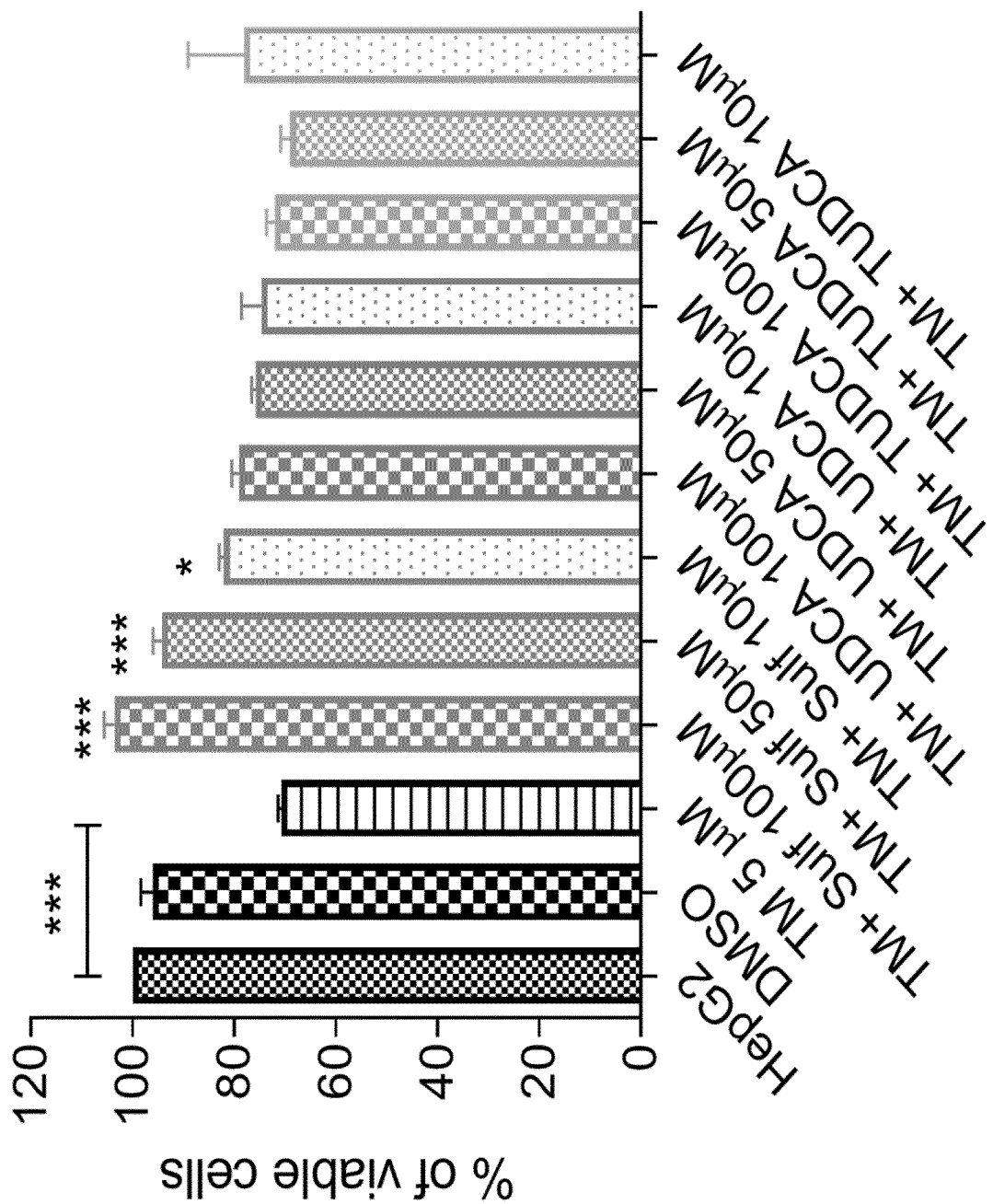
FIG. 15b shows the results of an alamarBlue™ cell viability assay on HepG2 cells treated with tunicamycin (TM) alone, TM and sulfonamide (21), TM and UDCA.

FIG. 15b shows the results of an alamarBlue™ cell viability assay on HepG2 cells treated with:
(i) tunicamycin (TM) alone at a concentration of 5 µM,
(ii) TM (5 µM) and sulfonamide (21) (100 µM, 50 µM, 10 µM),
(iii) TM and UDCA (100 µM, 50 µM, 10 µM);
(iv) TM and TUDCA (100 µM, 50 µM, 10 µM).

Data are shown in FIG. 15b for a range of sulfonamide (21), UDCA and TUDCA concentrations which were added to HepG2 cells for 24 h before the addition of TM (5 µM) and then co-treated with TM for a further 24 h. FIG. 15b shows that the cytoprotective effect of sulfonamide (21) was also observed using HepG2 cells. The lowest concentration of sulfonamide (21) which was tested outperformed all concentrations of UDCA and TUDCA when tested under the same conditions.

Rat Model of Cholangitis

A rat model of cholangitis has been developed by Tjandra et al in Sprague-Dawley rats by low-dose administration of the biliary toxin alpha-naphthylisothiocyanate (ANIT) (1 g/kg powdered rat chow ad libitum) for 4, 7 and 14 days. Cholestasis is observed in ANIT-treated animals (Hepatology. 2000 February; 31(2):280-90). This rat model of cholangitis was employed to assess the efficacy of lead compounds by monitoring aspartate aminotransferase (AST) serum levels and alanine aminotransferase (ALT) serum levels. Elevated levels of AST and ALT are indicative of liver damage.

As outlined above, administration of alpha-naphthylisothiocyanate (ANIT) can induce chronic cholangitis if administered orally (1 g/kg) in powdered rat chow. Liver changes can be seen as early as on day 4. Enhanced proliferation owing to ANIT treatment is observed on day 7, and by day 14 extensive bile ductule proliferation (collagen deposition) is evident that is histologically and biochemically similar to human chronic cholangitis.

Test compounds were to be assessed for their effect on liver damage using this chronic ANIT-induced model of cholangitis. UDCA was tested orally at high dose of 100 mg/kg in order to ensure an effect in the functional model that mimics its clinical effects in cholestasis patients. Test articles were analogues from the compound family—sulfonamide (21) and triazole (40). In this case ANIT was added to the chow at 0.1% inducing cholestasis and the compounds were tested by oral administration over the course of a week. Serum liver enzymes AST and ALT were measured as measures of liver damage and cholestasis. In comparison to the UDCA dose, the sulfonamide and triazole were dosed in the range 20-30 mg/kg. Sample data are given in FIG. 8(a) (n=6-7). Sulfonamide and triazole treated rats had normalised AST serum levels.

Figure 8B:
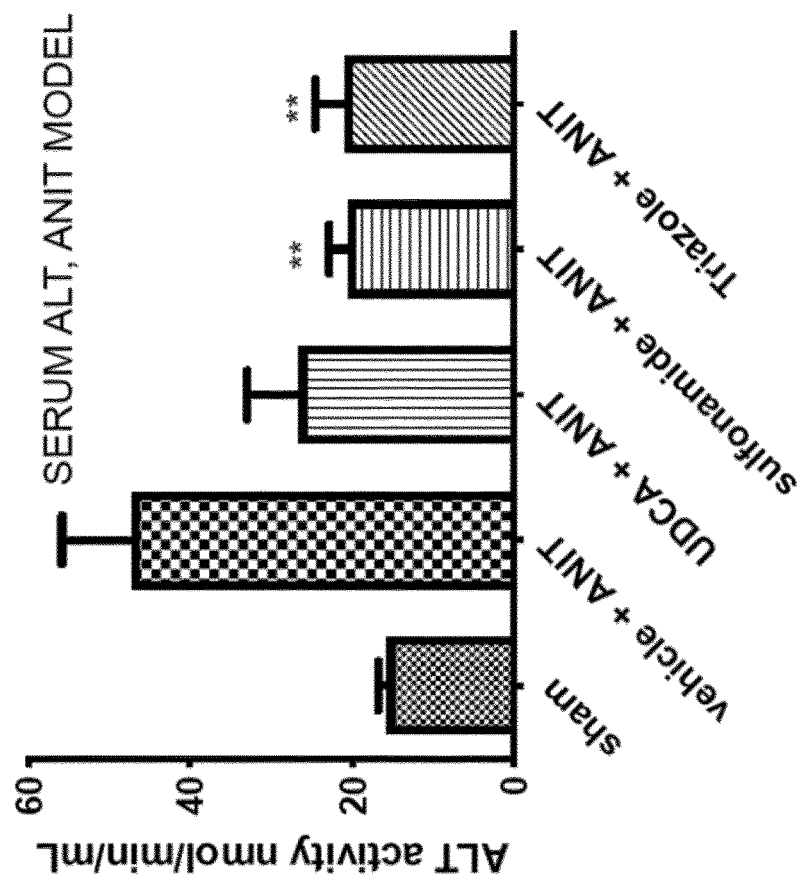
FIG. 8a and FIG. 8b show AST and ALT serum levels in rats treated with vehicle, UDCA, sulfonamide (21) and triazole (40) in an ANIT-induced model of cholangitis.
Figure 8A:
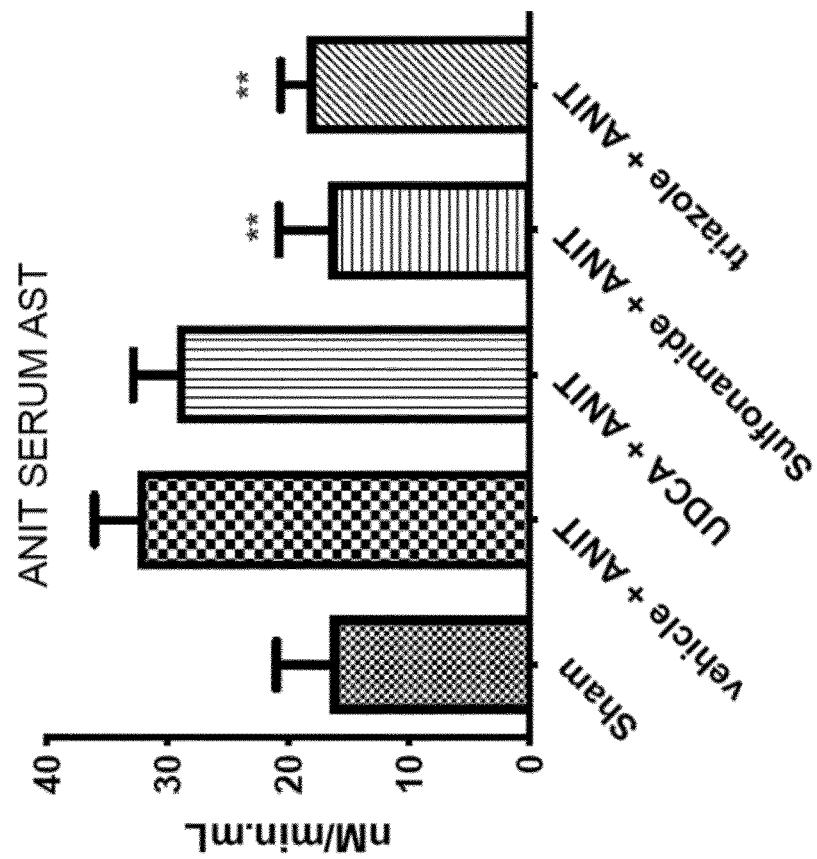

Similar results in terms of relative reduction of liver damage compared with UDCA were obtained for serum ALT (alanine transaminase) see FIG. 8(b) (n=6-7). Sulfonamide and triazole treated rats had normalised ALT serum levels.

The data are predictive of a therapeutic effect in cholestatic liver diseases following billiary damage, for example in primary sclerosing cholangitis (PSC) or primary billiary cholangitis (PBC). The data indicate that the compounds are more potent and efficacious that UDCA the clinical standard.

Mouse Model Assay of Hepatic Steatosis

Tetri et al describe a mouse model of hepatic statosis (Am J Physiol Gastrointest Liver Physiol, 295 (2008), pp. G987-G995).

Male C57BL/6J strain mice received a diet of 60% high fat+fructose (HFD-F) for a total of 28 weeks to induce hepatic steatosis. Control mice received a regular diet of 10% fat. Vehicle which was borate buffer pH 9, UDCA (30 mg/kg) or sulphonamide (compound 21) (30 mg/kg) were introduced intraperitoneally each day for the last two weeks of treatment (groups of n=8). FIG. 9 shows the weight gain of the mice over time.

Animals were sacrificed and livers were sectioned into formalin and processed for histology; sections were scored by a blinded reviewer for hepatic steatosis. Plasma was recovered to quantify levels of aspartate transaminase (AST) and alanine transaminase (ALT) enzymes to quantify circulating markers of hepatic steatosis and associated hepatocyte microvesicular damage.

FIG. 10a shows visceral fat as a percentage of body weight for vehicle, UDCA and sulfonamide treated mice. While treatment with UDCA and sulfonamide (21) caused a reduction in overall body weight compared with vehicle (data not shown), no reduction in visceral fat was observed.

FIG. 10b shows the liver weight as a percentage of body weight for vehicle, UDCA and sulfonamide (21) treated mice. Compared with UDCA treatment and vehicle treated groups, sulfonamide (21) administration caused a significant reduction in liver weight consistent with reduced liver damage and steatosis.

Figure 11C:
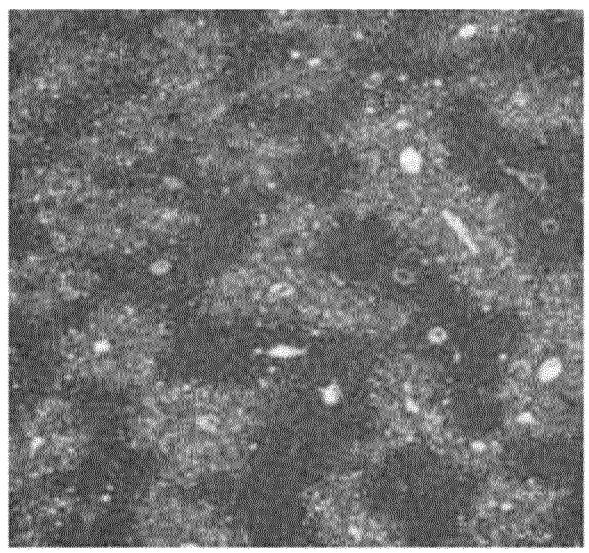
FIG. 11a-FIG. 11c show representative liver sections with hematoxylin and eosin (H&E) from animals exposed to HFD-F diet and then buffer vehicle (left) for 14 d, UDCA (30 mg/kg) or sulfonamide (21) (30/kg).
Figure 11B:
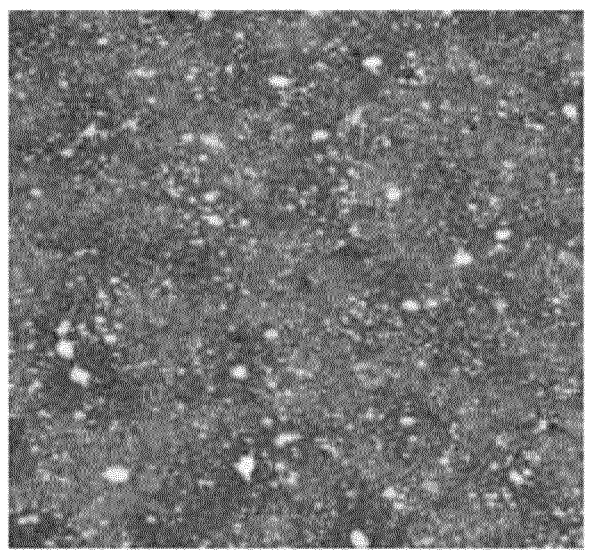
Figure 11A:
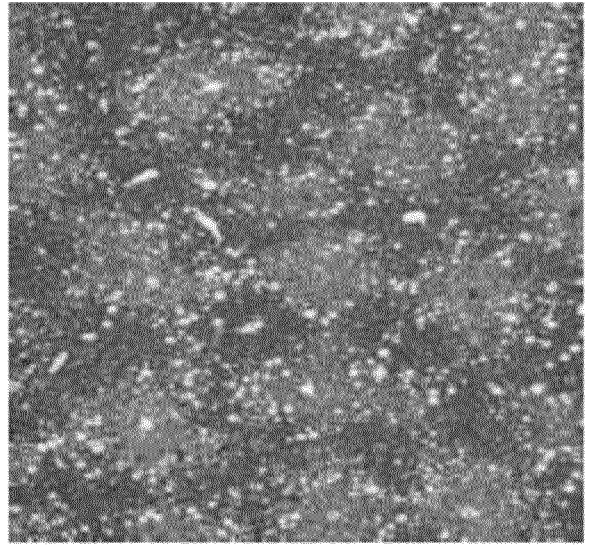

FIG. 11a-FIG. 11c show representative liver sections with hematoxylin and eosin (H&E) from animals exposed to HFD-F diet and then buffer vehicle (left) for 14 d, UDCA (30 mg/kg) or sulfonamide (21) (30/kg). Compared with UDCA and vehicle treated animals, sulfonamide (21) treated animals showed reduced evidence of steatosis and associated liver damage in multiple examined sections.

Figure 12:
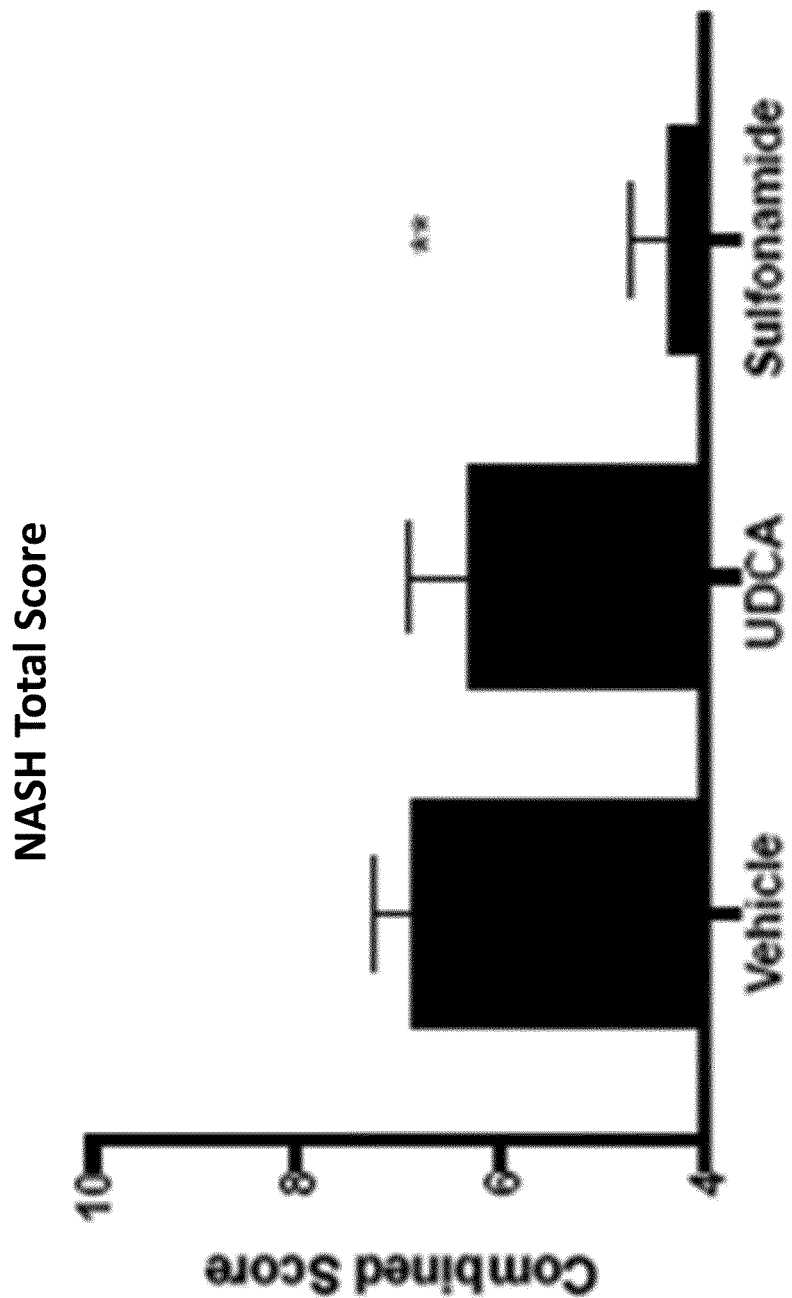
FIG. 12 shows the NASH score results for vehicle treated mice, UDCA treated mice and sulfonamide (21) treated HFD-F mice.

FIG. 12 shows the NASH score results for vehicle treated mice, UDCA treated mice and sulfonamide (21) treated HFD-F mice. Sulfonamide treatment caused a significant reduction in total NASH score, a composite of histopathological scores for micovesicular steatosis, hepatocyte ballooning, inflammation and fibrosis.

Figure 13A:
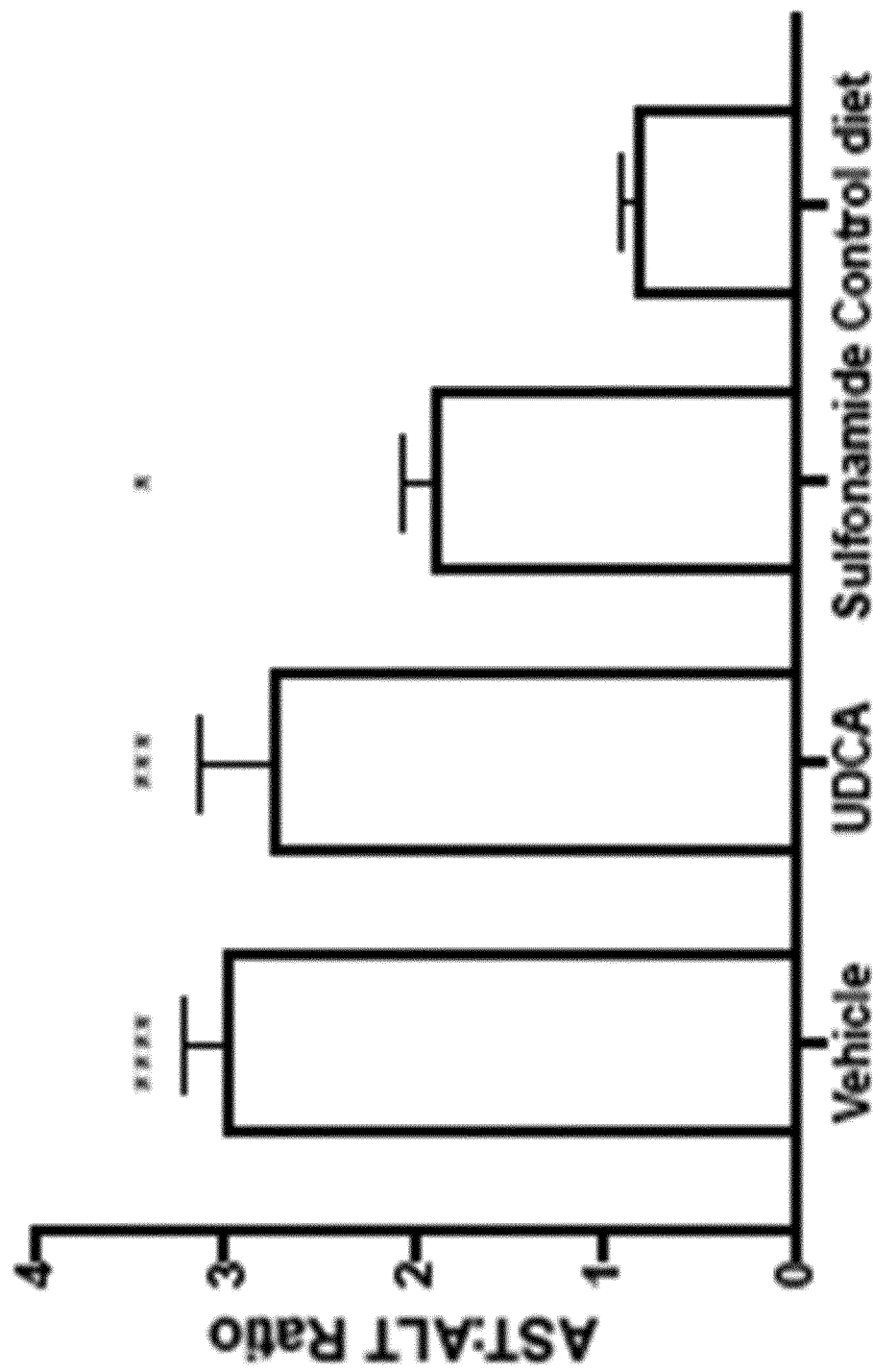
FIG. 13a and FIG. 13b show the difference in transaminase serum levels for vehicle treated, UDCA treated, sulfonamide (21) treated and control HFD-F mice.
Figure 13B:
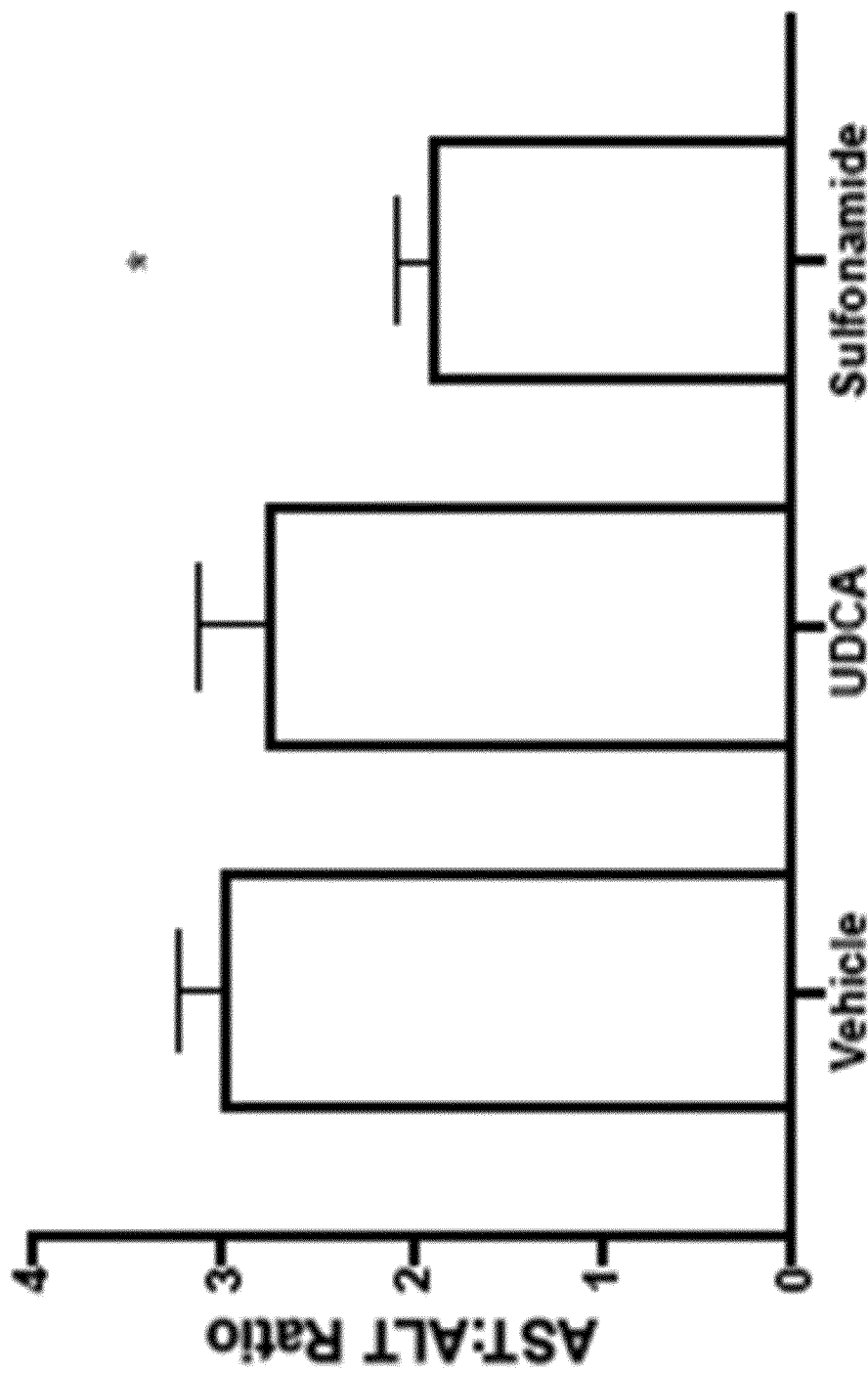

FIG. 13a and FIG. 13b show the difference in transaminase serum levels for vehicle treated, UDCA treated, sulfonamide (21) treated and control HFD-F mice.

Circulating transaminase activity levels were determined using commercially available enzyme kits (SIGMA ALDRICH IRELAND). Administration of sulfonamide caused a reduction in ALT and in AST:ALT ratio. Compared with the control diet, HFD-F caused a significant increase in AST:ALT ratio consistent with steatohepatitis. Sulfonamide administration for the final 2 weeks of the 28 week experiment caused a significant reduction in histopathologically evident steatohepatitis and this was associated with a significant reduction in circulating transaminases.

The above data support the efficacy of the compounds of the invention as therapeutics for the treatment of liver disease, especially severe NAFLD, NASH, and the prevention of its complications including liver cancer.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A compound having the formula:

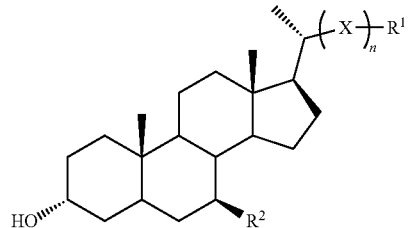

n is 0 or 1,

X is —$C_1$-$C_{12}$ aliphatic optionally substituted with one or more selected from the group consisting of hydroxyl, amino, amido, sulfonyl, sulphonamide, thiol, carboxyl, cyano, nitro, —$C_1$-$C_6$ alkyl, —$C_1$-$C_6$ alkoxy, $C_1$-$C_6$ thioalkyl, oxo, —C(O)O—$C_1$-$C_6$ alkyl, —OC(O)O—$C_1$-$C_6$alkyl, —C(O)NR'R', —N(R')C(O)NR'R', —N(R')C(O)O—$C_1$-$C_6$alkyl, and —$C_3$-$C_6$ cycloalkyl;

$R^1$ is selected from the group consisting of carboxylate, —$CO_2H$, —C(O)OR', —C(O)NR'—$R^{41}$, —N(R')C(O)—$R^{41}$, —N(R')C(O)OR$^{42}$, and sulfonate;

$R^2$ has a formula:

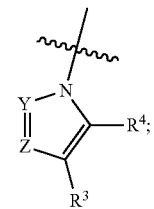

where:

Y and Z are each independently selected from N or CH $R^3$ is H, or —$C_1$-$C_{12}$ aliphatic optionally substituted with one or more of hydroxyl, amino, amido, sulfonyl, sulphonamide, thiol, carboxyl, cyano, nitro, —$C_1$-$C_6$ alkyl, —$C_3$-$C_6$ cycloalkyl, —$C_1$-$C_6$ alkoxy, —$C_1$-$C_6$ thioalkyl, oxo, —C(O)O—$C_1$-$C_6$ alkyl, —OC(O)O—$C_1$-$C_6$alkyl, —C(O)NR'R', —N(R')C(O)NR'R', —N(R')C(O)O—$C_1$-$C_6$alkyl, or —NR'R$^{42}$;

$R^4$ is H, halo, or —$C_1$-$C_3$ alkyl; and

R' is independently selected, for each occurrence, from the group consisting of hydrogen, and $C_1$-$C_6$ alkyl optionally substituted with $R^{41}$;

$R^{A1}$ is hydrogen, carboxylate, —CO$_2$H, sulfonate or —C$_1$-C$_6$ alkyl, optionally substituted with one or more of hydroxyl, —C$_3$-C$_6$ cycloalkyl, —C$_1$-C$_6$ alkenyl, —C$_1$-C$_6$ alkoxyl, carboxylate, —CO$_2$H or sulfonate;

$R^{A2}$ is $R^{A1}$, —C(O)$R^{A1}$, —C$_6$-C$_{12}$ aryl, —C$_6$-C$_{12}$ alkaryl, —C$_6$-C$_{12}$ alkenaryl, —SO$_2$—C$_1$-C$_6$ alkyl, or —SO$_2$—C$_6$-C$_{12}$ aryl;

or a pharmaceutically acceptable salt, hydrate, stereoisomer, or prodrug thereof.

2. The compound according to claim 1, wherein R$^2$ has the formula:

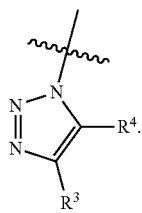

3. The compound according to claim 1, wherein R$^3$ methyl, ethyl, propyl, butyl, pentyl, hexyl or isomers thereof.

4. The compound according to claim 1, wherein R$^4$ is H.

5. The compound according to claim 1, wherein X is —C$_1$-C$_6$ alkyl.

6. The compound according to claim 1, wherein X methyl, ethyl, propyl, butyl, pentyl, hexyl or isomers thereof.

7. The compound according to claim 1, wherein X is optionally substituted with one or more selected from the group consisting of hydroxyl, —C$_1$-C$_6$ alkyl, and —C$_3$-C$_6$ cycloalkyl.

8. The compound according to claim 1, wherein R$^1$ is selected from the group consisting of carboxylate, —CO$_2$H, —C(O)OR', —C(O)NR'—$R^{A1}$, and sulfonate.

9. The compound according to claim 1, wherein R' is hydrogen, methyl, ethyl, propyl, butyl, pentyl, hexyl or isomers thereof.

10. A compound having the formula:

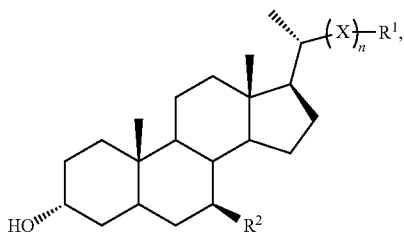

wherein n is 1 and —(X)$_n$—R$^1$ is selected from the group consisting of:

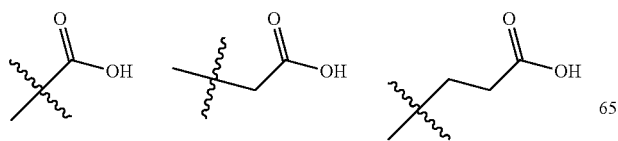

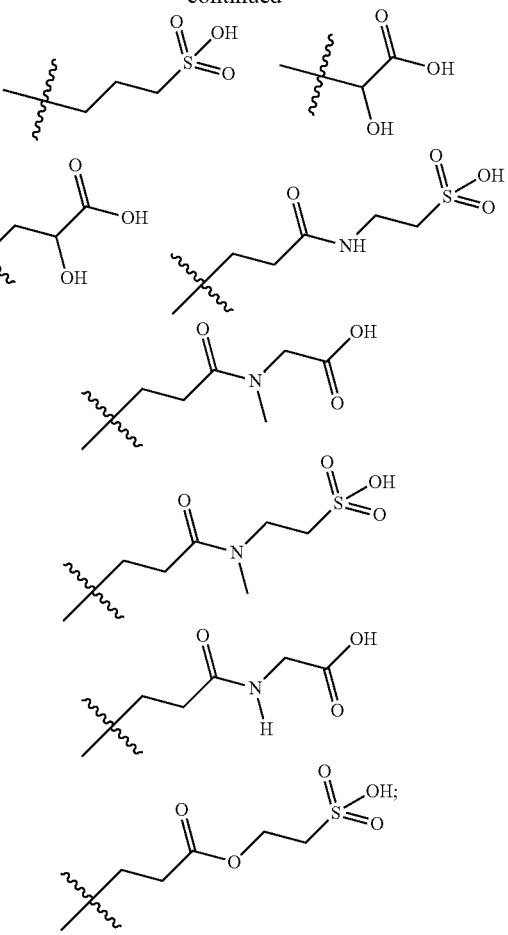

R$^2$ has a formula:

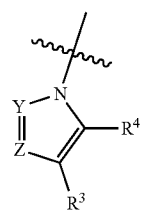

where:
Y and Z are each independently selected from N or CH
R$^3$ is H, or —C$_1$-C$_{12}$ aliphatic optionally substituted with one or more of hydroxyl, amino, amido, sulfonyl, sulphonamide, thiol, carboxyl, cyano, nitro, —C$_1$-C$_6$ alkyl, —C$_3$-C$_6$ cycloalkyl, —C$_1$-C$_6$ alkoxy, —C$_1$-C$_6$ thioalkyl, oxo, —C(O)O—C$_1$-C$_6$ alkyl, —OC(O)O—C-C$_6$alkyl, —C(O)NR'R', —N(R')C(O)NR'R', —N(R')C(O)O—C$_1$-C$_6$alkyl, or —NR'$R^{A2}$;

R$^4$ is H, halo, or —C$_1$-C$_3$ alkyl; and

R' is independently selected, for each occurrence, from the group consisting of hydrogen, and C$_1$-C$_6$ alkyl optionally substituted with $R^{A1}$;

$R^{A1}$ is hydrogen, carboxylate, —CO$_2$H, sulfonate or —C$_1$-C$_6$ alkyl, optionally substituted with one or more of hydroxyl, —C$_3$-C$_6$ cycloalkyl, —C$_1$-C$_6$ alkenyl, —C$_1$-C$_6$ alkoxyl, carboxylate, —CO$_2$H, sulfonate;

$R^{A2}$ is $R^{A1}$, —C(O)$R^{A1}$, —$C_6$-$C_{12}$ aryl, —$C_6$-$C_{12}$ alkaryl, —$C_6$-$C_{12}$ alkenaryl, —$SO_2$—$C_1$-$C_6$ alkyl, or —$SO_2$—$C_6$-$C_{12}$ aryl;

or a pharmaceutically acceptable salt, hydrate, stereoisomer, or prodrug thereof.

11. A compound having the formula:

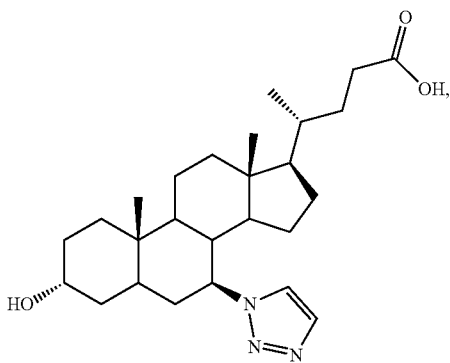

a pharmaceutically acceptable salt, hydrate, stereoisomer, or prodrug thereof.

12. A pharmaceutical composition comprising the compound according to claim 1, and a pharmaceutically acceptable carrier and/or excipient.

13. A method for treating and/or preventing liver disease comprising administering to a patient in need thereof a therapeutically effective amount of a compound as claimed in claim 1.

14. The method of claim 13, wherein the liver disease is cholestatic liver disease or non-cholestatic liver disease.

15. The method of claim 14, wherein the cholestatic liver disease is selected from primary sclerosing cholangitis (PSC), primary biliary cirrhosis (PBC) or progressive familial intrahepatic cholestasis, cystic fibrosis, and drug-induced cholestasis.

16. The method of claim 14, wherein the non-cholestatic liver disease is selected from non-alcoholic fatty liver disease, alcoholic or non-alcoholic steatohepatitis, autoimmune hepatitis, hemochromatosis, Wilson disease or alpha-1-antitrypsin deficiency, and liver carcinoma.

17. The method of claim 15, wherein the progressive familial intrahepatic cholestasis is selected from progressive familial intrahepatic cholestasis type 1, 2 and 3.

18. The method of claim 14, wherein the non-cholestatic liver disease is hepatocellular carcinoma or cholangiocarcinoma.

19. The compound according to claim 1, wherein R' is methyl, ethyl, propyl, butyl, pentyl, hexyl or isomers thereof.

20. The compound according to claim 1, wherein n is 1 and

—(X)$_n$—$R^1$ is

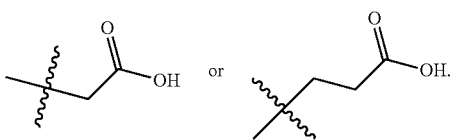 [SMILES: *CC(=O)O ; *CCC(=O)O]

21. The compound according to claim 1, wherein $R^3$ is H or —$C_1$-$C_6$ alkyl.

* * * * *